(12) United States Patent
Sasaki et al.

(10) Patent No.: US 7,369,361 B2
(45) Date of Patent: May 6, 2008

(54) MAGNETIC HEAD AND MAGNETIC HEAD SUBSTRUCTURE INCLUDING RESISTOR ELEMENT WHOSE RESISTANCE CORRESPONDS TO THE LENGTH OF THE TRACK WIDTH DEFINING PORTION OF THE POLE LAYER

(75) Inventors: Yoshitaka Sasaki, Milpitas, CA (US);
Hiroyuki Itoh, Milpitas, CA (US);
Dong-Hong Li, Milpitas, CA (US);
Hironori Araki, Milpitas, CA (US);
Kazuo Ishizaki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 363 days.

(21) Appl. No.: 11/050,892

(22) Filed: Feb. 7, 2005

(65) Prior Publication Data
US 2006/0174475 A1    Aug. 10, 2006

(51) Int. Cl.
*G11B 5/147* (2006.01)
*G11B 5/39* (2006.01)
*G11B 5/127* (2006.01)

(52) U.S. Cl. .......... 360/126; 360/317; 29/603.1
(58) Field of Classification Search .......... 360/126, 360/317; 29/603.09–603.15
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,370,763 B1 * | 4/2002 | Watanuki et al. | 29/603.09 |
| 6,504,675 B1 | 1/2003 | Shukh et al. | |
| 6,557,241 B1 * | 5/2003 | Sasaki | 29/603.12 |
| 6,588,091 B1 * | 7/2003 | Chang et al. | 29/603.14 |
| 6,623,330 B2 * | 9/2003 | Fukuroi | 451/5 |
| 6,687,084 B2 | 2/2004 | Takahashi et al. | |
| 6,710,973 B2 | 3/2004 | Okada et al. | |
| 6,776,690 B2 * | 8/2004 | Bunch et al. | 451/29 |
| 6,807,722 B2 * | 10/2004 | Sasaki et al. | 29/603.09 |

(Continued)

FOREIGN PATENT DOCUMENTS

JP   A-2002-092821   3/2002

(Continued)

*Primary Examiner*—A. J. Heinz
(74) *Attorney, Agent, or Firm*—Oliff & Berridge, PLC

(57) ABSTRACT

A method of manufacturing magnetic heads comprises the step of: fabricating a magnetic head substructure by forming components of a plurality of magnetic heads on a single substrate, wherein a plurality of rows of pre-head portions that will be the respective magnetic heads later are aligned in the substructure; and fabricating the magnetic heads by separating the pre-head portions from one another through cutting the substructure. In the substructure first resistor elements and second resistor elements are formed. Each of the first resistor elements has a resistance that varies depending on the location of an end of an MR element located in a medium facing surface along the direction orthogonal to the medium facing surface. Each of the second resistor elements has a resistance that varies depending on the location of an end face of a track width defining portion located in the medium facing surface along the direction orthogonal to the medium facing surface. The medium facing surfaces are formed while monitoring the resistance values of the first and second resistor elements.

50 Claims, 72 Drawing Sheets

U.S. PATENT DOCUMENTS

| | | |
|---|---|---|
| 6,884,148 B1 * | 4/2005 | Dovek et al. .................. 451/5 |
| 6,935,923 B2 * | 8/2005 | Burbank et al. ............... 451/5 |
| 6,997,784 B2 * | 2/2006 | Bunch et al. ................. 451/41 |
| 7,006,326 B2 | 2/2006 | Okada et al. |
| 7,096,567 B2 * | 8/2006 | Shindo et al. ........... 29/603.12 |
| 7,133,252 B2 | 11/2006 | Takano et al. |
| 2003/0151850 A1 | 8/2003 | Nakamura et al. |
| 2004/0223258 A1 | 11/2004 | Giorgis et al. |
| 2006/0028770 A1 | 2/2006 | Etoh et al. |
| 2006/0044683 A1 | 3/2006 | Matono et al. |

FOREIGN PATENT DOCUMENTS

| | | |
|---|---|---|
| JP | A-2002-197615 | 7/2002 |
| JP | A-2003-203311 | 7/2003 |
| JP | A-2003-242607 | 8/2003 |
| JP | A-2004-335085 | 11/2004 |
| JP | A-2006-048806 | 2/2006 |
| JP | A-2006-073088 | 3/2006 |

* cited by examiner

MAGNETIC HEAD AND MAGNETIC HEAD SUBSTRUCTURE INCLUDING RESISTOR ELEMENT WHOSE RESISTANCE CORRESPONDS TO THE LENGTH OF THE TRACK WIDTH DEFINING PORTION OF THE POLE LAYER

BACKGROUND OF THE INVENTION

1. Field of the Invention

The present invention relates to magnetic heads used for writing data on a recording medium and a method of manufacturing the magnetic heads, and to a magnetic head substructure used for manufacturing the magnetic heads.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction perpendicular to the surface of the recording medium. It is known that the perpendicular magnetic recording system is harder to be affected by thermal fluctuation of the recording medium and capable of implementing higher linear recording density, compared with the longitudinal magnetic recording system.

In each of the longitudinal magnetic recording system and the perpendicular magnetic recording system, magnetic heads typically used have a structure in which a reproducing (read) head having a magnetoresistive element (that may be hereinafter called an MR element) for reading and a recording (write) head having an induction-type electromagnetic transducer for writing are stacked on a substrate.

In each of the longitudinal and perpendicular magnetic recording systems, the write head comprises a coil for generating a magnetic field corresponding to data to be written on a recording medium, and a magnetic pole layer for allowing a magnetic flux corresponding to the field generated by the coil to pass therethrough and generating a write magnetic field for writing the data on the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

To achieve higher recording density, it is a reduction in track width, that is, a reduction in width of the end face of the pole layer taken in the medium facing surface, and an improvement in writing characteristics that is required for the write head. An improvement in writing characteristics is, for example, an improvement in overwrite property that is a parameter indicating an overwriting capability. The overwrite property is reduced if the track width is reduced. It is therefore required to achieve a better overwrite property as the track width is reduced. Here, the length of the track width defining portion taken in the direction orthogonal to the medium facing surface is called a neck height. The smaller the neck height, the better is the overwrite property.

A magnetic head used for a magnetic disk drive such as a hard disk drive is typically provided in a slider. The slider has the above-mentioned medium facing surface. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, there arise problems, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in the Published U. S. Patent Application No. 2003/0151850A1, the Published Unexamined Japanese Patent Application 2003-203311, and the U.S. Pat. No. 6,504,675B1, for example. According to this technique, the end face of the track width defining portion located in the medium facing surface is made to have a shape in which the side located backward in the direction of travel of the recording medium (that is, the side located on the air-inflow-end side of the slider) is shorter than the opposite side. Typically, in the medium facing surface of a magnetic head, the end farther from the substrate is located forward in the direction of travel of the recording medium (that is, on the air-outflow-end side of the slider). Therefore, the above-mentioned shape of the end face of the track width defining portion located in the medium facing surface is such that the side closer to the substrate is shorter than the side farther from the substrate.

As a magnetic head for the perpendicular magnetic recording system, a magnetic head comprising a pole layer and a shield is known, as disclosed in the U.S. Pat. No. 4,656,546, for example. In the medium facing surface of this magnetic head, an end face of the shield is located forward of an end face of the pole layer along the direction of travel of the recording medium with a specific small space. Such a magnetic head will be hereinafter called a shield-type head. In the shield-type head, the shield prevents a magnetic flux from reaching the recording medium, the flux being generated from the end face of the pole layer and extending in directions except the direction perpendicular to the surface of the recording medium. The shield-type head achieves a further improvement in linear recording density.

The U.S. Pat. No. 4,672,493 discloses a magnetic head having a structure in which magnetic layers are provided forward and backward, respectively, in the direction of travel of the recording medium with respect to a middle magnetic layer to be the pole layer, and coils are disposed between the middle magnetic layer and the forward magnetic layer, and between the middle magnetic layer and the backward magnetic layer, respectively. This magnetic head is capable of increasing components perpendicular to the surface of the recording medium among components of the magnetic field generated from the medium-facing-surface-side end of the middle magnetic layer.

Consideration will now be given to a method of forming a pole layer in which the end face of the track width defining portion located in the medium facing surface has a shape in which the side closer to the substrate is shorter than the side farther from the substrate, as mentioned above. In prior art, frame plating has been often employed as a method of forming such a pole layer. According to the method of forming the pole layer by frame plating, an electrode film is first formed on a layer serving as a base of the pole layer. Next, a photoresist layer is formed on the electrode film. The photoresist layer is then patterned to form a frame having a groove whose shape corresponds to the pole layer. Next, plating is performed by feeding a current to the electrode film to form the pole layer in the groove. The frame is then removed. Next, portions of the electrode film except the portion below the pole layer are removed.

When frame plating is employed, it is difficult to form a groove having a small width in the photoresist layer by photolithography. Therefore, the problem is that it is difficult to reduce the track width when the pole layer is formed by frame plating. To solve this problem, it is possible that, after forming the pole layer by frame plating, both side portions of the track width defining portion are etched by dry etching such as ion beam etching so as to reduce the track width.

In the course of manufacturing magnetic heads, a plurality of magnetic head elements to be the magnetic heads are formed in a single substrate (wafer). The substrate in which the magnetic head elements are formed is cut such that the surface to be the medium facing surfaces appears. This surface is then polished to form the medium facing surfaces.

FIG. 73 illustrates an example of shape of the top surface of the pole layer when the track width is reduced by etching both side portions of the track width defining portion as described above. FIG. 73 illustrates a neighborhood of the boundary between a track width defining portion 201 and a wide portion 202 of the pole layer before the medium facing surface is formed. In FIG. 73, 'ABS' indicates a region in which the medium facing surface is to be formed, 'TW' indicates the track width, and 'NH' indicates the neck height as designed.

When the track width TW is reduced by etching the side portions of the track width defining portion 201, it is likely that the pole layer goes out of a desired shape. As a result, particularly when the neck height NH is small, it is likely that the track width defining portion 201 forms a shape in which the width varies depending on the location along the direction orthogonal to the medium facing surface (the vertical direction in FIG. 73), as shown in FIG. 73.

When the track width defining portion 201 has a shape as shown in FIG. 73, the neck height is strictly the length between the region ABS and the point at which the width of the track width defining portion 201 starts to be greater than the width thereof in the region ABS. However, if the neck height is thus defined, it is difficult to precisely determine the neck height when the track width defining portion 201 has the shape as shown in FIG. 73. Therefore, the neck height is defined as will be described below when the track width defining portion 201 has the shape as shown in FIG. 73. In the top surface of the pole layer, an imaginary line L1 passes through the intersection point of the region ABS and the side portion of the track width defining portion 201, and extends in the direction orthogonal to the region ABS. An imaginary line L2 extends from a straight line portion of the side portion of the wide portion 202 connected to the side portion of the portion 201 and extends in the direction in which the straight line portion extends. The intersection point of the imaginary lines L1 and L2 is defined as C. The distance between the region ABS and the point C is defined as the neck height. The neck height as thus defined is nearly equal to the neck height NH as designed.

When the track width defining portion 201 has the shape as shown in FIG. 73, if the location of the medium facing surface goes out of a desired location and the neck height then goes out of a desired value, there is a possibility that the track width TW is out of a desired value, too.

An example of method of manufacturing magnetic heads will now be described. First, components of a plurality of magnetic heads are formed in a single substrate to fabricate a magnetic head substructure in which a plurality of rows of pre-head portions that will be the magnetic heads later are aligned. Next, the magnetic head substructure is cut to fabricate a head aggregate including a row of the pre-head portions. Next, a surface formed in the head aggregate by cutting the magnetic head substructure is polished (lapped) to form the medium facing surfaces of the pre-head portions that the head aggregate includes. Next, flying rails are formed in the medium facing surfaces. Next, the head aggregate is cut so that the pre-head portions are separated from one another, and the magnetic heads are thereby formed.

An example of method of forming the medium facing surfaces by lapping the head aggregate will now be described. In the method, the head aggregate is lapped so that the MR heights of a plurality of pre-head portions are made equal while the resistances of a plurality of MR elements that the head aggregate includes are detected. The MR height is the length of each of the MR elements taken in the direction orthogonal to the medium facing surface.

According to the method of forming the medium facing surfaces as described above, it is possible to form the medium facing surfaces so that the MR heights are of a desired value. As a result, according to the method, a portion of each medium facing surface at which an end of the MR element is exposed is placed at a desired location. Furthermore, if the angle formed between the medium facing surface and the top surface of the substrate is 90 degrees, a portion of the medium facing surface at which an end face of the track width defining portion is exposed is placed at a desired location, too. As a result, the neck height is of a desired value, too.

In prior art, however, the angle formed between the medium facing surface and the top surface of the substrate is other than 90 degrees in some cases. This is caused by a shift in positions of the head aggregate and a jig with respect to each other, the jig supporting the head aggregate when the aggregate is lapped. If the angle formed between the medium facing surface and the top surface of the substrate is other than 90 degrees, the portion of the medium facing surface at which the end face of the track width defining portion is exposed is placed at a location other than the desired location even though the portion of the medium facing surface at which the end of the MR element is exposed is placed at the desired location. As a result, the neck height is of a value other than the desired value. In FIG. 73, the range indicated with numeral 203 shows a range of displacements in location of the portion of the medium facing surface at which the end face of the track width defining portion is exposed.

As described above, if the neck height is of a value other than the desired value, the track width is of a value other than the desired value, too. As thus described, the problem is that there are some cases in prior art in which the portion of the medium facing surface at which the end face of the track width defining portion is exposed is placed at a location other than the desired location, and the track width is of a value other than the desired value. As a result, the yield of magnetic heads is reduced.

OBJECT AND SUMMARY OF THE INVENTION

It is an object of the invention to provide a magnetic head and a method of manufacturing the same, and a magnetic head substructure each of which is provided for forming a medium facing surface at a desired location with accuracy.

Each of magnetic heads manufactured by first or second method of the invention comprises: a medium facing surface that faces toward a recording medium; a magnetoresistive element that has an end located in the medium facing surface and reads data written on the recording medium; a coil that generates a magnetic field corresponding to data to be written on the recording medium; and a pole layer that incorporates a track width defining portion having an end face located in the medium facing surface, allows a magnetic flux corresponding to the field generated by the coil to pass therethrough, and generates a write magnetic field for writing the data on the recording medium.

The first or second method of manufacturing the magnetic heads of the invention comprises the steps of fabricating a magnetic head substructure by forming a plurality of sets of the magnetoresistive element, the pole layer and the coil in a substrate, wherein a plurality of rows of pre-head portions that will be the respective magnetic heads later are aligned in the substructure; and fabricating the magnetic heads by separating the pre-head portions from one another through cutting the substructure.

In the first method of the invention, the step of fabricating the substructure includes the step of forming resistor elements each of which is located such that a portion thereof is exposed at the medium facing surface when the medium facing surface is formed, and each of which has a resistance that varies depending on a location of the end face of the track width defining portion along a direction orthogonal to the medium facing surface when the medium facing surface is formed. The distance between each of the resistor elements and the substrate is closer to the distance between the track width defining portion and the substrate than the distance between the magnetoresistive element and the substrate. The step of fabricating the magnetic heads includes the step of forming the medium facing surfaces by polishing a surface formed by cutting the substructure, while monitoring resistance values of the magnetoresistive elements and the resistor elements, so that the resistances of the magnetoresistive elements and the resistor elements are of respective specific values.

In the second method of the invention, the step of fabricating the substructure includes: the step of forming first resistor elements each of which is located such that a portion thereof is exposed at the medium facing surface when the medium facing surface is formed, and each of which has a resistance that varies depending on a location of the end of the magnetoresistive element along a direction orthogonal to the medium facing surface when the medium facing surface is formed; and the step of forming second resistor elements each of which is located such that a portion thereof is exposed at the medium facing surface when the medium facing surface is formed, and each of which has a resistance that varies depending on a location of the end face of the track width defining portion along the direction orthogonal to the medium facing surface when the medium facing surface is formed. The distance between each of the first resistor elements and the substrate is closer to the distance between the magnetoresistive element and the substrate than the distance between the track width defining portion and the substrate. The distance between each of the second resistor elements and the substrate is closer to the distance between the track width defining portion and the substrate than the distance between the magnetoresistive element and the substrate. The step of fabricating the magnetic heads includes the step of forming the medium facing surfaces by polishing a surface formed by cutting the substructure, while monitoring resistances of the first and second resistor elements, so that the resistances of the first and second resistor elements are of respective specific values.

In the first or second method of the invention, the angle formed between a top surface of the substrate and the medium facing surfaces may be controlled in the step of forming the medium facing surfaces.

In the first or second method of the invention, the resistance value of each of the resistor elements or the second resistor elements obtained after the medium facing surfaces are formed may correspond to the length of the track width defining portion taken in the direction orthogonal to the medium facing surfaces.

In the magnetic heads manufactured by the first or second method of the invention, the end face of the track width defining portion located in the medium facing surface may have: a first side close to the substrate; a second side located opposite to the first side; a third side connecting an end of the first side to an end of the second side; and a fourth side connecting the other end of the first side to the other end of the second side. In addition, the second side may define the track width, and the end face of the track width defining portion may have a width that decreases as the distance from the first side decreases.

In the first or second method of the invention, the step of fabricating the substructure may further include the step of forming an encasing layer having grooves that accommodate the pole layers, and the pole layers may be disposed in the grooves of the encasing layer.

In the first or second method of the invention, the step of forming the encasing layer may include the steps of forming a nonmagnetic layer that will be the encasing layer by forming the grooves therein later; forming a nonmagnetic conductive layer made of a nonmagnetic conductive material on a top surface of the nonmagnetic layer; patterning the nonmagnetic conductive layer so that penetrating openings are formed in the nonmagnetic conductive layer, each of the openings having a shape corresponding to a plane geometry of each of the pole layers, and the resistor elements or the second resistor elements are formed of portions of the nonmagnetic conductive layer; and forming the grooves in the nonmagnetic layer by selectively etching portions of the nonmagnetic layer exposed from the openings of the nonmagnetic conductive layer so that the nonmagnetic layer is formed into the encasing layer.

Alternatively, in the first or second method of the invention, the step of forming the encasing layer may include the steps of: forming a nonmagnetic layer that will be the encasing layer by forming the grooves therein later; forming a first conductive layer made of a nonmagnetic conductive material on a first region of a top surface of the nonmagnetic layer including a region in which the grooves will be formed later, and forming a second conductive layer made of a conductive material different from the material of the first conductive layer on a second region of the top surface of the nonmagnetic layer including a region in which the resistor elements or the second resistor elements will be disposed later; patterning the first and second conductive layers at the same time so that penetrating openings are formed in the first conductive layer, each of the openings having a shape corresponding to a plane geometry of each of the pole layers, and the resistor elements or the second resistor elements are formed of portions of the second conductive layer; and forming the grooves in the nonmagnetic layer by selectively etching portions of the nonmagnetic layer exposed from the openings of the first conductive layer so that the nonmagnetic layer is formed into the encasing layer.

In the first or second method of the invention, the step of fabricating the substructure may further include: the step of forming a polishing stopper layer that is disposed above the encasing layer and indicates a level at which polishing of a polishing step performed later is stopped; the step of forming a magnetic layer that will be the pole layer later, such that the grooves are filled with the magnetic layer and a top surface of the magnetic layer is located higher than a top surface of the polishing stopper layer; the step of forming a coating layer to cover the magnetic layer and the polishing stopper layer; and the polishing step of polishing the coating layer and the magnetic layer until the polishing stopper layer is exposed. In this case, the polishing stopper layer may be made of Ta or Ru.

In the first or second method of the invention, the resistor elements or the second resistor elements may be located in a region that will not remain in the magnetic heads, or a portion of each of the resistor elements or of each of the second resistor elements may be located in a region that will remain in the magnetic heads.

The magnetic heads manufactured by the first or second method of the invention may be those used for a perpendicular magnetic recording system.

A first or second magnetic head substructure of the invention is used for manufacturing magnetic heads. Each of the magnetic heads comprises: a medium facing surface that faces toward a recording medium; a magnetoresistive element that has an end located in the medium facing surface and reads data stored on the recording medium; a coil that generates a magnetic field corresponding to data to be written on the recording medium; and a pole layer that incorporates a track width defining portion having an end face located in the medium facing surface, allows a magnetic flux corresponding to the field generated by the coil to pass therethrough, and generates a write magnetic field for writing the data on the recording medium.

The first magnetic head substructure of the invention comprises: a substrate; a plurality of sets of the magnetoresistive element, the pole layer and the coil formed in the substrate such that a plurality of rows of pre-head portions that will be the respective magnetic heads later are aligned; and resistor elements each of which is located such that a portion thereof is exposed at the medium facing surface when the medium facing surface is formed, and each of which has a resistance that varies depending on a location of the end face of the track width defining portion along the direction orthogonal to the medium facing surface when the medium facing surface is formed. The distance between each of the resistor elements and the substrate is closer to the distance between the track width defining portion and the substrate than the distance between the magnetoresistive element and the substrate.

The second magnetic head substructure of the invention comprises: a substrate; a plurality of sets of the magnetoresistive element, the pole layer and the coil formed in the substrate such that a plurality of rows of pre-head portions that will be the respective magnetic heads later are aligned; first resistor elements each of which is located such that a portion thereof is exposed at the medium facing surface when the medium facing surface is formed, and each of which has a resistance that varies depending on a location of the end of the magnetoresistive element along a direction orthogonal to the medium facing surface when the medium facing surface is formed; and second resistor elements each of which is located such that a portion thereof is exposed at the medium facing surface when the medium facing surface is formed, and each of which has a resistance that varies depending on a location of the end face of the track width defining portion along the direction orthogonal to the medium facing surface when the medium facing surface is formed. The distance between each of the first resistor elements and the substrate is closer to the distance between the magnetoresistive element and the substrate than the distance between the track width defining portion and the substrate. The distance between each of the second resistor elements and the substrate is closer to the distance between the track width defining portion and the substrate than the distance between the magnetoresistive element and the substrate.

In the first or second substructure of the invention, the resistance value of each of the resistor elements or the second resistor elements obtained after the medium facing surfaces are formed may correspond to the length of the track width defining portion taken in the direction orthogonal to the medium facing surfaces.

In each of the magnetic heads manufactured through the use of the first or second substructure of the invention, the end face of the track width defining portion located in the medium facing surface may have: a first side close to the substrate; a second side located opposite to the first side; a third side connecting an end of the first side to an end of the second side; and a fourth side connecting the other end of the first side to the other end of the second side. In addition, the second side may define the track width, and the end face of the track width defining portion may have a width that decreases as a distance from the first side decreases.

The first or second substructure of the invention may further comprise an encasing layer having grooves that accommodate the pole layers.

The first or second substructure of the invention may further comprise a nonmagnetic conductive layer made of a nonmagnetic conductive material and disposed on the top surface of the encasing layer, wherein: the nonmagnetic conductive layer may have penetrating openings having edges located directly above edges of the grooves in the top surface of the encasing layer; and the resistor elements or the second resistor elements may be formed of portions of the nonmagnetic conductive layer.

Alternatively, the first or second substructure of the invention may further comprise a nonmagnetic conductive layer made of a nonmagnetic conductive material and disposed on a region of the top surface of the encasing layer that includes a region in which the grooves are formed but does not include a region in which the resistor elements are disposed, wherein: the nonmagnetic conductive layer may have penetrating openings having edges located directly above edges of the grooves in the top surface of the encasing layer; and the resistor elements or the second resistor elements may be made of a conductive material different from the material of the nonmagnetic conductive layer.

In the first or second substructure of the invention, the resistor elements or the second resistor elements may be located in a region that will not remain in the magnetic heads, or a portion of each of the resistor elements or of each of the second resistor elements may be located in a region that will remain in the magnetic heads.

The magnetic heads manufactured through the use of the first or second substructure of the invention may be those used for a perpendicular magnetic recording system.

A first or second magnetic head of the invention comprises: a medium facing surface that faces toward a recording medium; a magnetoresistive element that has an end located in the medium facing surface and reads data stored on the recording medium; a coil that generates a magnetic field corresponding to data to be written on the recording medium; and a pole layer that incorporates a track width defining portion having an end face located in the medium facing surface, allows a magnetic flux corresponding to the field generated by the coil to pass therethrough, and generates a write magnetic field for writing the data on the recording medium.

The first magnetic head further comprises: a substrate on which the magnetoresistive element, the pole layer and the coil are stacked; and a resistor element located such that a portion thereof is exposed at the medium facing surface, the resistor element having a resistance that varies depending on a location of the end face of the track width defining portion along the direction orthogonal to the medium facing surface. The distance between the resistor element and the substrate is closer to the distance between the track width defining portion and the substrate than the distance between the magnetoresistive element and the substrate.

The second magnetic head of the invention further comprises: a substrate on which the magnetoresistive element, the pole layer and the coil are stacked; a first resistor element located such that a portion thereof is exposed at the medium facing surface, the first resistor element having a resistance that varies depending on a location of the end of the magnetoresistive element along a direction orthogonal to the medium facing surface; and a second resistor element located such that a portion thereof is exposed at the medium facing surface, the second resistor element having a resistance that varies depending on a location of the end face of the track width defining portion along the direction orthogonal to the medium facing surface. The distance between the first resistor element and the substrate is closer to the distance between the magnetoresistive element and the substrate than the distance between the track width defining portion and the substrate. The distance between the second resistor element and the substrate is closer to the distance between the track width defining portion and the substrate than the distance between the magnetoresistive element and the substrate.

In the first or second magnetic head of the invention, the resistance of the resistor element or the second resistor element may correspond to the length of the track width defining portion taken in the direction orthogonal to the medium facing surface.

In the first or second magnetic head of the invention, the end face of the track width defining portion located in the medium facing surface may have: a first side close to the substrate; a second side located opposite to the first side; a third side connecting an end of the first side to an end of the second side; and a fourth side connecting the other end of the first side to the other end of the second side. In addition, the second side may define the track width, and the end face of the track width defining portion may have a width that decreases as the distance from the first side decreases.

The first or second magnetic head may further comprise an encasing layer having a groove that accommodates the pole layer.

The first or second magnetic head of the invention may further comprise a nonmagnetic conductive layer made of a nonmagnetic conductive material and disposed on the top surface of the encasing layer, wherein: the nonmagnetic conductive layer has a penetrating opening having an edge located directly above an edge of the groove in the top surface of the encasing layer; and the resistor element or the second resistor element is formed of a portion of the nonmagnetic conductive layer.

Alternatively, the first or second magnetic head of the invention may further comprise a nonmagnetic conductive layer made of a nonmagnetic conductive material and disposed on a region of the top surface of the encasing layer that includes a region in which the groove is formed but does not include a region in which the resistor element or the second resistor element is disposed, wherein: the nonmagnetic conductive layer has a penetrating opening having an edge located directly above an edge of the groove in the top surface of the encasing layer; and the resistor element or the second resistor element is made of a conductive material different from the material of the nonmagnetic conductive layer.

The first or second magnetic head of the invention may be one used for the perpendicular magnetic recording system.

According to the first method of manufacturing the magnetic heads, the first magnetic head substructure or the first magnetic head of the invention, it is possible to form the medium facing surface while monitoring the resistance values of the magnetoresistive element and the resistor element. It is thereby possible to from the medium facing surface at a desired location with accuracy.

According to the second method of manufacturing the magnetic heads, the second magnetic head substructure or the second magnetic head of the invention, it is possible to form the medium facing surface while monitoring the resistance values of the first and second resistor elements. It is thereby possible to from the medium facing surface at a desired location with accuracy.

In the first or second method of manufacturing the magnetic heads of the invention, the encasing layer having the grooves that accommodate the pole layers may be provided. In this case, the step of forming the encasing layer may include the steps of: forming the nonmagnetic layer that will be the encasing layer by forming the grooves therein later; forming the nonmagnetic conductive layer made of a nonmagnetic conductive material on the top surface of the nonmagnetic layer; patterning the nonmagnetic conductive layer so that penetrating openings are formed in the nonmagnetic conductive layer, each of the openings having a shape corresponding to the plane geometry of each of the pole layers, and the resistor elements or the second resistor elements are formed of portions of the nonmagnetic conductive layer; and forming the grooves in the nonmagnetic layer by selectively etching portions of the nonmagnetic layer exposed from the openings of the nonmagnetic conductive layer so that the nonmagnetic layer is formed into the encasing layer. In this case, it is possible to align the respective track width defining portions of the pole layers with respect to the resistor elements or the second resistor elements with precision, and it is thereby possible to make the length of each track width defining portion and the track width be of respective specific values with precision.

In the first or second method of manufacturing the magnetic heads of the invention, the step of forming the encasing layer may include the steps of: forming the nonmagnetic layer that will be the encasing layer by forming the grooves therein later; forming the first conductive layer made of a nonmagnetic conductive material on the first region of the top surface of the nonmagnetic layer including the region in which the grooves will be formed later, and forming the second conductive layer made of a conductive material different from the material of the first conductive layer on the second region of the top surface of the nonmagnetic layer including the region in which the resistor elements or the second resistor elements will be disposed later; patterning the first and second conductive layers at the same time so that penetrating openings are formed in the first conductive layer, each of the openings having a shape corresponding to the plane geometry of each of the pole layers, and the resistor elements or the second resistor elements are formed of portions of the second conductive layer; and forming the grooves in the nonmagnetic layer by selectively etching portions of the nonmagnetic layer exposed from the openings of the first conductive layer so that the nonmagnetic layer is formed into the encasing layer. In this case, it is possible to align the respective track width defining portions of the pole layers with respect to the resistor elements and the second resistor elements with precision, and it is thereby possible to make the length of each track width defining portion and the track width be of respective specific values with precision.

Other and further objects, features and advantages of the invention will appear more fully from the following description.

DETAILED DESCRIPTION OF THE PREFERRED EMBODIMENTS

First Embodiment

Figure 2:
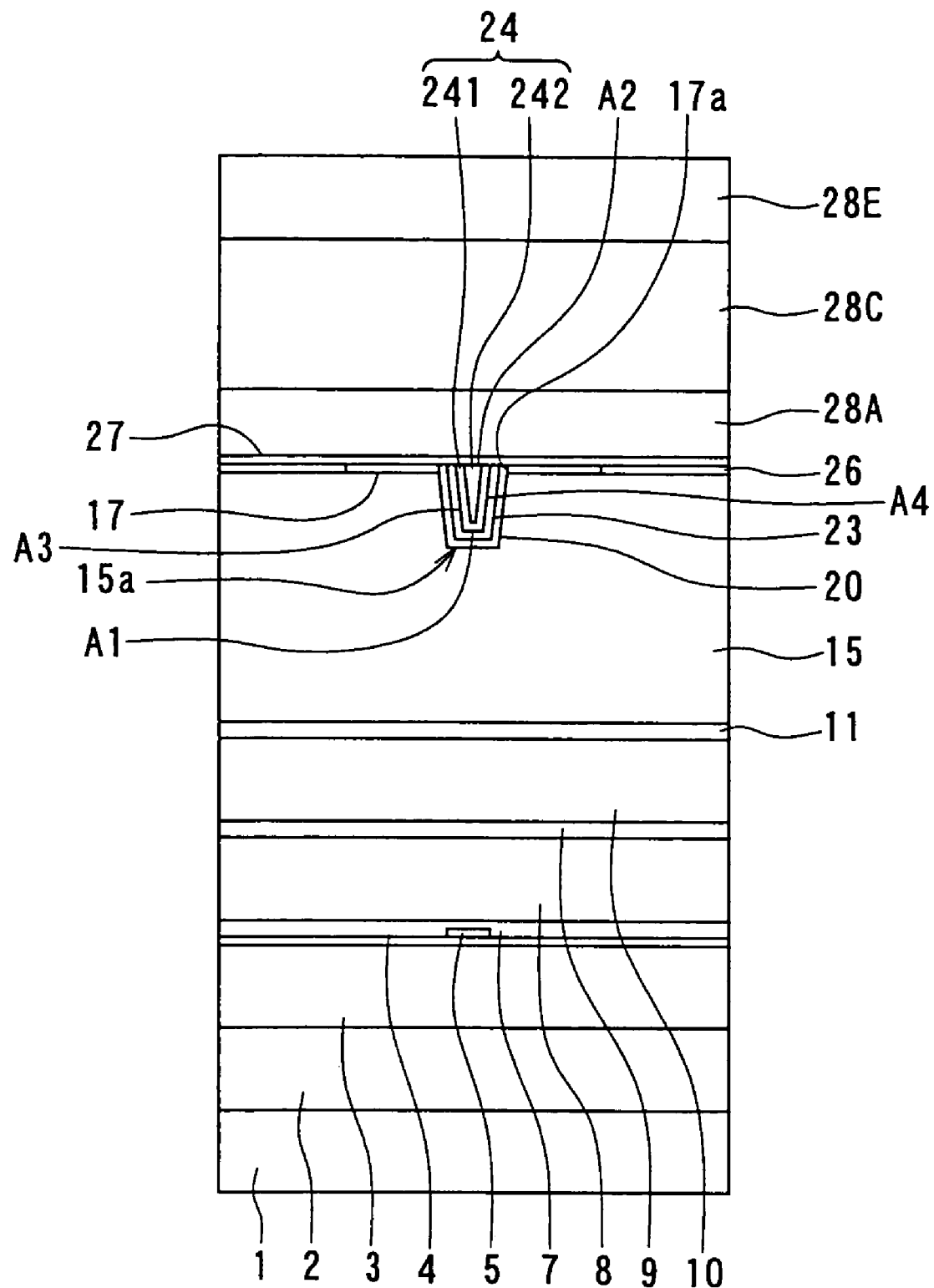
FIG. 2 is a front view of the medium facing surface of a magnetic head of the first embodiment of the invention.
Figure 3:
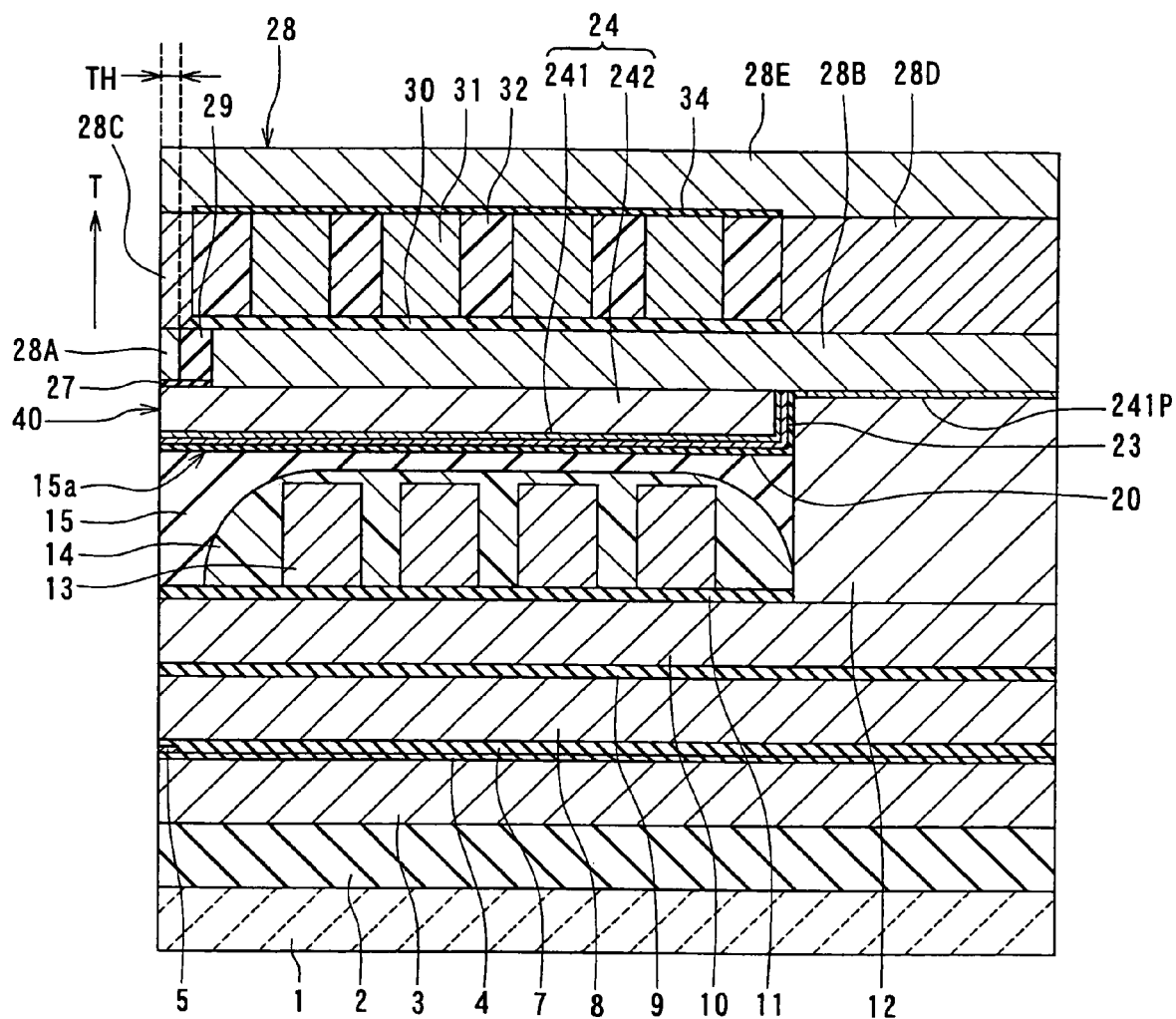
FIG. 3 is a cross-sectional view for illustrating the configuration of the magnetic head of the first embodiment of the invention.

Preferred embodiments of the invention will now be described in detail with reference to the accompanying drawings. Reference is now made to FIG. 2 and FIG. 3 to describe a manufacturing method and the configuration of a magnetic head manufactured through the use of a magnetic head substructure of a first embodiment of the invention. Here, a magnetic head for the perpendicular magnetic recording system will be described as an example of the magnetic head. FIG. 2 is a front view for illustrating the medium facing surface of the magnetic head of the embodiment. FIG. 3 is a cross-sectional view for illustrating the configuration of the magnetic head of the embodiment. FIG. 3 illustrates a cross section orthogonal to the medium facing surface and a surface of a substrate. The arrow indicated with T in FIG. 3 shows the direction of travel of a recording medium.

As shown in FIG. 2 and FIG. 3, the magnetic head of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; and a top shield gap film 7 that is an insulating film disposed on the MR element 5.

The MR element 5 has an end that is located in the medium facing surface 40 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element.

The magnetic head further comprises a first top shield layer 8, a nonmagnetic layer 9 and a second top shield layer 10 that are disposed on the top shield gap film 7 one by one. The first top shield layer 8 and the second top shield layer 10 are made of a magnetic material. The nonmagnetic layer 9 is made of a nonmagnetic material such as alumina. The portions from the bottom shield layer 3 to the second top shield layer 10 make up the read head.

The magnetic head further comprises an insulating layer 11 and a coupling layer 12 that are disposed on the second top shield layer 10. The insulating layer 11 is made of an insulating material such as alumina. The insulating layer 11 has an opening formed in a region at a distance from the medium facing surface 40. The coupling layer 12 is disposed on a region of the second top shield layer 10 where the opening of the insulating layer 11 is formed. The coupling layer 12 is made of a magnetic material.

The magnetic head further comprises: a coil 13 disposed on the insulating layer 11; and an insulating layer 14 made of an insulating material and disposed around the coil 13 and in the space between adjacent ones of the turns of the coil 13. The coil 13 is flat-whorl-shaped and made of a conductive material such as copper. The insulating layer 14 is made of photoresist, for example.

The magnetic head further comprises an encasing layer 15 made of a nonmagnetic material and disposed to cover the insulating layer 14. The encasing layer 15 has a groove 15a that opens in the top surface thereof and that accommodates the pole layer described later. The encasing layer 15 may be made of any of alumina, silicon oxide ($SiO_x$), and silicon oxynitride (SiON), for example.

The magnetic head further comprises a nonmagnetic conductive layer 17 made of a nonmagnetic conductive material and disposed on the top surface of the encasing layer 15. The nonmagnetic conductive layer 17 has an opening 17a that penetrates, and the edge of the opening 17a is located directly above the edge of the groove 15a in the top surface of the encasing layer 15. The nonmagnetic conductive layer 17 may be made of any of Ta, Mo, W, Ti, Ru, Rh, Re, Pt, Pd, Ir, NiCr, NiP, NiPd, NiB, $WSi_2$, $TaSi_2$, $TiSi_2$, TiN, and TiW, for example.

The magnetic head further comprises a nonmagnetic film 20, a polishing stopper layer 23 and the pole layer 24 that are disposed in the groove 15a. The nonmagnetic film 20 is disposed to touch the surface of the groove 15a. The pole layer 24 is disposed apart from the surface of the groove 15a. The polishing stopper layer 23 is disposed between the nonmagnetic film 20 and the pole layer 24. The pole layer 24 incorporates: a first layer 241 located closer to the surface of the groove 15a; and a second layer 242 located farther from the surface of the groove 15a.

The magnetic head further comprises a coating layer 26 disposed on the encasing layer 15 around the nonmagnetic conductive layer 17. The coating layer 26, the nonmagnetic conductive layer 17, the nonmagnetic film 20, the polishing stopper layer 23, and the pole layer 24 have flattened top surfaces.

The nonmagnetic film 20 may be made of an insulating material or a semiconductor material, for example. The insulating material as the material of the nonmagnetic film 20 may be any of alumina, silicon oxide ($SiO_x$), and silicon oxynitride (SiON). The semiconductor material as the material of the nonmagnetic film 20 may be polycrystalline silicon or amorphous silicon.

The polishing stopper layer 23 is made of a nonmagnetic conductive material. The material of the polishing stopper layer 23 may be the same as that of the nonmagnetic conductive layer 17.

Each of the first layer 241 and the second layer 242 is made of a magnetic material. The first layer 241 may be made of any of CoFeN, CoNiFe and NiFe, for example. The second layer 242 may be made of any of NiFe, CoNiFe and CoFe, for example.

The magnetic head further comprises a gap layer 27 disposed on the top surfaces of the nonmagnetic conductive layer 17 and the pole layer 24. The gap layer 27 has an opening located at a distance from the medium facing surface 40. The gap layer 27 may be made of an insulating material such as alumina or a nonmagnetic metal material such as Ru, NiCu, Ta, W or NiB.

The magnetic head further comprises a shield layer 28. The shield layer 28 has: a first layer 28A disposed on the gap layer 27; a second layer 28C disposed on the first layer 28A; a yoke layer 28B disposed on a portion of the pole layer 24 where the opening of the gap layer 27 is formed; a coupling layer 28D disposed on the yoke layer 28B; and a third layer 28E disposed to couple the second layer 28C to the coupling layer 28D. The first layer 28A, the yoke layer 28B, the second layer 28C, the coupling layer 28D and the third layer 28E are each made of a magnetic material. These layers 28A to 28E may be made of any of CoFeN, CoNiFe and NiFe, for example.

The magnetic head further comprises a nonmagnetic layer 29 made of a nonmagnetic material and disposed around the yoke layer 28B. A portion of the nonmagnetic layer 29 is disposed on a side of the first layer 28A. The nonmagnetic layer 29 is made of an inorganic insulating material such as alumina or coating glass. Alternatively, the nonmagnetic layer 29 may be made up of a layer of a nonmagnetic metal material and a layer of an insulating material disposed thereon. In this case, the nonmagnetic metal material may be a refractory metal such as Ta, Mo, Nb, W, Cr, Ru, Cu or Ni.

The magnetic head further comprises: an insulating layer 30 disposed on regions of the top surfaces of the yoke layer 28B and the nonmagnetic layer 29 in which a coil described later is disposed; the coil 31 disposed on the insulating layer 30; an insulating layer 32 disposed around the coil 31 and in the space between adjacent ones of the turns of the coil 31; and an insulating layer 34 disposed on the coil 31 and the insulating layer 32. The coil 31 is flat-whorl-shaped. A portion of the coil 31 passes between the second layer 28C and the coupling layer 28D. The coil 31 is made of a conductive material such as copper. The second layer 28C, the coupling layer 28D, the coil 31 and the insulating layer 32 have flattened top surfaces. The insulating layer 32 is made of photoresist, for example. The insulating layers 30 and 34 are made of alumina, for example.

The portions from the coil 13 to the third layer 28E of the shield layer 28 make up the write head. Although not shown, the magnetic head further comprises a protection layer for covering the shield layer 28.

As described so far, the magnetic head of the embodiment comprises the medium facing surface 40 that faces toward a recording medium, the read head, and the write head. The read head and the write head are stacked on the substrate 1. The read head is disposed backward in the direction T of travel of the recording medium (that is, on the air-inflow-end side of the slider). The write head is disposed forward in the direction T of travel of the recording medium (that is, on the air-outflow-end side of the slider).

The read head comprises the MR element 5 as the read element, and the bottom shield layer 3 and the first top shield layer 8 for shielding the MR element 5. Portions of the bottom shield layer 3 and the first top shield layer 8 that are located on a side of the medium facing surface 40 are opposed to each other, the MR element 5 being placed between these portions. The read head further comprises: the bottom shield gap film 4 disposed between the MR element 5 and the bottom shield layer 3; the top shield gap film 7 disposed between the MR element 5 and the first top shield layer 8; the second top shield layer 10 for shielding the read head and the write head from each other; and the nonmagnetic layer 9 disposed between the first top shield layer 8 and the second shield layer 10.

The write head comprises the coil 13, the encasing layer 15, the nonmagnetic conductive layer 17, the nonmagnetic film 20, the polishing stopper layer 23, the pole layer 24, the gap layer 27, the shield layer 28, and the coil 31. The coils 13 and 31 generate a magnetic field corresponding to data to be written on the recording medium. In FIG. 3, the second top shield layer 10 is magnetically coupled to the shield layer 28 through the coupling layer 12 and a magnetic layer 241P that will be described later. Alternatively, the second top shield layer 10 and the shield layer 28 may be magnetically separated from each other without providing the coupling layer 12. The coil 13 is not a component requisite for the write head and may be omitted.

The pole layer 24 has an end face located in the medium facing surface 40. The pole layer 24 allows the magnetic flux corresponding to the field generated by the coil 31 to pass therethrough and generates a write magnetic field for writing the data on the medium by using the perpendicular magnetic recording system.

The shield layer 28 has an end located in the medium facing surface 40, and has a portion located away from the medium facing surface 40 and coupled to the pole layer 24. The gap layer 27 is made of a nonmagnetic material and provided between the pole layer 24 and the shield layer 28.

In the medium facing surface 40, the end face of the shield layer 28 is disposed forward of the end face of the pole layer 24 along the direction T of travel of the recording medium with a specific space created by the thickness of the gap layer 27. At least part of the coil 31 is disposed between the pole layer 24 and the shield layer 28 and insulated from the pole layer 24 and the shield layer 28.

The pole layer 24 is disposed in the groove 15a of the encasing layer 15 with the nonmagnetic film 20 and the polishing stopper layer 23 disposed between the pole layer 24 and the groove 15a. The nonmagnetic conductive layer 17 is disposed on the top surface of the encasing layer 15. The nonmagnetic conductive layer 17 has the opening 17a that penetrates, and the edge of the opening 17a is located directly above the edge of the groove 15a in the top surface of the encasing layer 15. The nonmagnetic conductive layer 17 has a thickness that falls within a range of 20 to 60 nm inclusive, for example. The nonmagnetic film 20 has a thickness that falls within a range of 10 to 50 nm inclusive, for example. The polishing stopper layer 23 has a thickness that falls within a range of 40 to 70 nm inclusive, for example.

The pole layer 24 incorporates: the first layer 241 located closer to the surface of the groove 15a; and the second layer 242 located farther from the surface of the groove 15a. The first layer 241 has a thickness that falls within a range of 50 to 70 nm inclusive, for example.

The shield layer 28 has: the first layer 28A disposed adjacent to the gap layer 27; the second layer 28C disposed on a side of the first layer 28A farther from the gap layer 27; the yoke layer 28B disposed on the portion of the pole layer 24 where the opening of the gap layer 27 is formed; the coupling layer 28D disposed on the yoke layer 28B; and the third layer 28E disposed to couple the second layer 28C to the coupling layer 28D. The second layer 28C is disposed between the medium facing surface 40 and the at least part of the coil 31.

The first layer 28A has: a first end located in the medium facing surface 40; and a second end opposite to the first end. The second layer 28C also has: a first end located in the medium facing surface 40; and a second end opposite to the first end. The second end of the first layer 28A defines the throat height TH. That is, as shown in FIG. 3, the throat height TH is the minimum distance between the first end and the second end of the portion of the first layer 28A facing toward the pole layer 24 with the gap layer 27 disposed in between. The throat height TH falls within a range of 0.1 to 0.3 µm inclusive, for example. The minimum distance between the first end and the second end of the portion of the second layer 28C facing toward the pole layer 24 with the gap layer 27 and the first layer 28A disposed in between falls within a range of 0.5 to 0.8 µm inclusive, for example. The first layer 28A and the yoke layer 28B have a thickness that falls within a range of 0.3 to 0.8 µm inclusive, for example. The second layer 28C and the coupling layer 28D have a thickness that falls within a range of 2.0 to 2.5 µm inclusive, for example. The third layer 28E has a thickness that falls within a range of 2.0 to 3.0 µm inclusive, for example. The coil 31 has a thickness that is equal to or smaller than the thickness of the second layer 28C and that falls within a range of 2.0 to 2.5 µm inclusive, for example.

Figure 4:
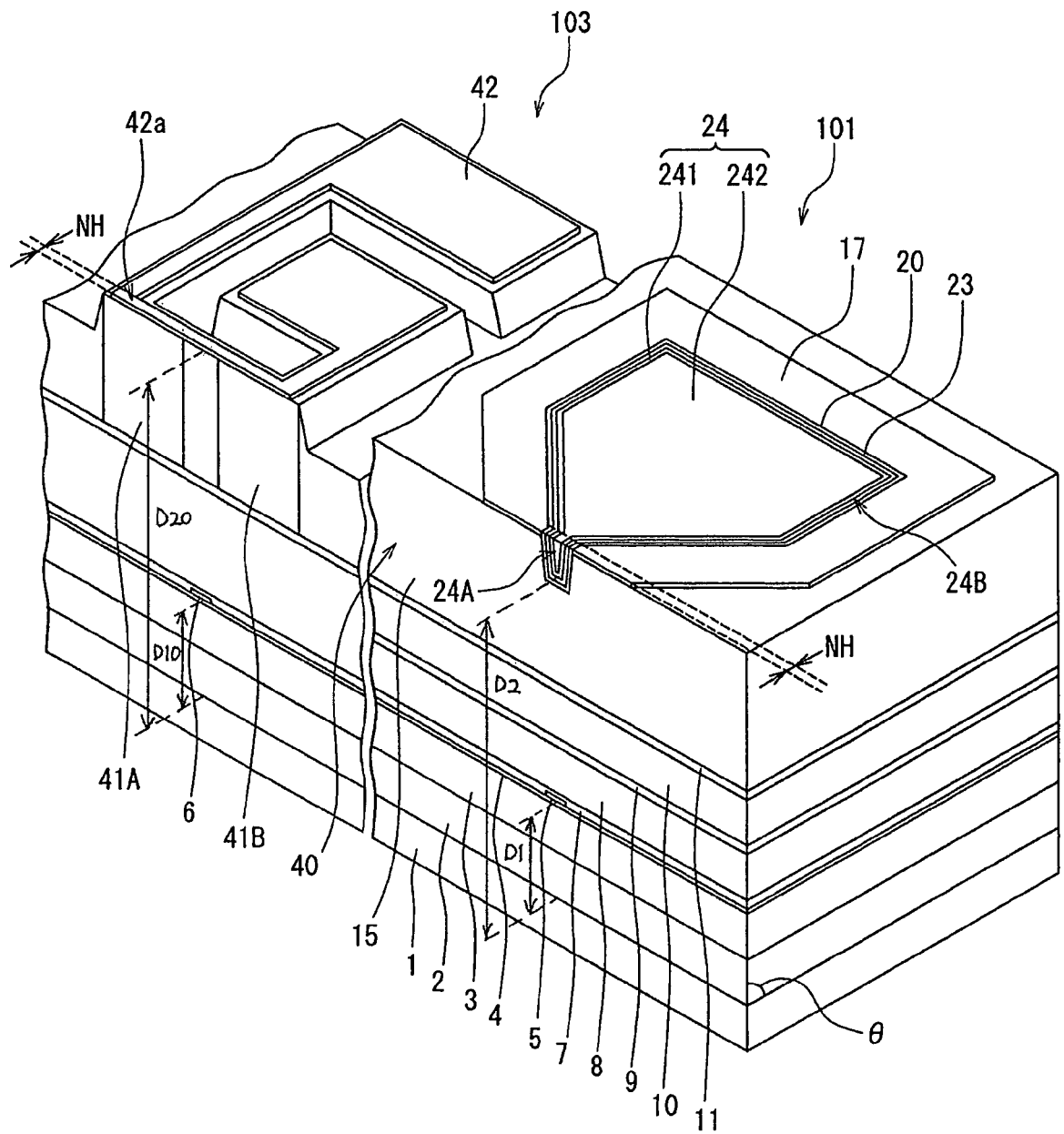
FIG. 4 is a perspective view of the main part of the magnetic head substructure of the first embodiment of the invention.

Reference is now made to FIG. 2 and FIG. 4 to describe the shape of the pole layer 24 in detail. FIG. 4 is a perspective view of the main part of the magnetic head substructure of the first embodiment. The magnetic head substructure is used for manufacturing the magnetic head of the embodiment. The configuration of the substructure will be described in detail later. As shown in FIG. 4, the pole layer 24 incorporates the track width defining portion 24A and a wide portion 24B. The track width defining portion 24A has an end located in the medium facing surface 40 and has a uniform width. The wide portion 24B is coupled to the other end of the track width defining portion 24A and has a width greater than the width of the track width defining portion 24A. The wide portion 24B is equal in width to the track width defining portion 24A at the interface with the track width defining portion 24A, and gradually increases in width as the distance from the medium facing surface 40 increases and then maintains a specific width to the end of the wide portion 24B. Here, the length of the track width defining portion 24A taken in the direction orthogonal to the medium facing surface 40 is called a neck height NH. The neck height NH falls within a range of 0.1 to 0.3 µm inclusive, for example.

As shown in FIG. 2, the end face of the track width defining portion 24A located in the medium facing surface 40 has: a first side A1 close to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 defines the track width. The width of the end face of the track width defining portion 24A located in the medium facing surface 40 decreases as the distance from the first side A1 decreases.

The length of the second side A2, that is, the track width, falls within a range of 0.08 to 0.12 µm inclusive, for example. The thickness of the pole layer 24 falls within a range of 0.20 to 0.30 µm inclusive, for example. Each of the third side A3 and the fourth side A4 forms an angle that falls within a range of 5 to 12 degrees inclusive, for example, with respect to the direction orthogonal to the top surface of the substrate 1. The thickness of the gap layer 27 falls within a range of 30 to 60 nm inclusive, for example.

The magnetic head of the embodiment writes data on a recording medium by using the write head and reads data written on the recording medium by using the read head. In the write head, the coil 31 generates a magnetic field that corresponds to the data to be written on the medium. The pole layer 24 and the shield layer 28 form a magnetic path through which a magnetic flux corresponding to the magnetic field generated by the coil 31 passes. The pole layer 24 allows the flux corresponding to the field generated by the coil 31 to pass and generates a write magnetic field used for writing the data on the medium through the use of the perpendicular magnetic recording system. The shield layer 28 takes in a disturbance magnetic field applied from outside the magnetic head to the magnetic head. It is thereby possible to prevent erroneous writing on the recording medium caused by the disturbance magnetic field intensively taken in into the pole layer 24.

According to the embodiment, in the medium facing surface 40, the end face of the shield layer 28 is disposed forward of the end face of the track width defining portion 24A along the direction T of travel of the recording medium (that is, on the air-outflow-end side of the slider) with a specific small space created by the gap layer 27. The location of an end of the bit pattern written on the recording medium is determined by the location of the end of the pole layer 24 that is closer to the gap layer 27 and located in the medium facing surface 40. The shield layer 28 takes in a magnetic flux generated from the end face of the pole layer 24 located in the medium facing surface 40 and extending in directions except the direction orthogonal to the surface of the recording medium so as to prevent the flux from reaching the recording medium. It is thereby possible to prevent the direction of magnetization of the bit pattern already written on the medium from being changed due to the effect of the above-mentioned flux. According to the embodiment, an improvement in linear recording density is thus achieved.

According to the embodiment, as shown in FIG. 2, the end face of the track width defining portion 24A located in the medium facing surface 40 has a width that decreases as the distance from the first side A1 decreases. It is thereby possible to prevent the problems resulting from the skew.

Figure 1:
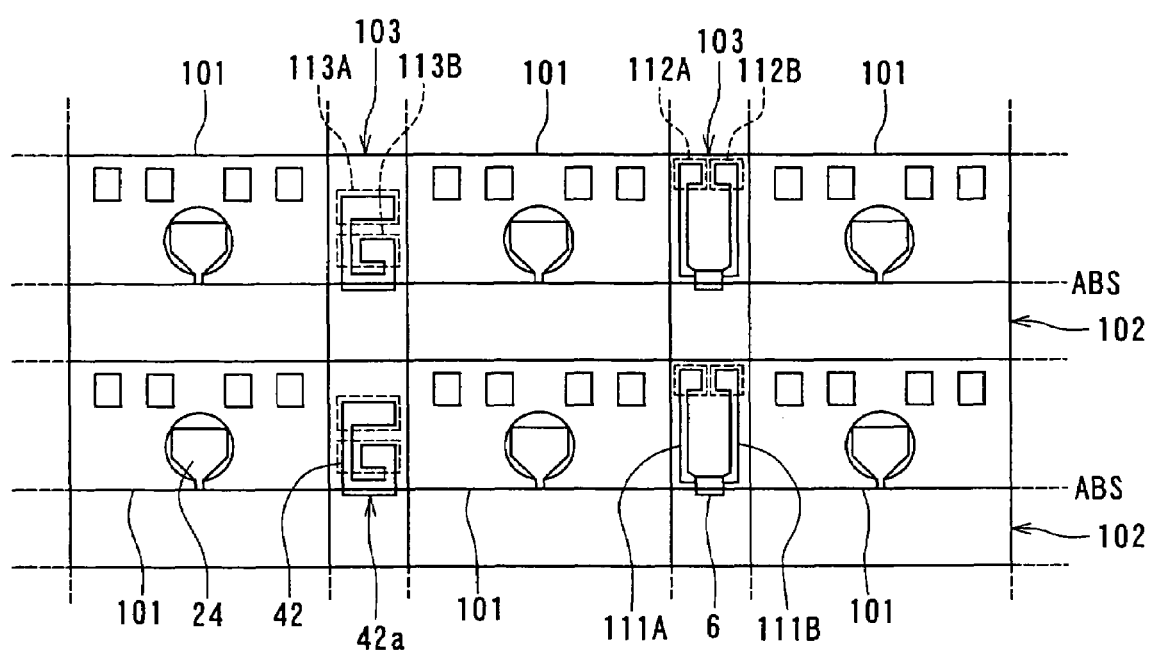
FIG. 1 illustrates the arrangement of main components of a magnetic head substructure of a first embodiment of the invention.

A method of manufacturing the magnetic head of the embodiment and the magnetic head substructure of the embodiment will now be described. FIG. 1 illustrates the arrangement of main components of the magnetic head substructure of the embodiment. The substructure comprises a plurality of rows of pre-head portions 101. The pre-head portions 101 are portions that will be magnetic heads later. In FIG. 1, 'ABS' indicates a region in which the medium facing surfaces will be formed. In the embodiment, a group of pre-head portions 101 arranged in the direction parallel to the region ABS, that is, in the horizontal direction of FIG. 1, is called a row of the pre-head portions 101.

The magnetic head substructure further comprises: inter-row portions 102 to be removed each of which is located between adjacent two rows; and intra-row portions 103 to be removed each of which is located between two of the pre-head portions 101 adjacent to each other in each row. Neither of the portions 102 and 103 will remain in the magnetic heads.

The method of manufacturing the magnetic head of the embodiment comprises the steps of: fabricating the magnetic head substructure in which a plurality of rows of pre-head portions 101 are aligned by forming components of a plurality of magnetic heads in a single substrate; and fabricating the magnetic heads by separating the pre-head portions 101 from one another through cutting the magnetic head substructure. Reference is now made to FIG. 5 to FIG. 42 to describe the step of fabricating the substructure in detail.

Figure 5:
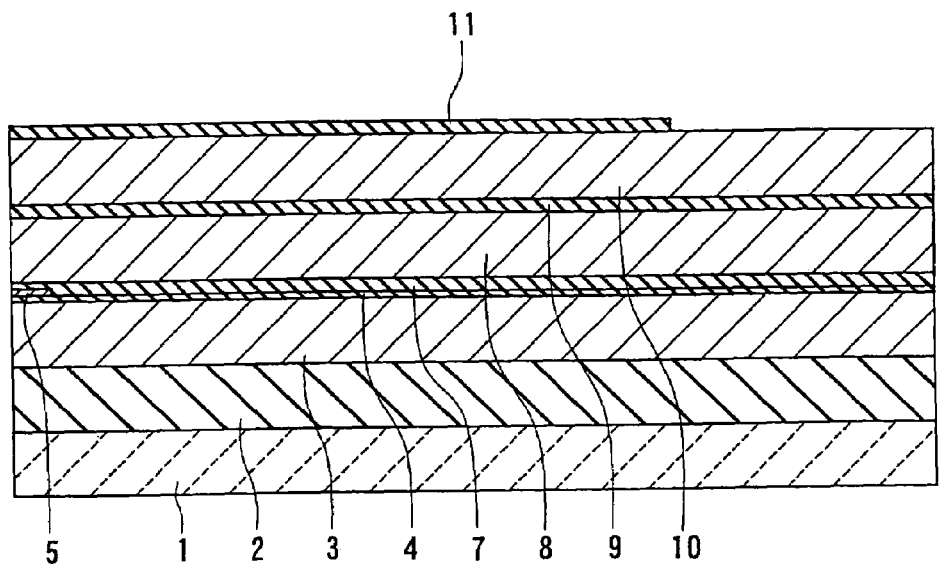
FIG. 5 is a cross-sectional view of a layered structure obtained in a step of a method of manufacturing the magnetic head of the first embodiment of the invention.
Figure 6:
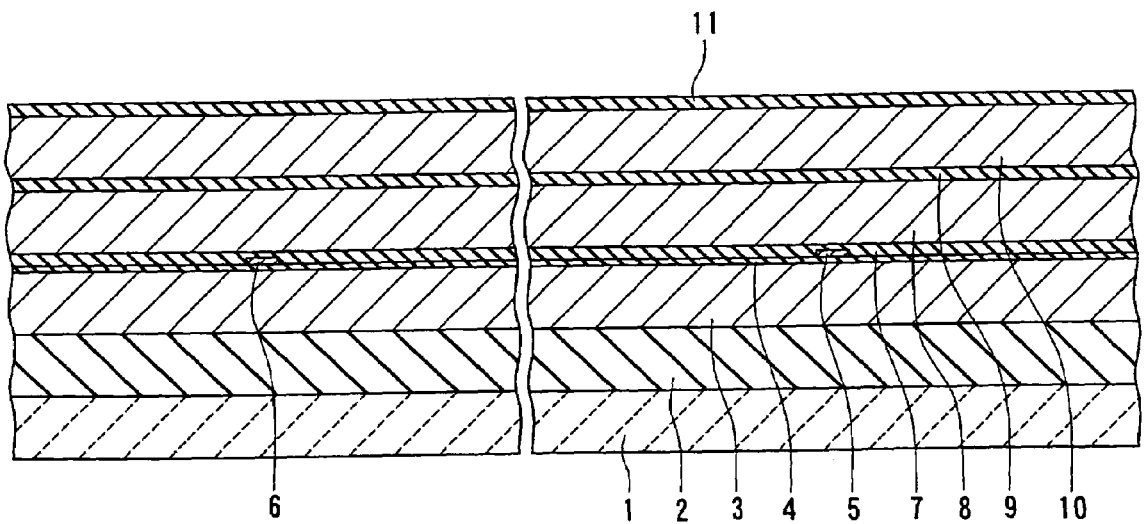
FIG. 6 is another cross-sectional view of the layered structure shown in FIG. 5.

FIG. 5 and FIG. 6 are cross-sectional views of a layered structure obtained in manufacturing process of the magnetic head of the embodiment. FIG. 5 shows a cross section of the layered structure orthogonal to the medium facing surface and the substrate. FIG. 6 shows a cross section of the layered structure taken in the position in which the medium facing surface is to be formed. FIG. 5 shows a cross section of the pre-head portion. In FIG. 6, the right-hand portion illustrates the cross section of the pre-head portion, and the left-hand portion illustrates the cross section of the intra-row portion to be removed.

According to the method of manufacturing the magnetic head of the embodiment, as shown in FIG. 5 and FIG. 6, the insulating layer 2, the bottom shield layer 3 and the bottom shield gap film 4 are first formed on the substrate 1 one by one. Next, the MR element 5 is formed on the bottom shield gap film 4 in the pre-head portion, and a first resistor element 6 is formed on the bottom shield gap film 4 in the intra-row portion to be removed. The first resistor element 6 is located such that a portion thereof is exposed at the medium facing surface when the medium facing surface is formed. The first resistor element 6 has a resistance that varies depending on the location of an end of the MR element 5 located in the medium facing surface along the direction orthogonal to the medium facing surface when the medium facing surface is formed. The first resistor element 6 may be made of any conductive material as long as the material has a relatively high resistivity. The material of the first resistor element 6 may be the same as that of the MR element 5. Next, although not shown, two leads connected to the MR element 5 and two leads connected to the first resistor element 6 are formed. Next, the top shield gap film 7 is formed to cover the MR element 5, the first resistor element 6 and the leads. Next, the first top shield layer 8, the nonmagnetic layer 9, the second top shield layer 10 and the insulating layer 11 are formed one by one on the top shield gap film 7. Next, a portion of the insulating layer 11 where the coupling layer 12 is to be formed is selectively etched to form an opening in the insulating layer 11. If the coupling layer 12 is not to be provided, it is not necessary to form the opening in the insulating layer 11.

Figure 7:
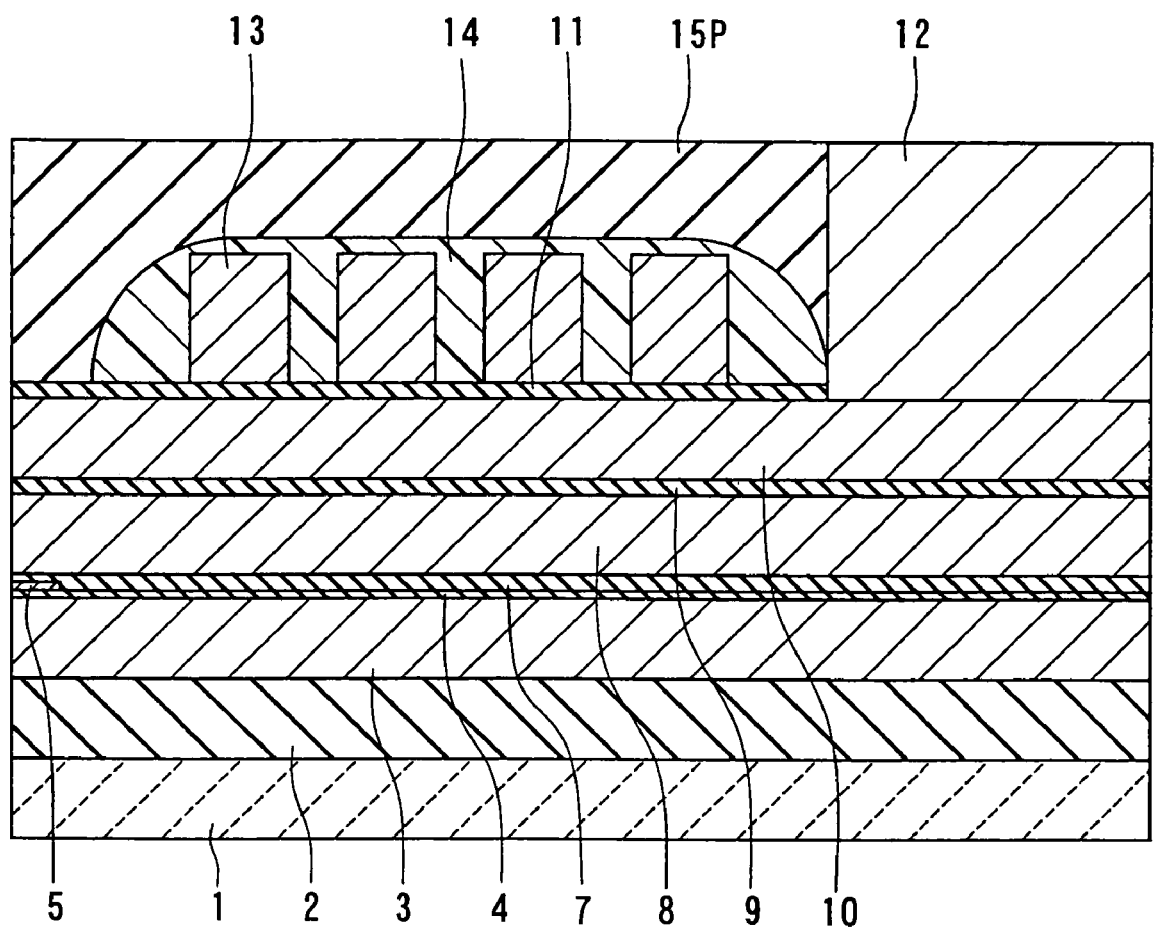
FIG. 7 is a cross-sectional view of the layered structure obtained in a step that follows the step shown in FIG. 5.
Figure 8:
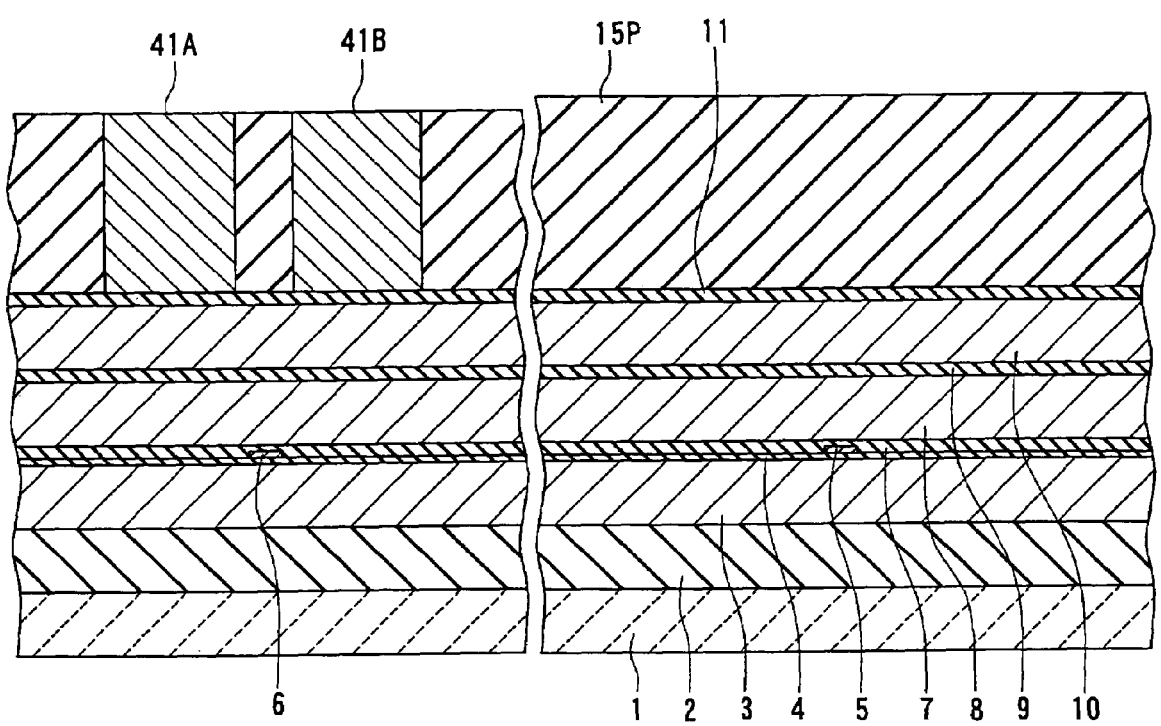
FIG. 8 is another cross-sectional view of the layered structure shown in FIG. 7.
Figure 9:
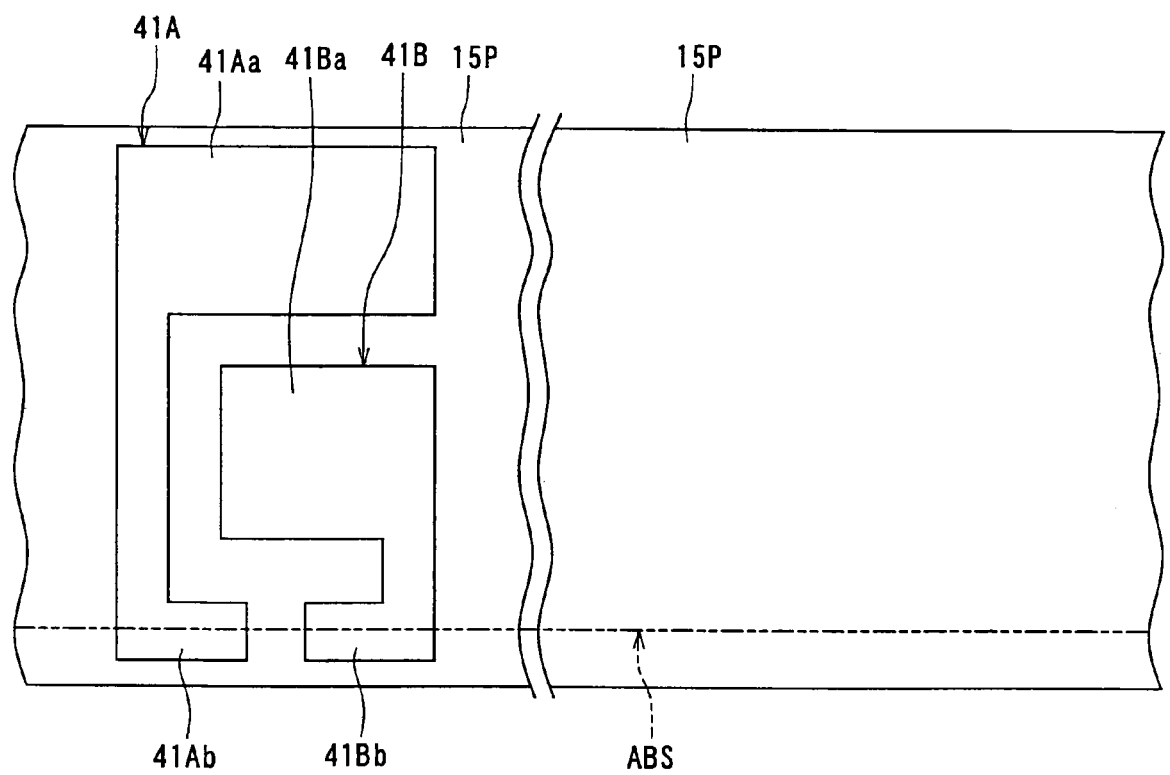
FIG. 9 is a top view of the layered structure shown in FIG. 7.

FIG. 7 to FIG. 9 illustrate the following step. FIG. 7 shows a cross section of the layered structure orthogonal to the medium facing surface and the substrate. FIG. 8 shows a cross section of the layered structure taken in the position in which the medium facing surface is to be formed. FIG. 9 shows the top surface of the layered structure. The positions of the cross sections of FIG. 7 and FIG. 8 are the same as those of FIG. 5 and FIG. 6, respectively. In FIG. 9, the right-hand portion illustrates the top surface of the layered structure of the pre-head portion, and the left-hand portion illustrates the top surface of the layered structure of the intra-row portion to be removed. In FIG. 9, 'ABS' indicates the region in which the medium facing surfaces are to be formed.

In the step, first, the coil 13 is formed by frame plating, for example, on the insulating layer 11. Next, the insulating layer 14 is formed to cover the coil 13. Next, in the pre-head portion, the coupling layer 12 is formed on the second top shield layer 10 in the region in which the opening of the insulating layer 11 is formed. In addition, in the intra-row portion to be removed, electrode layers 41A and 41B are formed by frame plating, for example, on the insulating layer 11. The electrode layers 41A and 41B are made of a conductive material. The electrode layers 41A and 41B may be made of a material the same as that of the coupling layer 12, and the coupling layer 12 and the electrode layers 41A and 41B may be formed at the same time. Alternatively, the coil 13 and the insulating layer 14 may be formed after the coupling layer 12 and the electrode layers 41A and 41B are formed. Next, a nonmagnetic layer 15P having a thickness of 3 to 4 μm, for example, is formed on the entire top surface of the layered structure. Next, the nonmagnetic layer 15P is polished by chemical mechanical polishing (hereinafter referred to as CMP), for example, so that the coupling layer 12 and the electrode layers 41A and 41B are exposed. The nonmagnetic layer 15P is a layer to be the encasing layer 15 by forming the groove 15a therein later. Next, in the intra-row portion to be removed, the entire top surface of the layered structure is etched by an amount equal to the thickness of an insulating layer 22 that will be formed later.

As shown in FIG. 9, the electrode layer 41A incorporates: a wide portion 41Aa located in a region at a distance from the region ABS; and an arm portion 41Ab extending from the wide portion 41Aa to the region ABS. Similarly, the electrode layer 41B incorporates: a wide portion 41Ba located in a region at a distance from the region ABS; and an arm portion 41Bb extending from the wide portion 41Ba to the region ABS. Ends of the arm portions 41Ab and 41Bb farther from the wide portions 41Aa and 41Ba are located in a region including the region ABS such that these ends are opposed to each other at a specific distance from each other.

Figure 10:
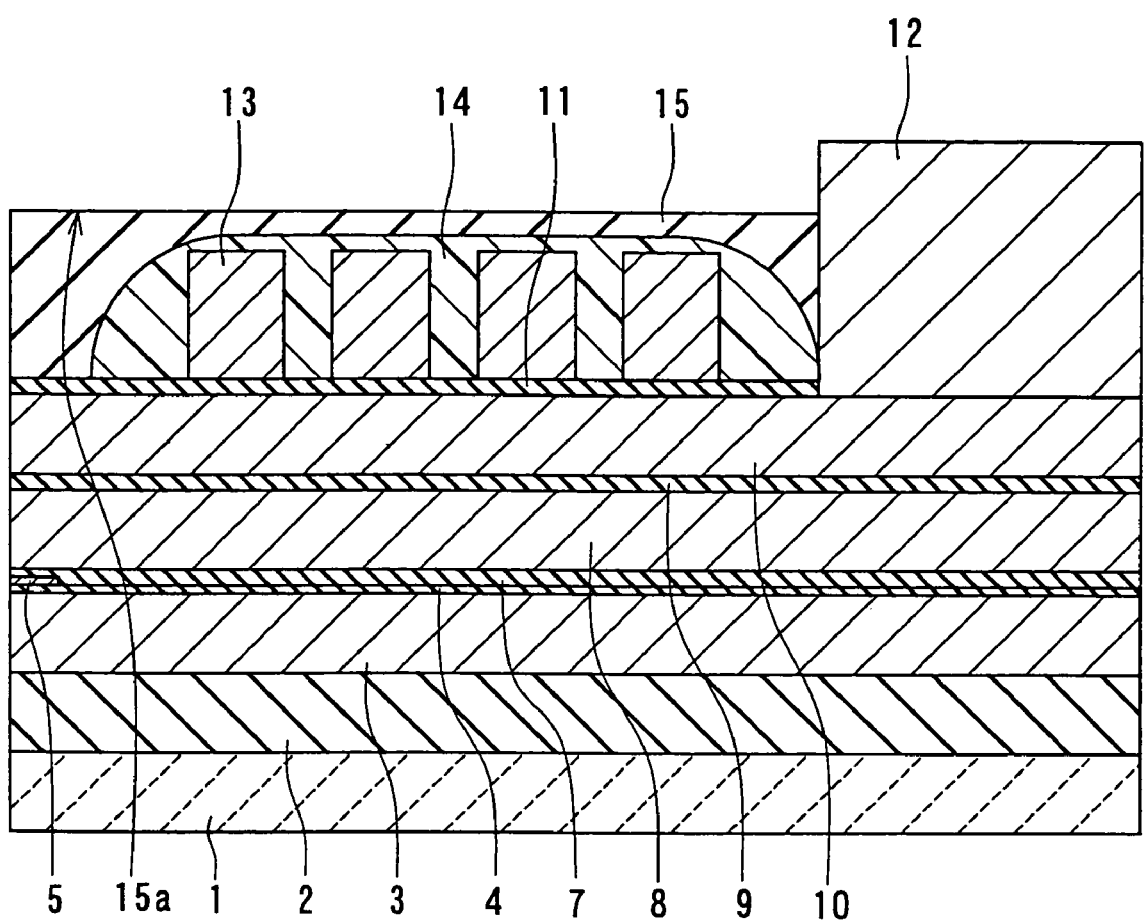
FIG. 10 is a cross-sectional view of the layered structure obtained in a step that follows the step shown in FIG. 7.
Figure 11:
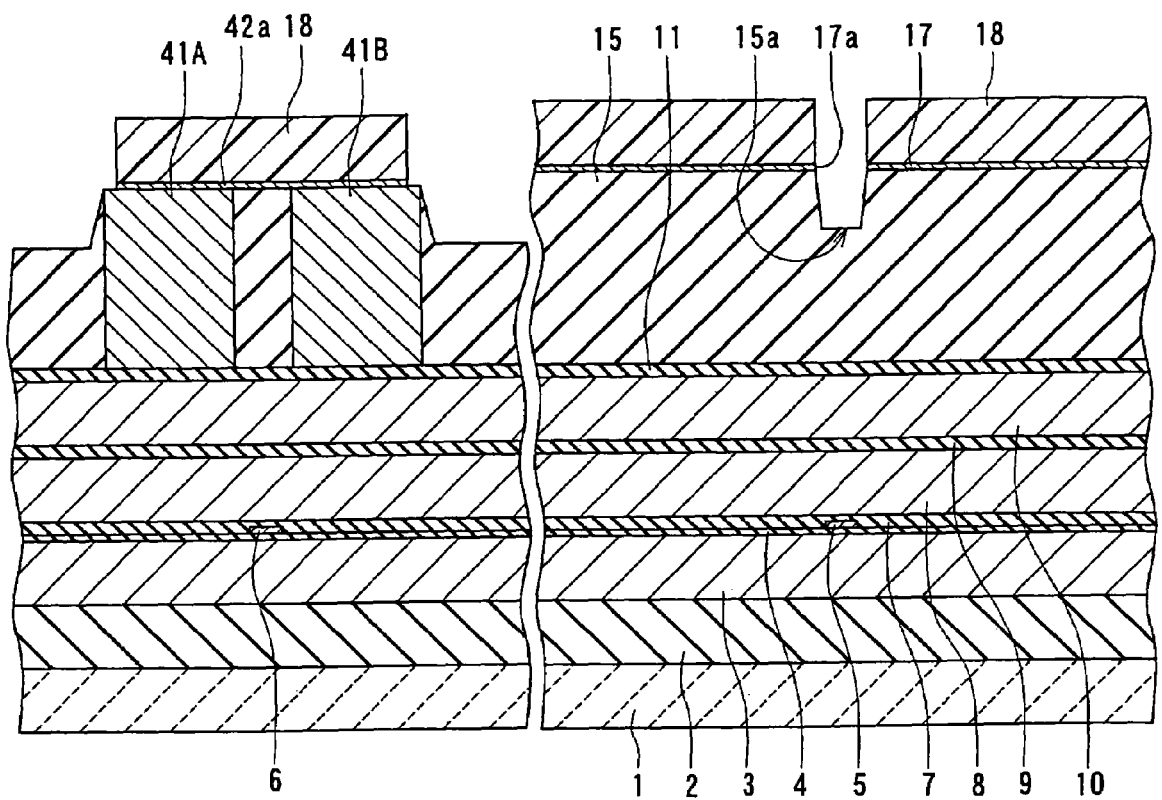
FIG. 11 is another cross-sectional view of the layered structure shown in FIG. 10.
Figure 12:
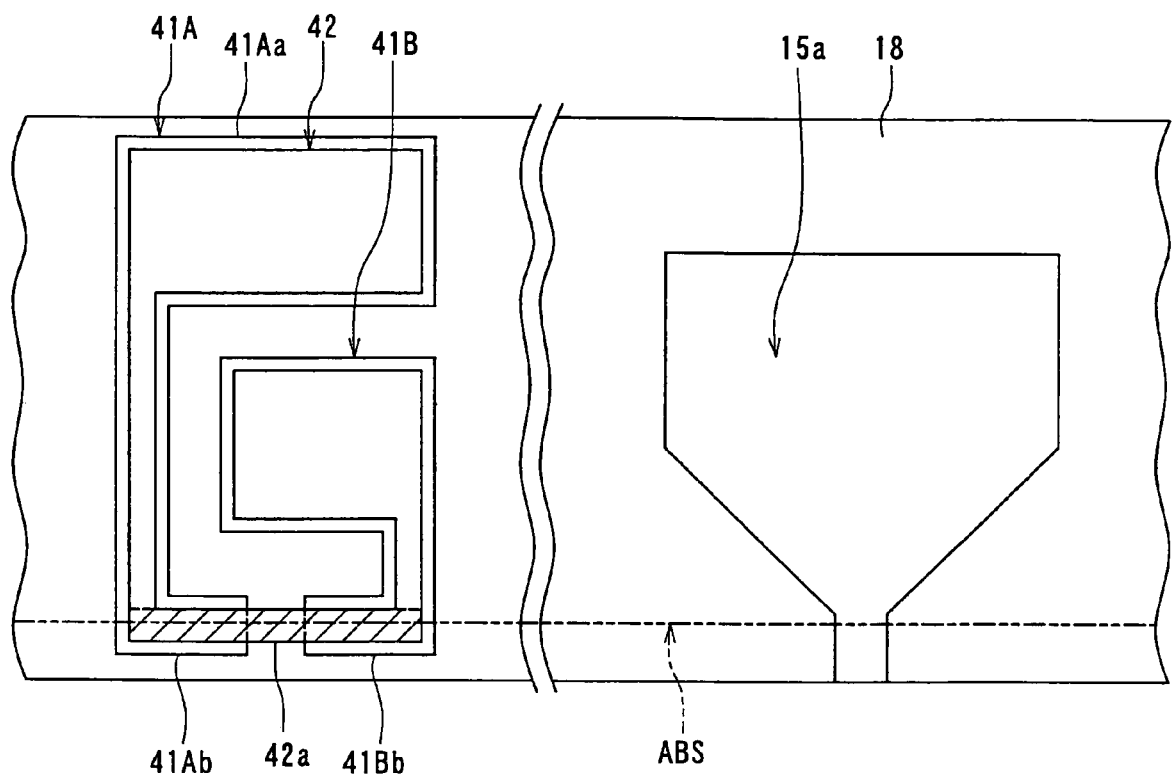
FIG. 12 is a top view of the layered structure shown in FIG. 10.

FIG. 10 to FIG. 12 illustrate the following step. FIG. 10 shows a cross section of the layered structure orthogonal to the medium facing surface and the substrate. FIG. 11 shows a cross section of the layered structure taken in the position in which the medium facing surface is to be formed. FIG. 12 shows the top surface of the layered structure. The positions of the cross sections of FIG. 10 and FIG. 11 are the same as those of FIG. 5 and FIG. 6, respectively. In FIG. 12, the right-hand portion illustrates the top surface of the layered structure of the pre-head portion, and the left-hand portion illustrates the top surface of the layered structure of the intra-row portion to be removed.

In the step, first, a nonmagnetic conductive layer 17 is formed by sputtering, for example, on the nonmagnetic layer 15P. Next, a photoresist layer having a thickness of 1.0 μm, for example, is formed on the nonmagnetic conductive layer 17. The photoresist layer is then patterned to form a mask 18 for making the groove 15a and a resistor layer 42 described later. In the pre-head portion, the mask 18 has an opening having a shape corresponding to the groove 15a. In the intra-row portion to be removed, the mask 18 is located only in the region in which the resistor layer 42 is to be located.

Next, the nonmagnetic conductive layer 17 is selectively etched using the mask 18. The opening 17a that penetrates is thereby formed in the nonmagnetic conductive layer 17 in the pre-head portion. The opening 17a has a shape corresponding to the plane geometry of a magnetic layer 240 to be formed later. A portion of the magnetic layer 240 will be formed into the pole layer 24. Through the selective etching of the nonmagnetic conductive layer 17, the remaining portion of the nonmagnetic conductive layer 17 is formed into the resistor layer 42 in the intra-row portion to be removed. In FIG. 12, the intra-row portion is shown without the mask 18 for clarity.

The resistor layer 42 is located in a region including a region on the top surface of the electrode layers 41A and 41B and a region on the nonmagnetic layer 15P between the ends of the arm portions 41Ab and 41Bb. The resistor layer 42 includes a rectangle-shaped portion located in a region including the region ABS. This rectangle-shaped portion is defined as a second resistor element 42a. In FIG. 12, the second resistor element 42a is indicated with hatching for clarity. The second resistor element 42a is located such that a portion thereof is exposed at the medium facing surface when the medium facing surface is formed. The second resistor element 42a has a resistance that varies depending on the location of the end face of the track width defining portion 24A located in the medium facing surface along the direction orthogonal to the medium facing surface when the medium facing surface is formed. In the embodiment, the opening 17a of the nonmagnetic conductive layer 17 and the second resistor element 42a are patterned at the same time.

Next, the nonmagnetic layer 15P is selectively etched using the mask 18. As a result, in the pre-head portion, a portion of the nonmagnetic layer 15P exposed from the opening 17a of the nonmagnetic conductive layer 17 is etched and the groove 15a is thereby formed in the nonmagnetic layer 15P. In the intra-row portion to be removed, a groove is formed in a portion of the nonmagnetic layer 15P that is not covered with the mask 18. Next, the mask 18 is removed. The nonmagnetic layer 15P is formed into the encasing layer 15 by forming the groove 15a therein. The edge of the opening 17a of the nonmagnetic conductive layer 17 is located directly above the edge of the groove 15a located in the top surface of the encasing layer 15.

The etching of each of the nonmagnetic conductive layer 17 and the nonmagnetic layer 15P is performed by reactive ion etching or ion beam etching, for example. The etching for forming the groove 15a in the nonmagnetic layer 15P is performed such that the walls of the groove 15a corresponding to both sides of the track width defining portion 24A of the pole layer 24 each form an angle that falls within a range of 5 to 12 degrees inclusive, for example, with respect to the direction orthogonal to the top surface of the substrate 1.

Next, the opening 17a of the nonmagnetic conductive layer 17 is observed using an electron microscope. It is preferred to use a critical dimension measurement scanning electron microscope as the electron microscope. Since the edge of the opening 17a is located directly above the edge of the groove 15a located in the top surface of the encasing layer 15, the shape of the opening 17a coincides with the shape of the groove 15a taken in the top surface of the encasing layer 15. Therefore, it is possible to obtain the shape of the groove 15a taken in the top surface of the encasing layer 15 by observing the opening 17a.

As shown in FIG. 2, the track width is equal to the length of the second side A2 of the end face of the track width defining portion 24A located in the medium facing surface 40. The track width is of a value obtained by subtracting twice the thickness of the nonmagnetic film 20 and twice the thickness of the polishing stopper layer 23 from the width of the groove 15a in the top surface of the encasing layer 15 in the location of the region ABS. It is possible to control the thicknesses of the nonmagnetic film 20 and the polishing stopper layer 23 with accuracy. Therefore, it is possible to obtain the track width by measuring the width of the groove 15a in the top surface of the encasing layer 15 in the location of the region ABS.

A case is now assumed wherein the nonmagnetic conductive layer 17 is not disposed on the top surface of the encasing layer 15 and the encasing layer 15 is made of an insulating material such as alumina. In this case, if an attempt is made to observe the groove 15a in the top surface of the encasing layer 15 by an electron microscope, electric charges accumulate on the top surface of the encasing layer 15 and it is impossible to obtain a correct image. According to the embodiment, in contrast, the nonmagnetic conductive layer 17 made of a conductive material is disposed on the top surface of the encasing layer 15. In addition, the edge of the opening 17a of the nonmagnetic conductive layer 17 is located directly above the edge of the groove 15a located in the top surface of the encasing layer 15. As a result, a correct image is obtained when the nonmagnetic conductive layer 17 is observed by an electron microscope, and it is thereby possible to measure the geometry of the opening 17a of the nonmagnetic conductive layer 17 with accuracy. It is thereby possible to measure the geometry of the groove 15a in the top surface of the encasing layer 15 with accuracy.

When the width of the groove 15a in the top surface of the encasing layer 15 in the location of the region ABS is measured by an electron microscope as described above, the width of the bottom of the groove 15a in the location of the region ABS may be measured at the same time. It is possible by calculation to obtain the angle formed by the wall of the groove 15a with respect to the direction orthogonal to the top surface of the substrate 1 if the depth of the groove 15a is obtained in addition to the width of the groove 15a in the top surface of the encasing layer 15 and the width of the bottom of the groove 15a. Here, it is possible to obtain the depth of the groove 15a by preparing a sample for measuring the depth of the groove 15a, cutting the sample so that the cross section shown in FIG. 11 appears, and observing the cross section by a scanning electron microscope, for example. If the nonmagnetic layer 15P is etched by reactive ion etching, the etching rate of the nonmagnetic layer 15P is nearly constant. Consequently, as long as the etching period is constant, the depth of the groove 15a is nearly uniform, too. Therefore, if the depth of the groove 15a is measured in advance by using the sample for measuring the depth, the depth of the groove 15a is obtained without measuring in the course of manufacturing process of the magnetic head.

Figure 13:
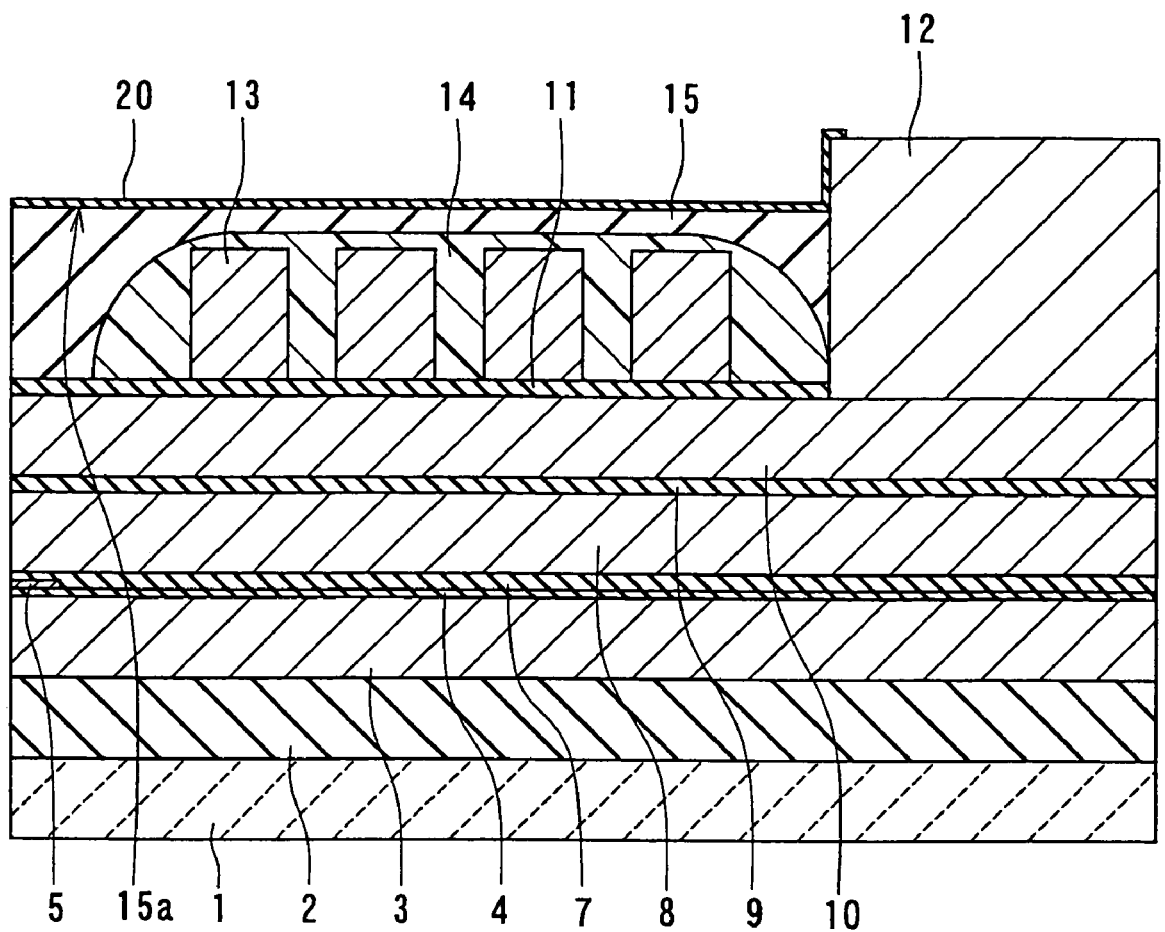
FIG. 13 is a cross-sectional view of the layered structure obtained in a step that follows the step shown in FIG. 10.
Figure 14:
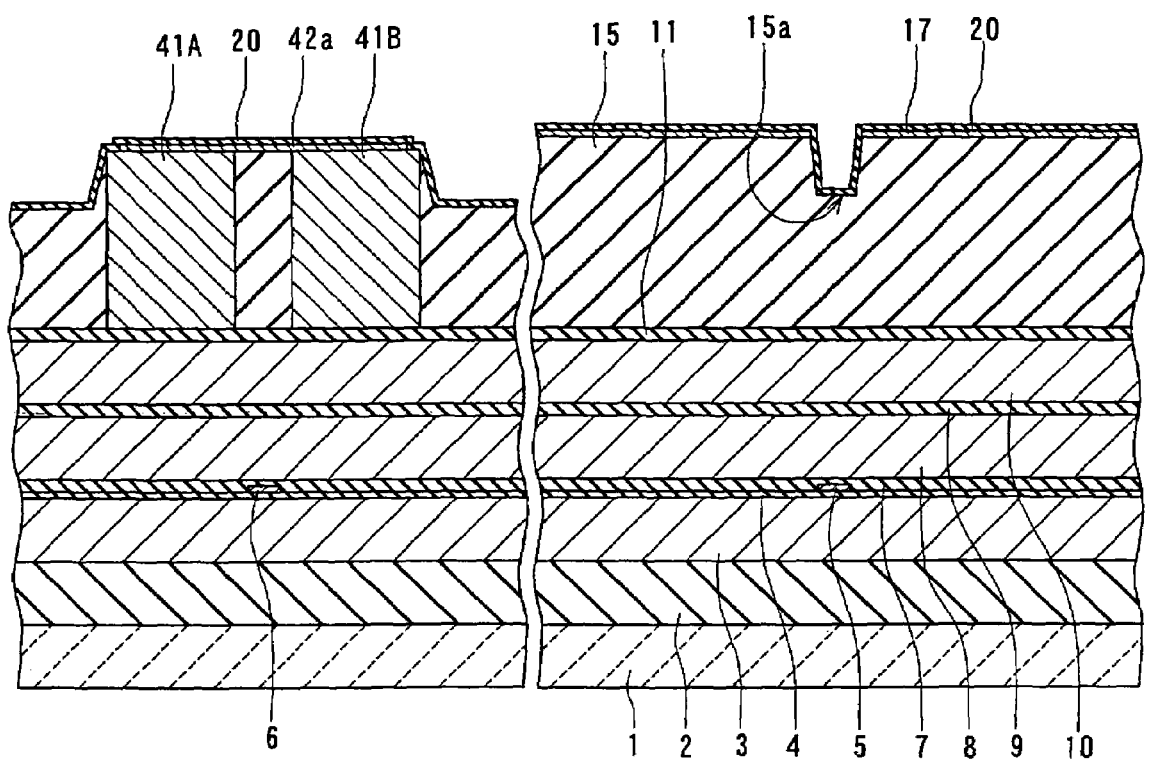
FIG. 14 is another cross-sectional view of the layered structure shown in FIG. 13.
Figure 15:
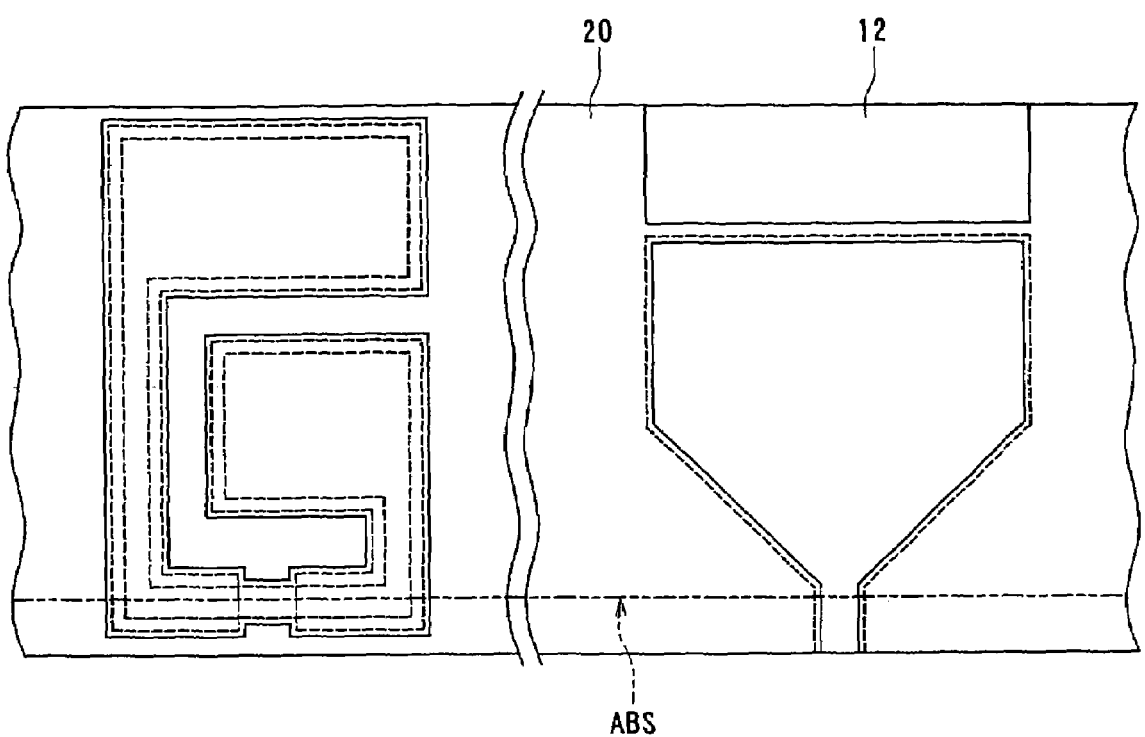
FIG. 15 is a top view of the layered structure shown in FIG. 13.

FIG. 13 to FIG. 15 illustrate the following step. FIG. 13 shows a cross section of the layered structure orthogonal to the medium facing surface and the substrate. FIG. 14 shows a cross section of the layered structure taken in the position in which the medium facing surface is to be formed. FIG. 15 shows the top surface of the layered structure. The positions of the cross sections of FIG. 13 and FIG. 14 are the same as those of FIG. 5 and FIG. 6, respectively. In FIG. 15, the right-hand portion illustrates the top surface of the layered structure of the pre-head portion, and the left-hand portion illustrates the top surface of the layered structure of the intra-row portion to be removed.

In the step, first, the nonmagnetic film 20 is formed on the entire top surface of the layered structure. The nonmagnetic film 20 is formed in the groove 15a of the encasing layer 15, too. The nonmagnetic film 20 may be formed by sputtering or chemical vapor deposition (CVD), for example. It is possible to control the thickness of the nonmagnetic film 20 with precision. If the nonmagnetic film 20 is formed by CVD, it is preferred to employ a method called 'atomic layer CVD' (ALCVD) in which formation of a single atomic layer is repeated. In this case, it is possible to control the thickness of the nonmagnetic film 20 with higher precision. If the nonmagnetic film 20 is formed by ALCVD, the nonmagnetic film 20 is preferably made of alumina. If the nonmagnetic film 20 is made of a semiconductor material, it is preferred to form the nonmagnetic film 20 by ALCVD at a low temperature (around 200° C.) or by low-pressure CVD at a low temperature. The semiconductor material as the material of the nonmagnetic film 20 is preferably undoped polycrystalline silicon or amorphous silicon.

Next, a portion of the nonmagnetic film 20 located on the top surface of the coupling layer 12 is selectively etched to from an opening in the nonmagnetic film 20. If the coupling layer 12 is not to be provided, it is not necessary to form the opening in the nonmagnetic film 20.

Figure 16:
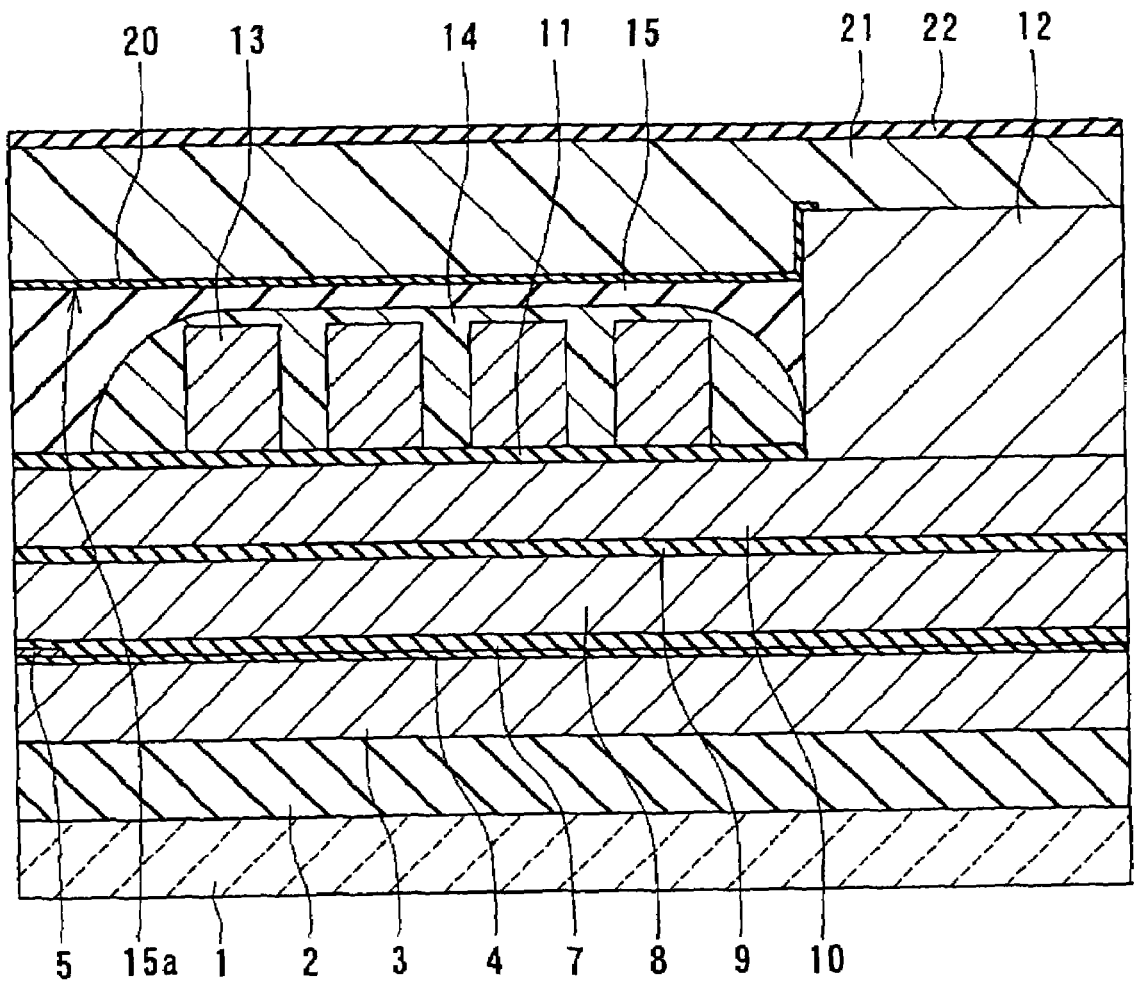
FIG. 16 is a cross-sectional view of the layered structure obtained in a step that follows the step shown in FIG. 13.
Figure 17:
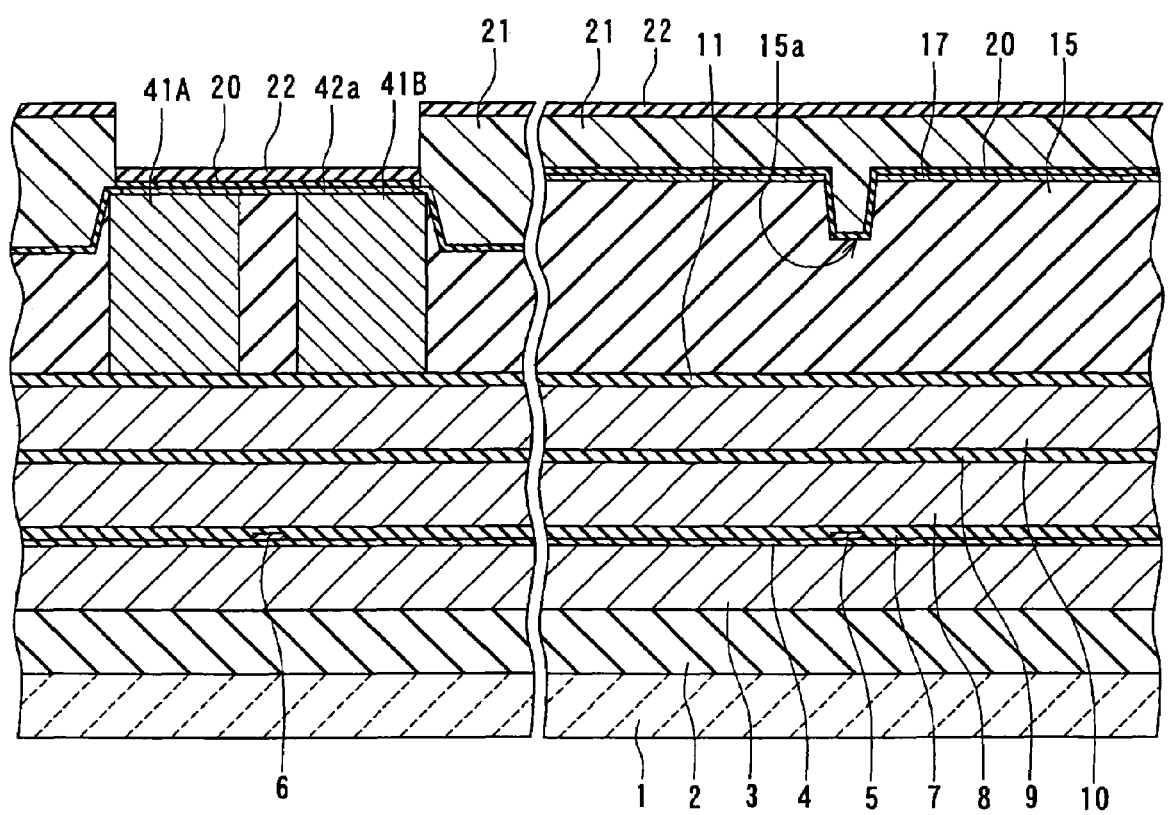
FIG. 17 is another cross-sectional view of the layered structure shown in FIG. 16.
Figure 18:
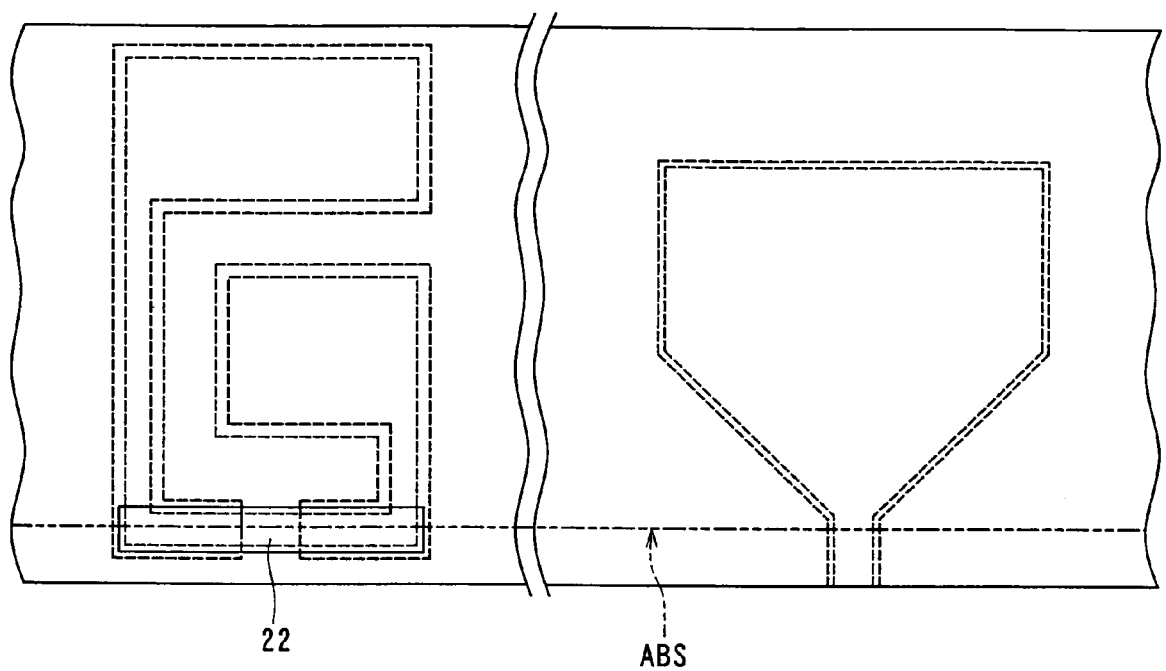
FIG. 18 is a top view of the layered structure shown in FIG. 16.

FIG. 16 to FIG. 18 illustrate the following step. FIG. 16 shows a cross section of the layered structure orthogonal to the medium facing surface and the substrate. FIG. 17 shows a cross section of the layered structure taken in the position in which the medium facing surface is to be formed. FIG. 18 shows the top surface of the layered structure. The positions of the cross sections of FIG. 16 and FIG. 17 are the same as those of FIG. 5 and FIG. 6, respectively. In FIG. 18, the right-hand portion illustrates the top surface of the layered structure of the pre-head portion, and the left-hand portion illustrates the top surface of the layered structure of the intra-row portion to be removed.

In the step, first, a photoresist layer is formed on the entire top surface of the layered structure. Next, the photoresist layer is patterned to form a mask 21. The mask 21 has an opening located above the second resistor element 42a. Next, the insulating layer 22 made of alumina, for example, and having a thickness of 0.3 μm, for example, is formed by a method such as sputtering on the entire top surface of the layered structure. Next, the mask 21 is lifted off. As a result, the insulating layer 22 is located above the resistor element 42a only.

Figure 19:
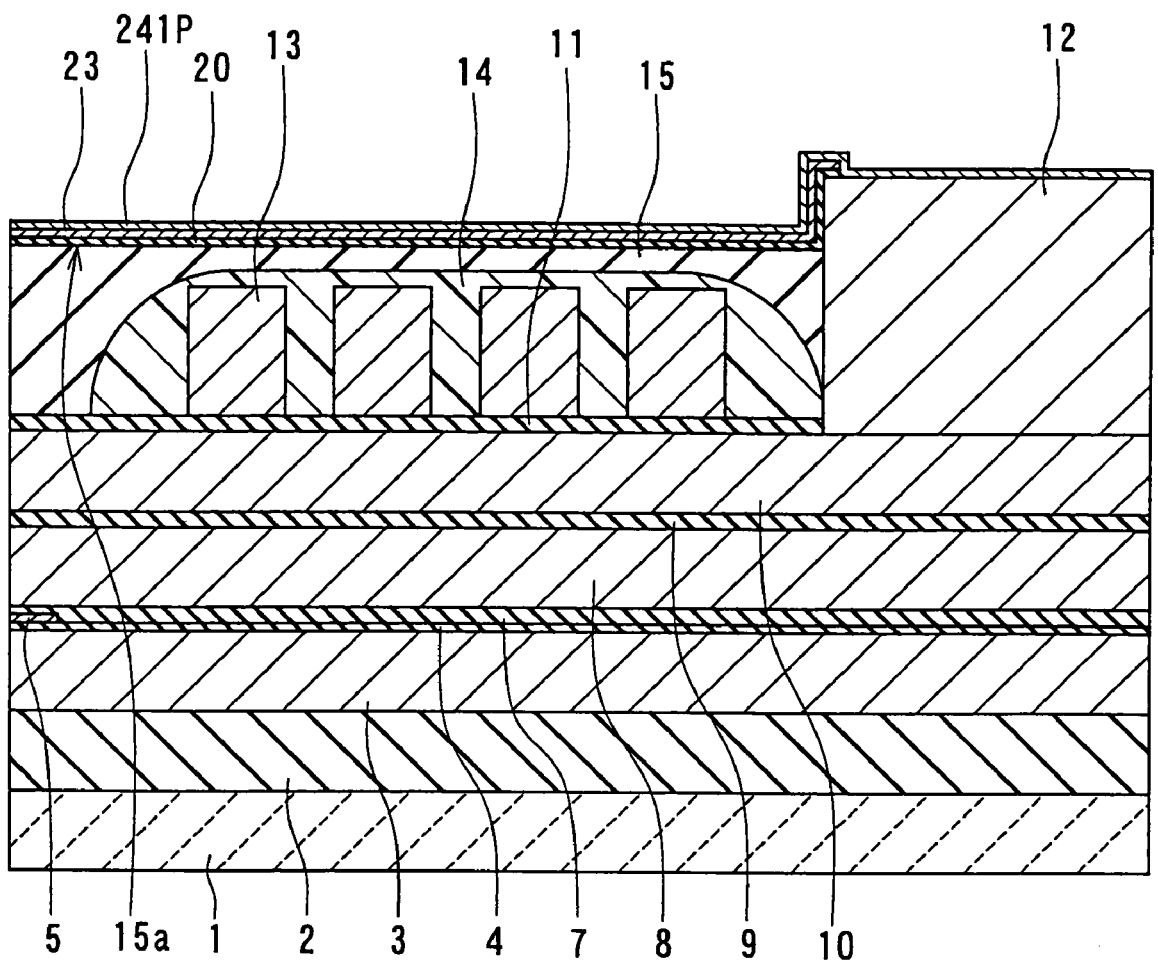
FIG. 19 is a cross-sectional view of the layered structure obtained in a step that follows the step shown in FIG. 16.
Figure 20:
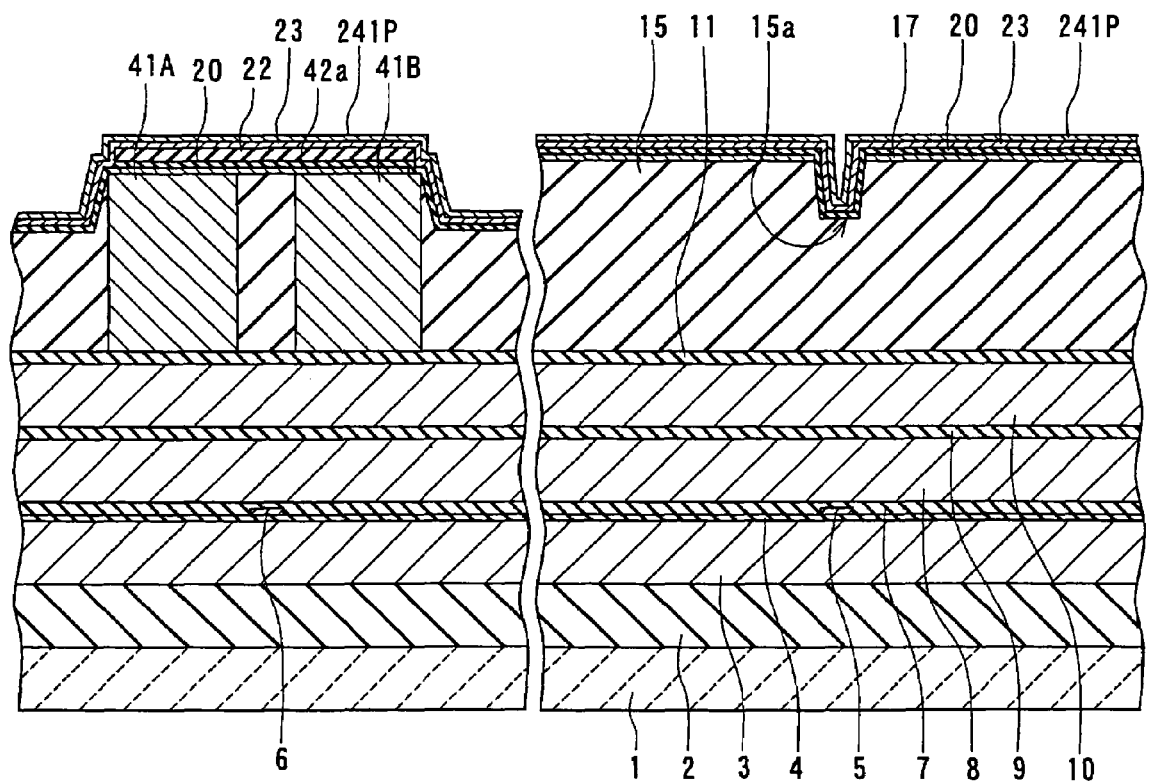
FIG. 20 is another cross-sectional view of the layered structure shown in FIG. 19.
Figure 21:
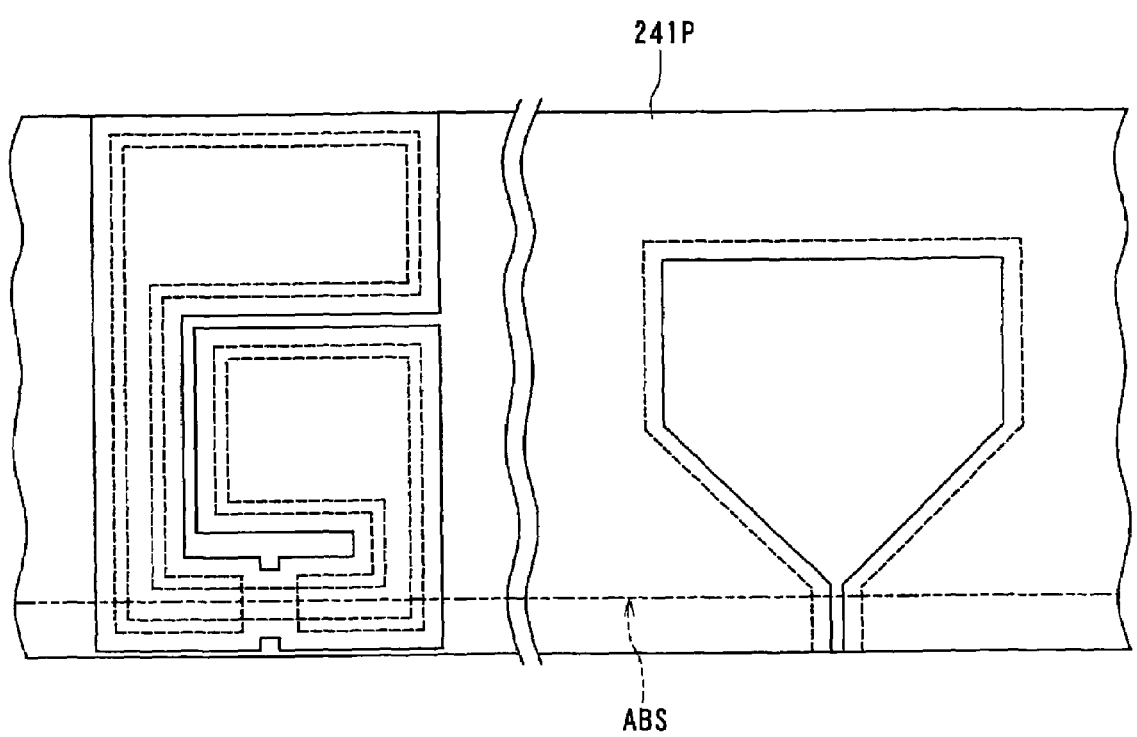
FIG. 21 is a top view of the layered structure shown in FIG. 19.

FIG. 19 to FIG. 21 illustrate the following step. FIG. 19 shows a cross section of the layered structure orthogonal to the medium facing surface and the substrate. FIG. 20 shows a cross section of the layered structure taken in the position in which the medium facing surface is to be formed. FIG. 21 shows the top surface of the layered structure. The positions of the cross sections of FIG. 19 and FIG. 20 are the same as those of FIG. 5 and FIG. 6, respectively. In FIG. 21, the right-hand portion illustrates the top surface of the layered structure of the pre-head portion, and the left-hand portion illustrates the top surface of the layered structure of the intra-row portion to be removed.

In the step, first, the polishing stopper layer 23 is formed by sputtering, for example, on the entire top surface of the layered structure. Next, a portion of the polishing stopper layer 23 located on the top surface of the coupling layer 12 is selectively etched to form an opening in the polishing stopper layer 23. If the coupling layer 12 is not to be provided, it is not necessary to form the opening in the polishing stopper layer 23. Next, the magnetic layer 241P is formed on the polishing stopper layer 23. The magnetic layer 241P will be the first layer 241 of the pole layer 24 later. The magnetic layer 241P is formed by sputtering or ion beam deposition (hereinafter referred to as IBD), for example. If the magnetic layer 241P is formed by sputtering, it is preferred to employ collimation sputtering or long throw sputtering.

Figure 22:
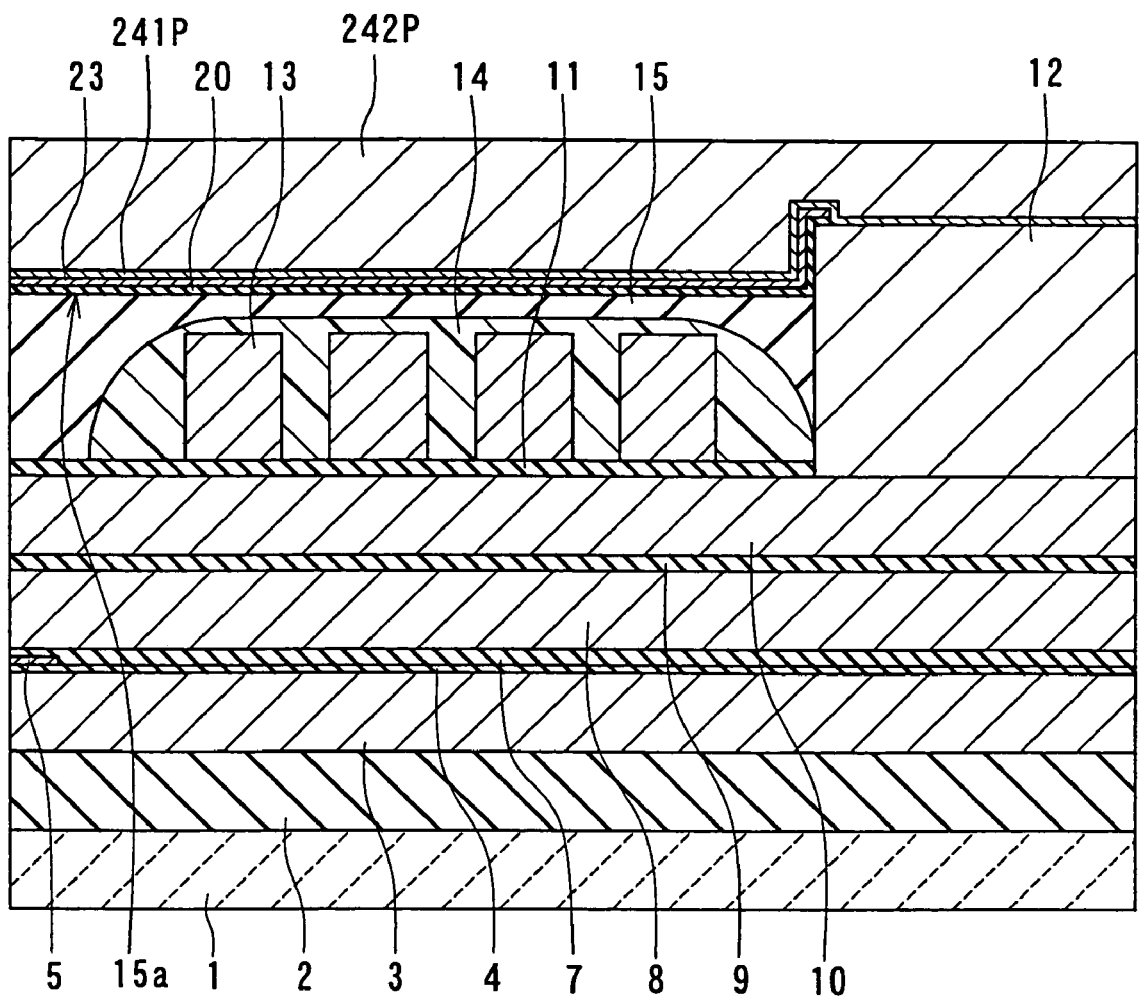
FIG. 22 is a cross-sectional view of the layered structure obtained in a step that follows the step shown in FIG. 19.
Figure 23:
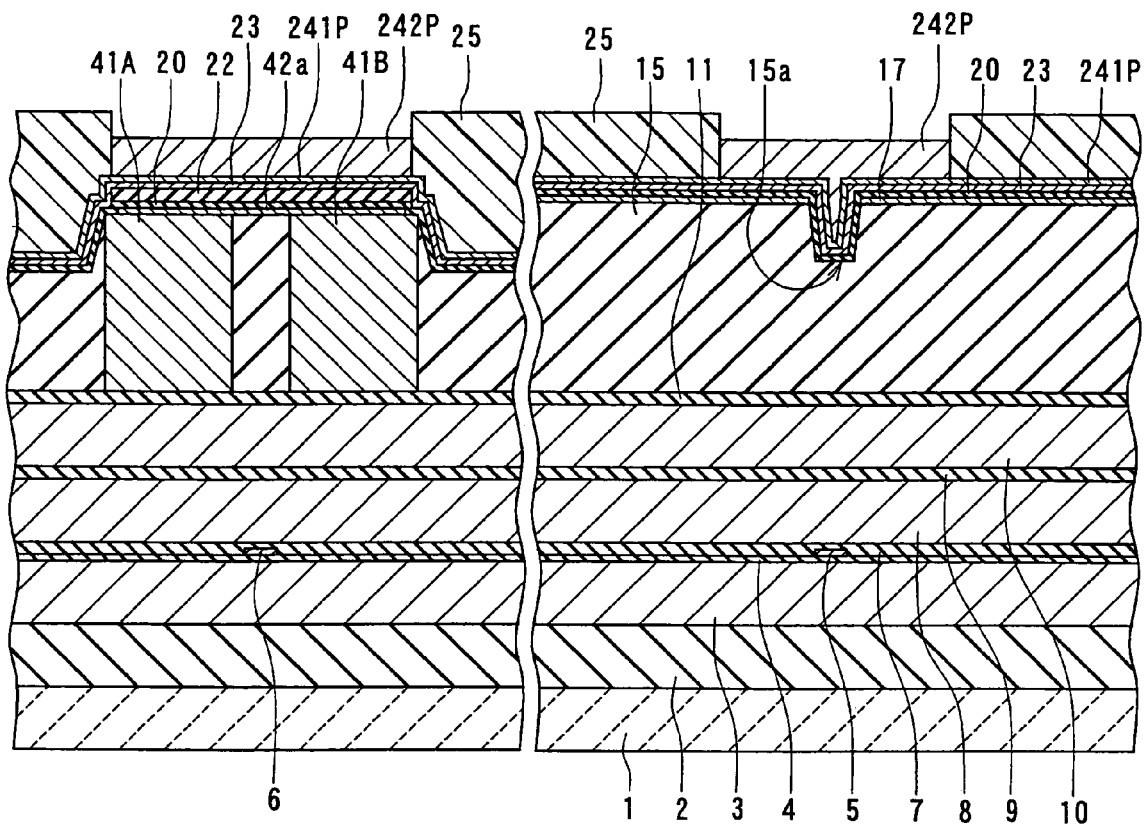
FIG. 23 is another cross-sectional view of the layered structure shown in FIG. 22.
Figure 24:
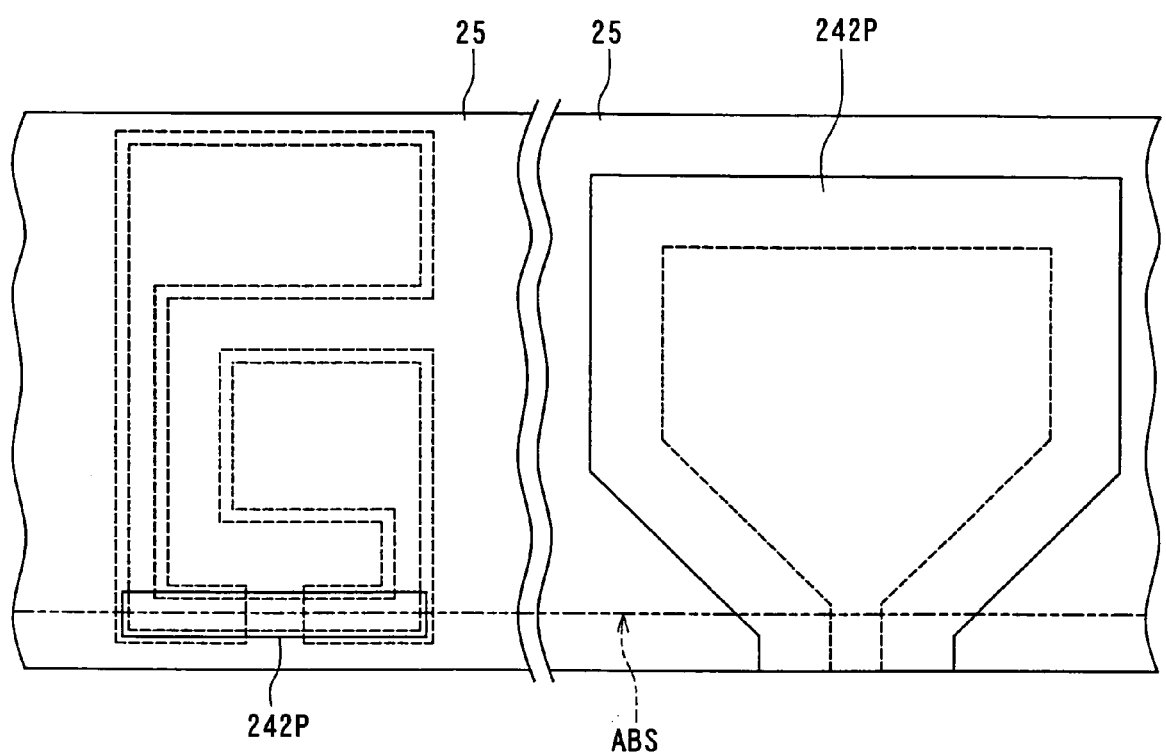
FIG. 24 is a top view of the layered structure shown in FIG. 22.

FIG. 22 to FIG. 24 illustrate the following step. FIG. 22 shows a cross section of the layered structure orthogonal to the medium facing surface and the substrate. FIG. 23 shows a cross section of the layered structure taken in the position in which the medium facing surface is to be formed. FIG. 24 shows the top surface of the layered structure. The positions of the cross sections of FIG. 22 and FIG. 23 are the same as those of FIG. 5 and FIG. 6, respectively. In FIG. 24, the right-hand portion illustrates the top surface of the layered structure of the pre-head portion, and the left-hand portion illustrates the top surface of the layered structure of the intra-row portion to be removed.

In the step, first, a photoresist layer is formed on the entire top surface of the layered structure. Next, the photoresist layer is patterned to form a frame 25. The frame 25 has an opening located above the groove 15a and another opening located above the second resistor element 42a. Next, a magnetic layer 242P is formed by frame plating on the magnetic layer 241P in the opening of the frame 25. In this case, the magnetic layer 241P is used as an electrode for plating. The magnetic layer 242P will be the second layer 242 of the pole layer 24 later. Next, the frame 25 is removed. In the frame 25, it is acceptable that the opening is not formed in the portion above the second resistor element 42a and that the magnetic layer 242P is not located above the second resistor element 42a. In the manner thus described, the magnetic layers 241P and 242P to be the pole layer 24 are formed such that the groove 15a is filled and that the top surfaces of the magnetic layers 241P and 242P are located higher than the top surface of the polishing stopper layer 23.

Figure 25:
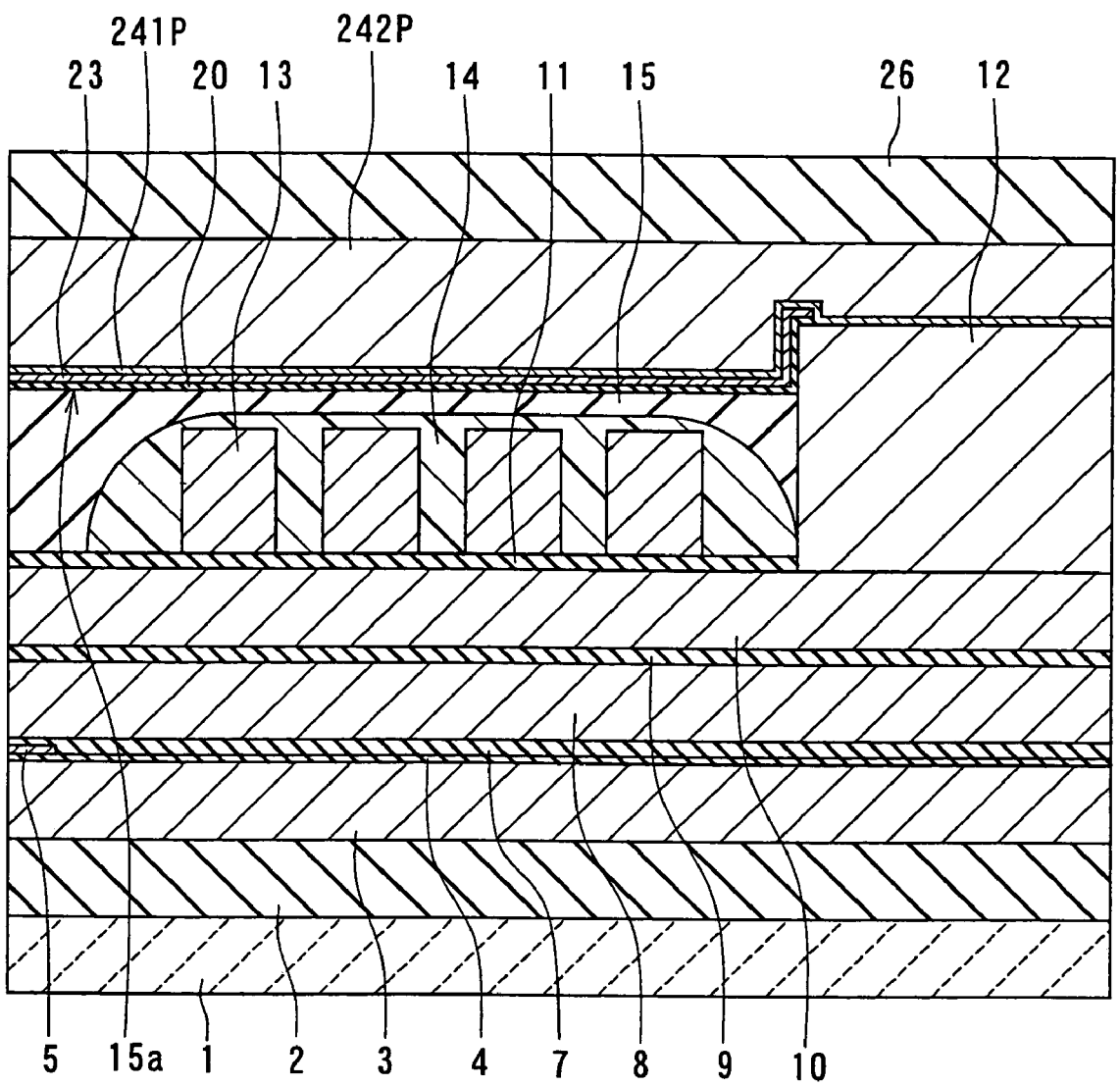
FIG. 25 is a cross-sectional view of the layered structure obtained in a step that follows the step shown in FIG. 22.
Figure 26:
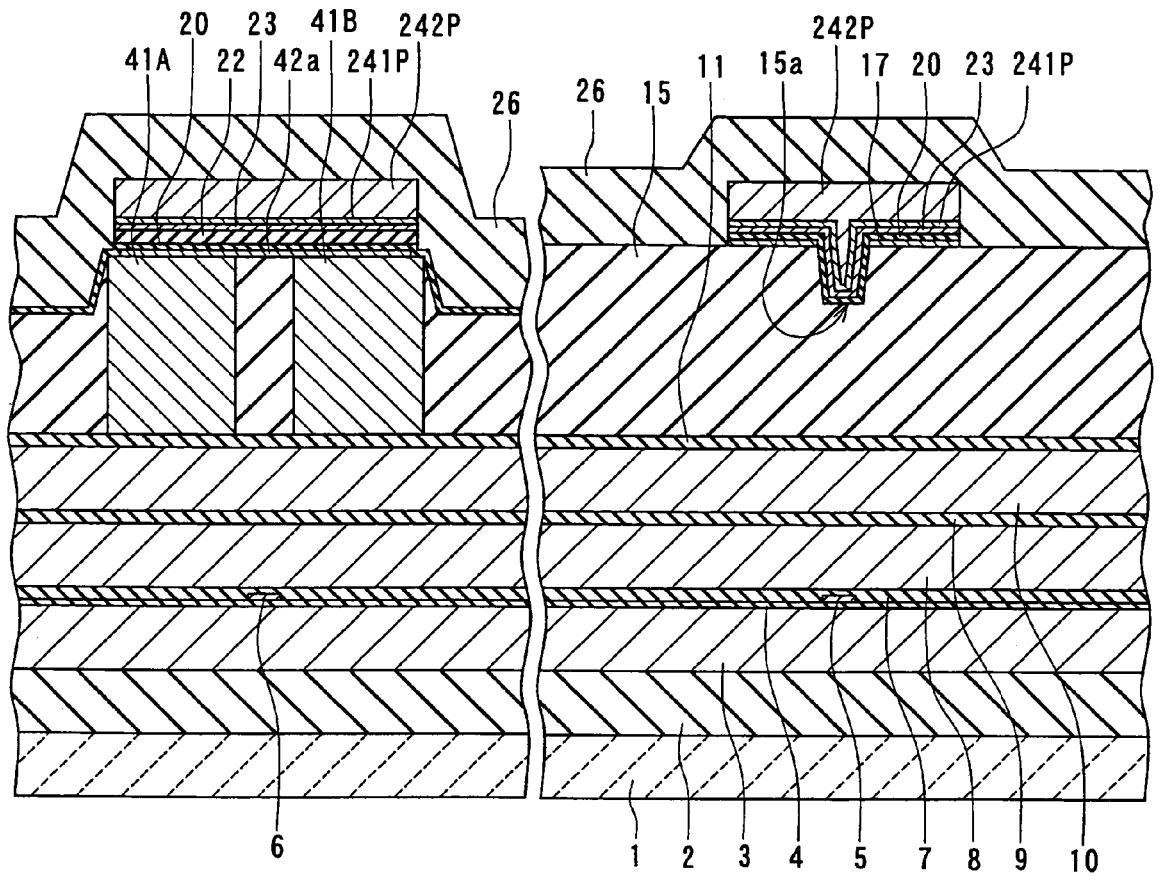
FIG. 26 is another cross-sectional view of the layered structure shown in FIG. 25.
Figure 27:
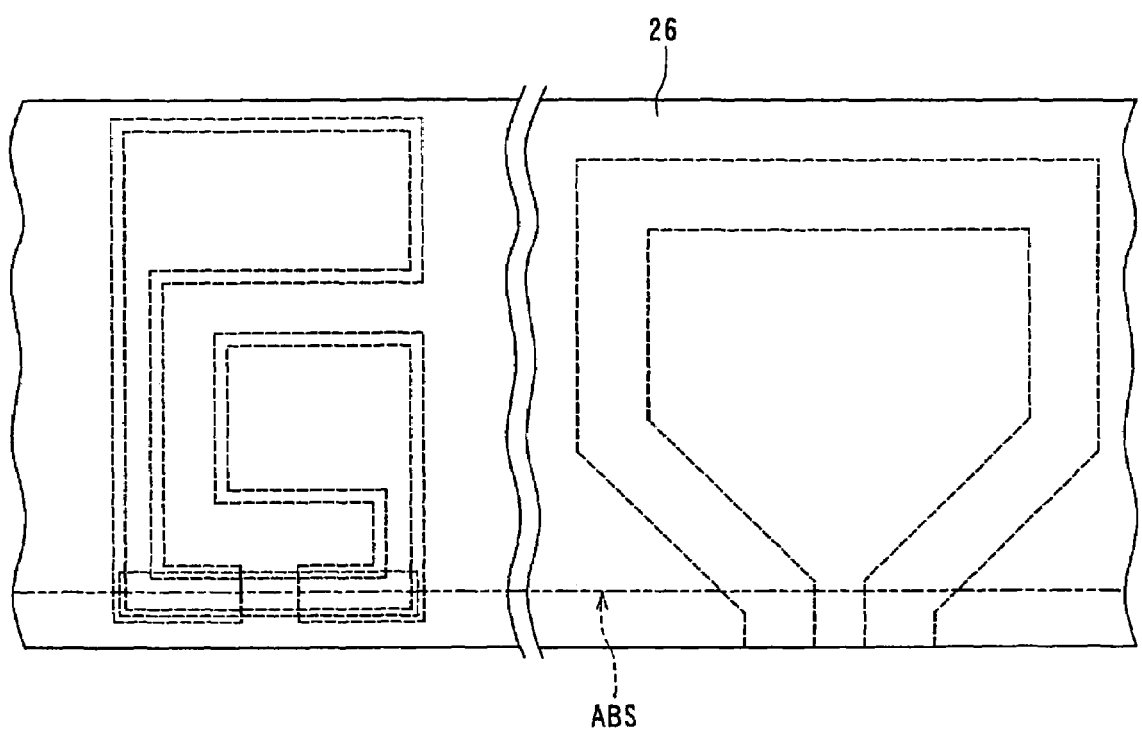
FIG. 27 is a top view of the layered structure shown in FIG. 25.

FIG. 25 to FIG. 27 illustrate the following step. FIG. 25 shows a cross section of the layered structure orthogonal to the medium facing surface and the substrate. FIG. 26 shows a cross section of the layered structure taken in the position in which the medium facing surface is to be formed. FIG. 27 shows the top surface of the layered structure. The positions of the cross sections of FIG. 25 and FIG. 26 are the same as those of FIG. 5 and FIG. 6, respectively. In FIG. 27, the right-hand portion illustrates the top surface of the layered structure of the pre-head portion, and the left-hand portion illustrates the top surface of the layered structure of the intra-row portion to be removed.

In the step, first, in the pre-head portion, the layered structure that is disposed on the top surface of the encasing layer 15 and made up of the nonmagnetic conductive layer 17, the nonmagnetic film 20, the polishing stopper layer 23 and the magnetic layer 241P except portions below the magnetic layer 242P is removed by ion beam etching, for example. At the same time, in the intra-row portion to be removed, the layered structure made up of the polishing stopper layer 23 and the magnetic layer 241P except portions below the magnetic layer 242P is removed by ion beam etching, for example. At this time, the second resistor element 42a is protected by the nonmagnetic film 20 and the insulating layer 22 located above the resistor element 42a. Next, the coating layer 26 made of alumina, for example, and having a thickness of 1.0 to 1.5 μm, for example, is formed on the entire top surface of the layered structure.

Figure 28:
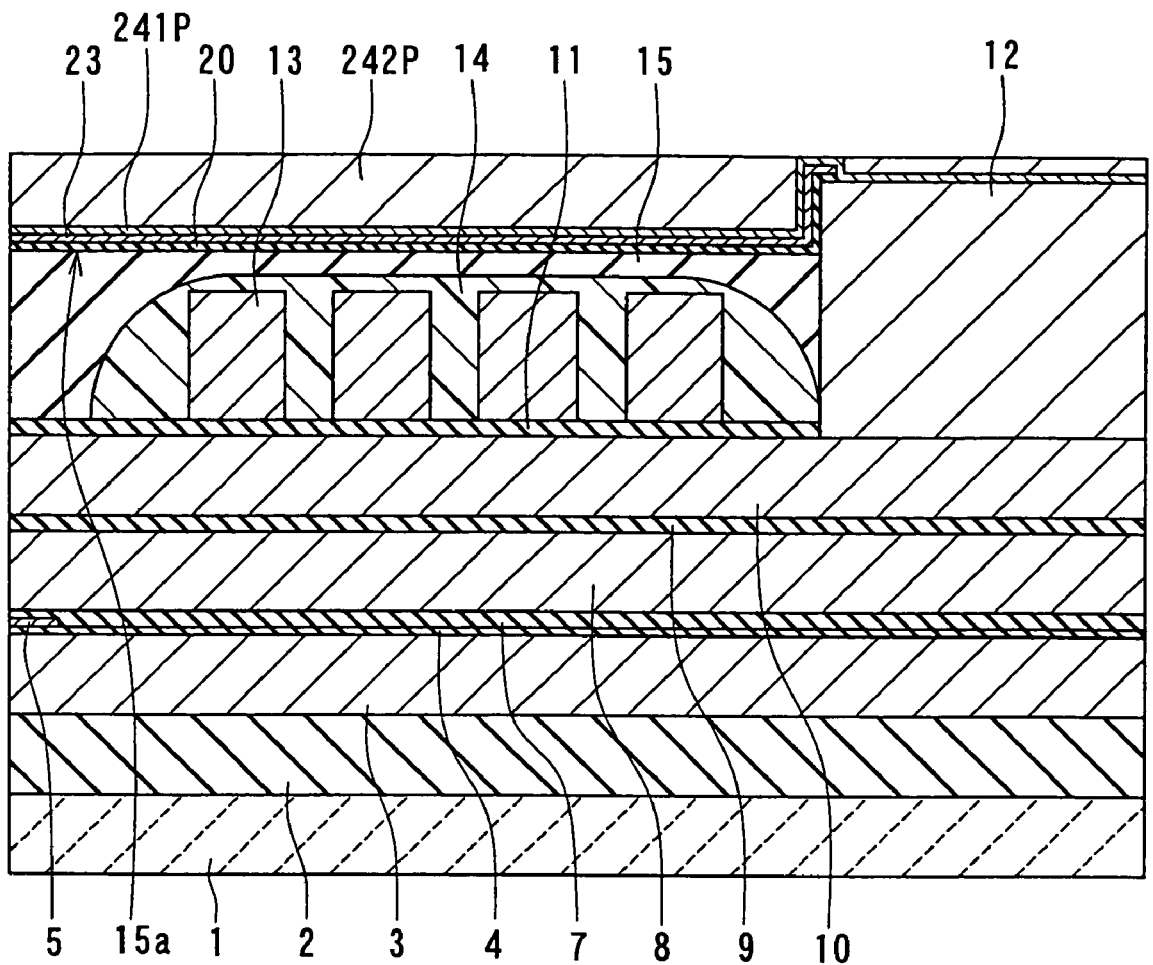
FIG. 28 is a cross-sectional view of the layered structure obtained in a step that follows the step shown in FIG. 25.
Figure 29:
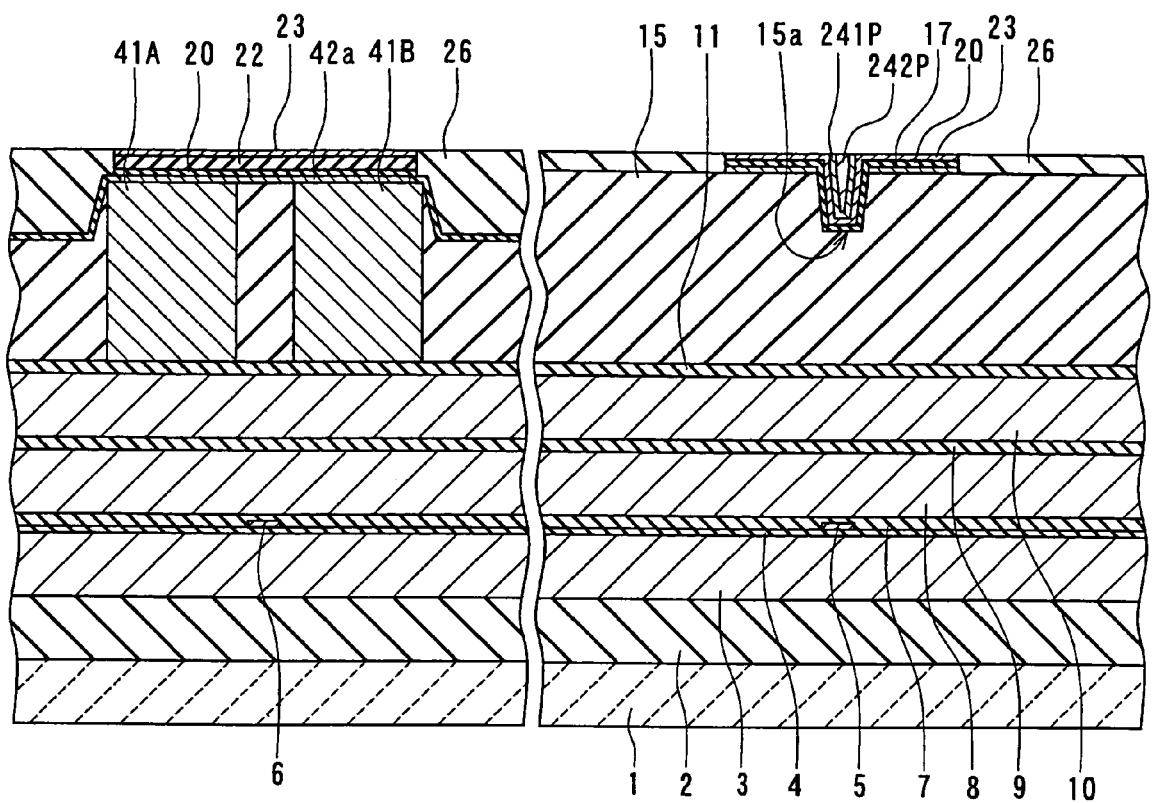
FIG. 29 is another cross-sectional view of the layered structure shown in FIG. 28.
Figure 30:
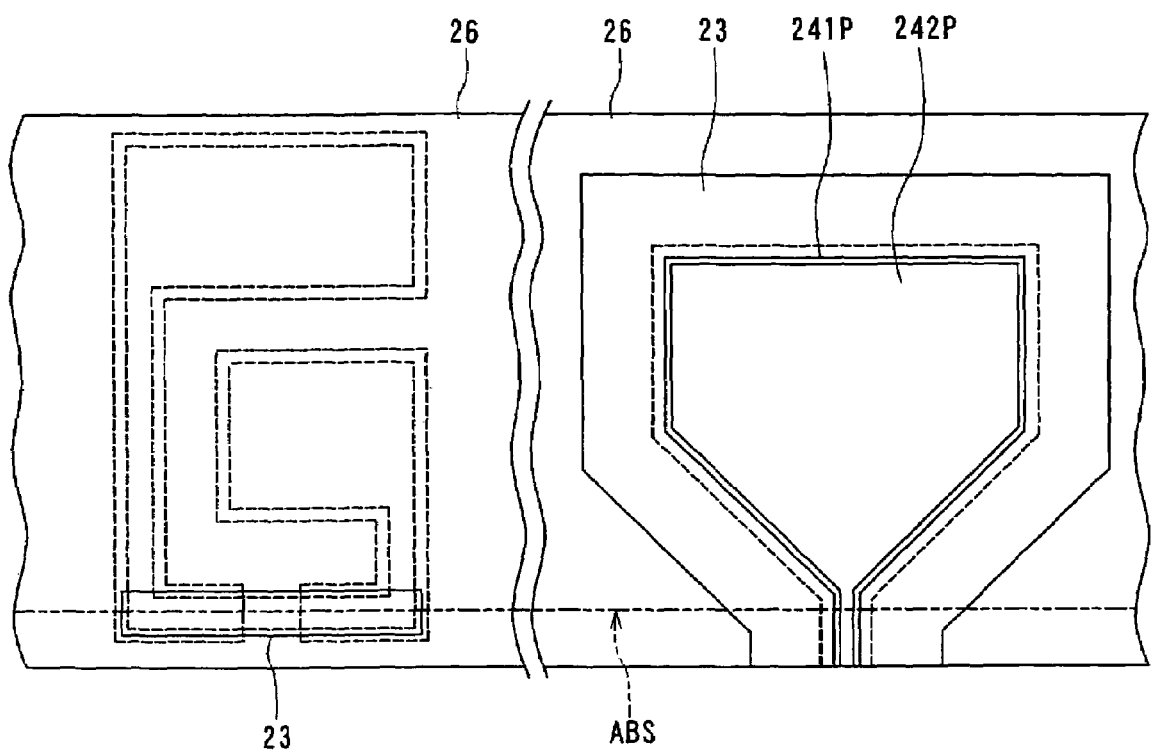
FIG. 30 is a top view of the layered structure shown in FIG. 28.

FIG. 28 to FIG. 30 illustrate the following step. FIG. 28 shows a cross section of the layered structure orthogonal to the medium facing surface and the substrate. FIG. 29 shows a cross section of the layered structure taken in the position in which the medium facing surface is to be formed. FIG. 30 shows the top surface of the layered structure. The positions of the cross sections of FIG. 28 and FIG. 29 are the same as those of FIG. 5 and FIG. 6, respectively. In FIG. 30, the right-hand portion illustrates the top surface of the layered structure of the pre-head portion, and the left-hand portion illustrates the top surface of the layered structure of the intra-row portion to be removed.

In the step, the coating layer 26, the magnetic layer 242P and the magnetic layer 241P are polished by CMP, for example, until the polishing stopper layer 23 is exposed. As a result, in the pre-head portion, portions of the magnetic layers 241P and 242P disposed on the top surface of the polishing stopper layer 23 are removed and the top surfaces of the polishing stopper layer 23, the magnetic layer 241P and the magnetic layer 242P are flattened. If the coating layer 26, the magnetic layer 242P and the magnetic layer 241P are polished by CMP, such a slurry is used that polishing is stopped when the polishing stopper layer 23 is exposed, such as an alumina-base slurry. If the coating layer 26, the magnetic layer 242P and the magnetic layer 241P are polished by CMP using an alumina-base slurry, the material of the polishing stopper layer 23 is preferably Ta or Ru.

Figure 31:
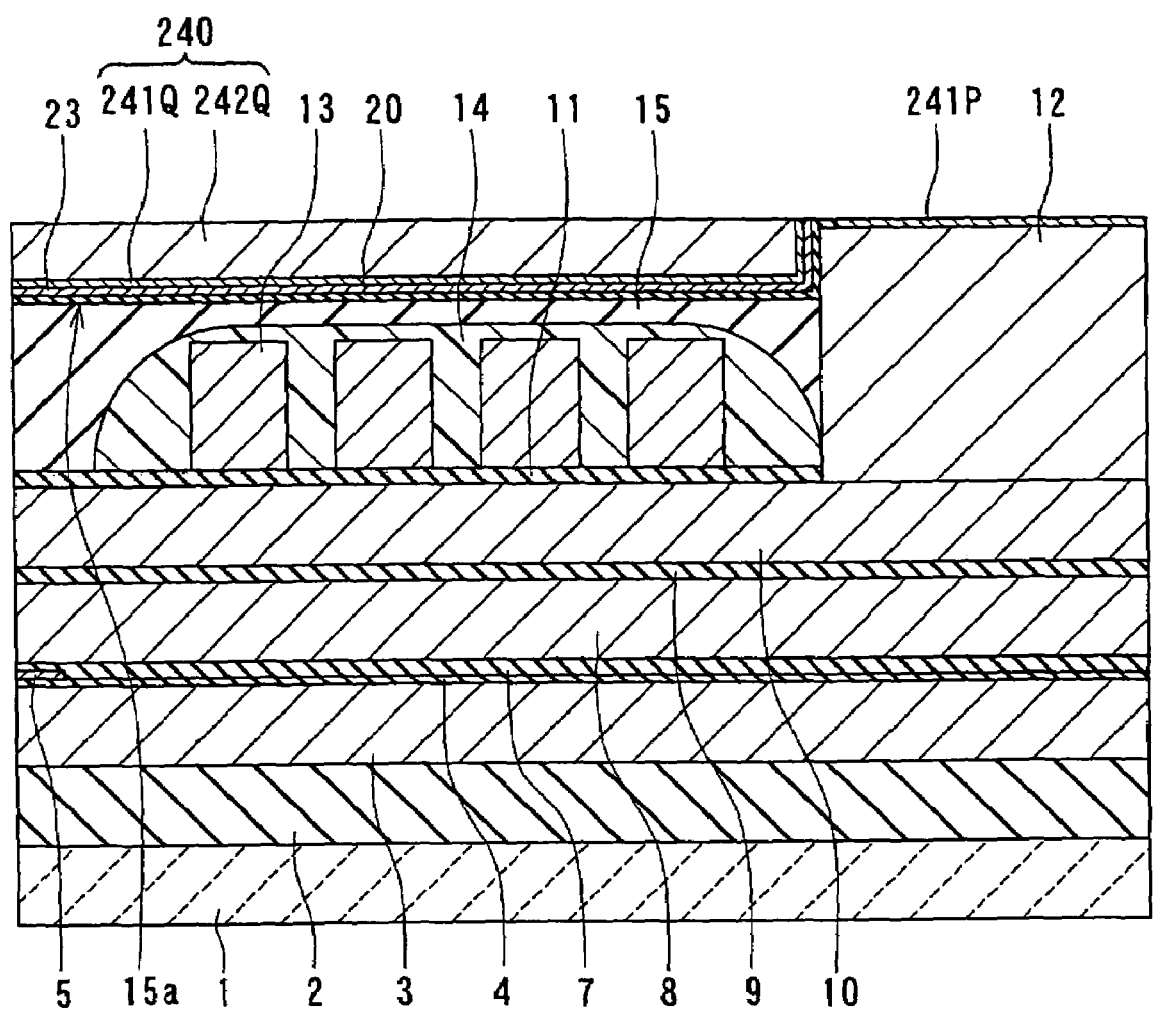
FIG. 31 is a cross-sectional view of the layered structure obtained in a step that follows the step shown in FIG. 28.
Figure 32:
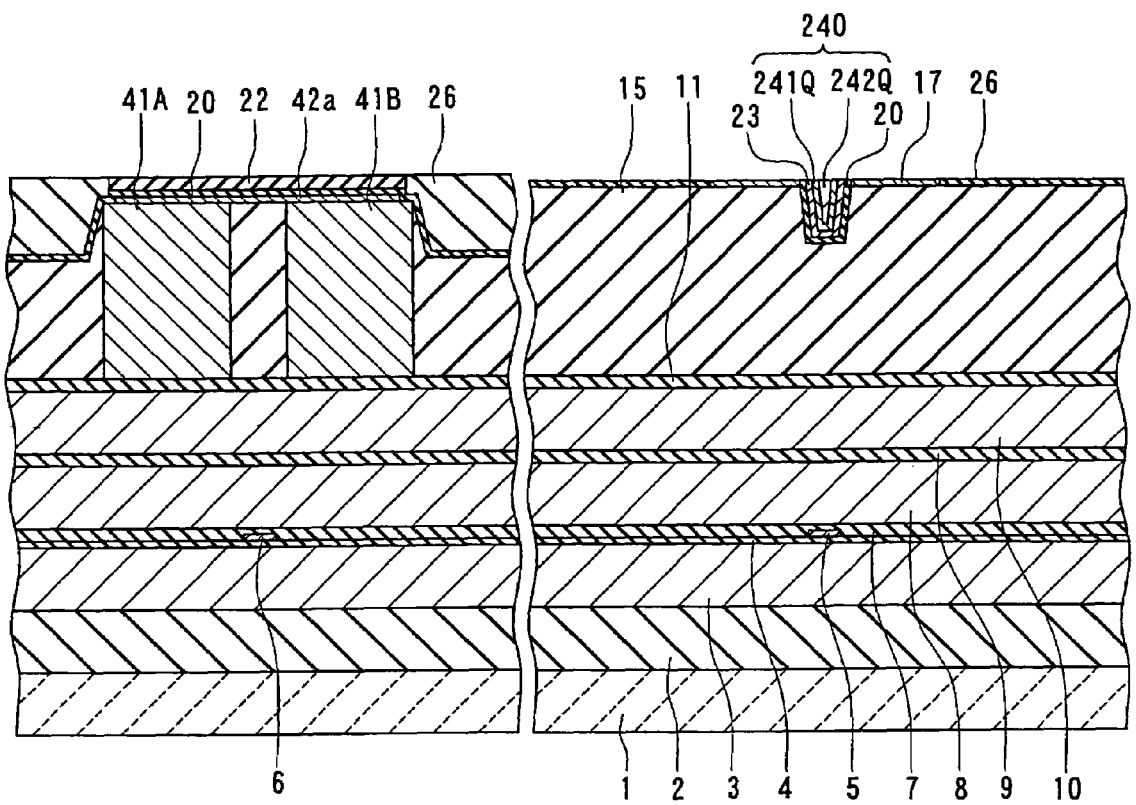
FIG. 32 is another cross-sectional view of the layered structure shown in FIG. 31.
Figure 33:
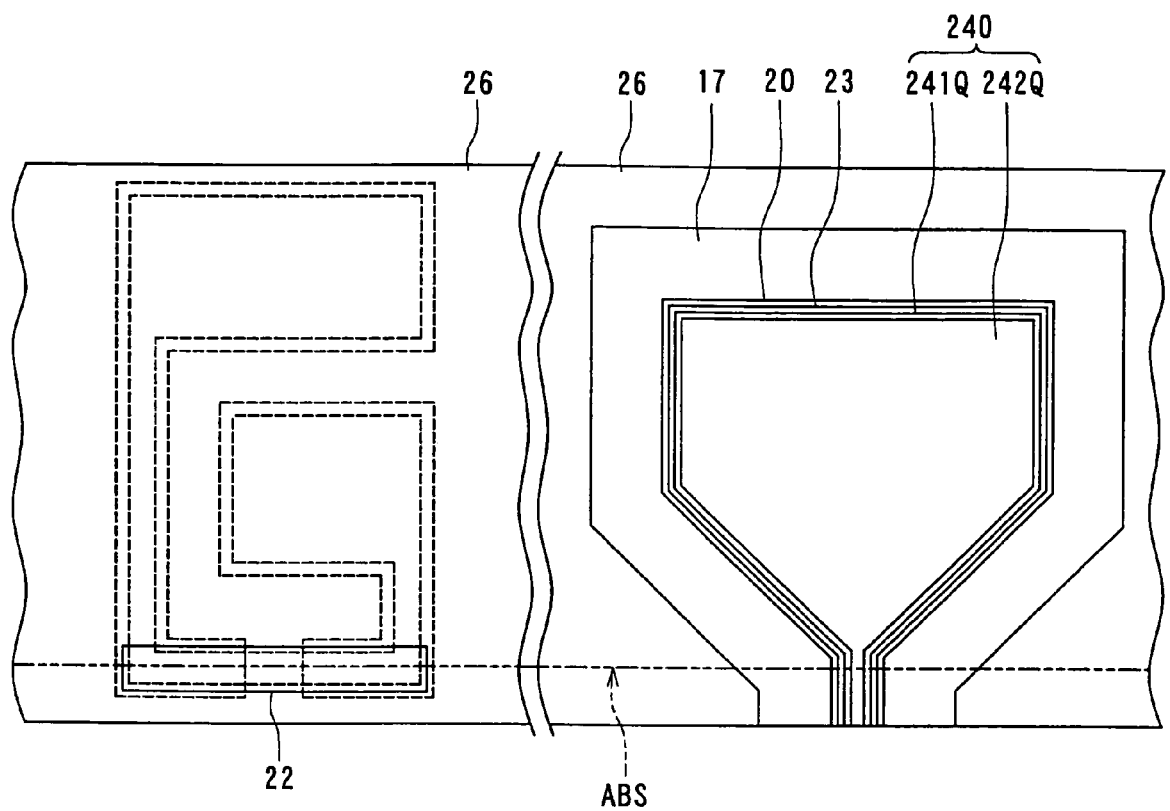
FIG. 33 is a top view of the layered structure shown in FIG. 31.

FIG. 31 to FIG. 33 illustrate the following step. FIG. 31 shows a cross section of the layered structure orthogonal to the medium facing surface and the substrate. FIG. 32 shows a cross section of the layered structure taken in the position in which the medium facing surface is to be formed. FIG. 33 shows the top surface of the layered structure. The positions of the cross sections of FIG. 31 and FIG. 32 are the same as those of FIG. 5 and FIG. 6, respectively. In FIG. 33, the right-hand portion illustrates the top surface of the layered structure of the pre-head portion, and the left-hand portion illustrates the top surface of the layered structure of the intra-row portion to be removed.

In the step, ion beam etching, for example, is performed to remove portions of the polishing stopper layer 23 and the nonmagnetic film 20 disposed on the nonmagnetic conductive layer 17, and to etch portions of the first magnetic layer 241P and the second magnetic layer 242P. The top surfaces of the nonmagnetic conductive layer 17, the nonmagnetic film 20, the polishing stopper layer 23, the first magnetic layer 241P and the second magnetic layer 242P are thereby flattened. At this time, the second resistor element 42a is protected by the nonmagnetic film 20 and the insulating layer 22 that are located above the second resistor element 42a. The magnetic layers 241P and 242P disposed on the polishing stopper layer 23 in the groove 15a are hereinafter defined as magnetic layers 241Q and 242Q, respectively. In addition, a combination of the magnetic layers 241Q and 242Q is defined as a magnetic layer 240. After this step, the width of the magnetic layer 240 in the location of the region ABS, that is, the track width, may be measured by an electron microscope. At this time, the nonmagnetic conductive layer 17 made of a conductive material is disposed on the top surface of the encasing layer 15. As a result, it is possible to prevent electric charges from accumulating on the top surface of the encasing layer 15, and it is thereby possible to obtain a correct image.

Alternatively, a portion of the polishing stopper layer 23 located above the nonmagnetic conductive layer 17 may be removed by ion beam etching, for example, and then the coating layer 26, the nonmagnetic film 20, the polishing stopper layer 23, and the magnetic layers 242P and 241P may be polished by CMP, for example, so that the top surfaces of the nonmagnetic conductive layer 17, the nonmagnetic film 20, the polishing stopper layer 23, the first magnetic layer 241P and the second magnetic layer 242P are flattened.

Since each of the polishing stopper layer 23 and the nonmagnetic film 20 is made of a nonmagnetic material, the track width is not affected even though the stopper layer 23 and the nonmagnetic film 20 are disposed on the nonmagnetic conductive layer 17. Therefore, portions of the stopper layer 23 and the nonmagnetic film 20 disposed on the nonmagnetic conductive layer 17 may be left unremoved, or a portion of the nonmagnetic film 20 disposed on the nonmagnetic conductive layer 17 may be left unremoved.

Another alternative is that, ion beam etching, for example, may be performed to remove the nonmagnetic conductive layer 17 and to etch portions of the first magnetic layer 241P and the second magnetic layer 242P, and the top surfaces of the encasing layer 15, the nonmagnetic film 20, the polishing stopper layer 23, the first magnetic layer 241P and the second magnetic layer 242P may be thereby flattened.

Figure 34:
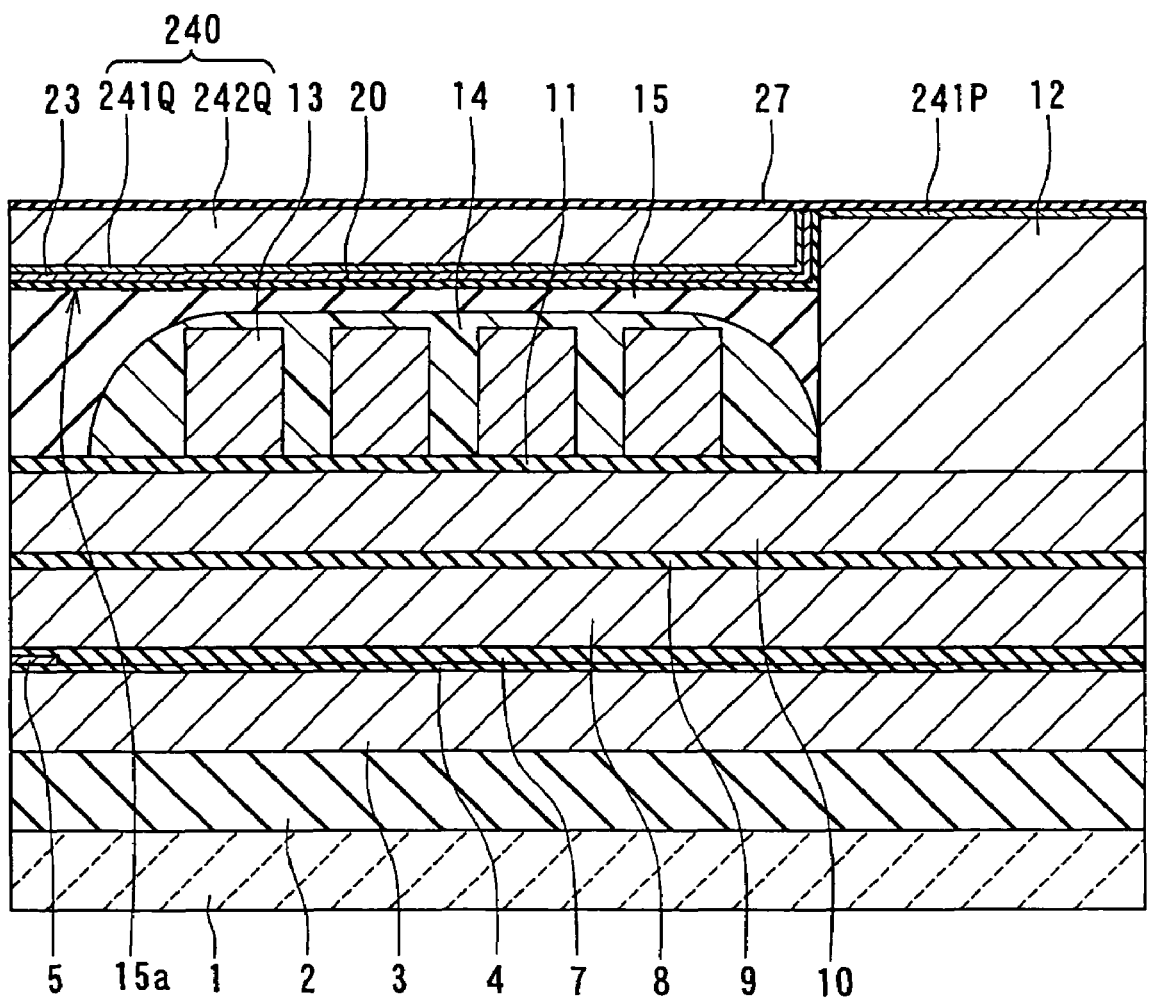
FIG. 34 is a cross-sectional view of the layered structure obtained in a step that follows the step shown in FIG. 31.
Figure 35:
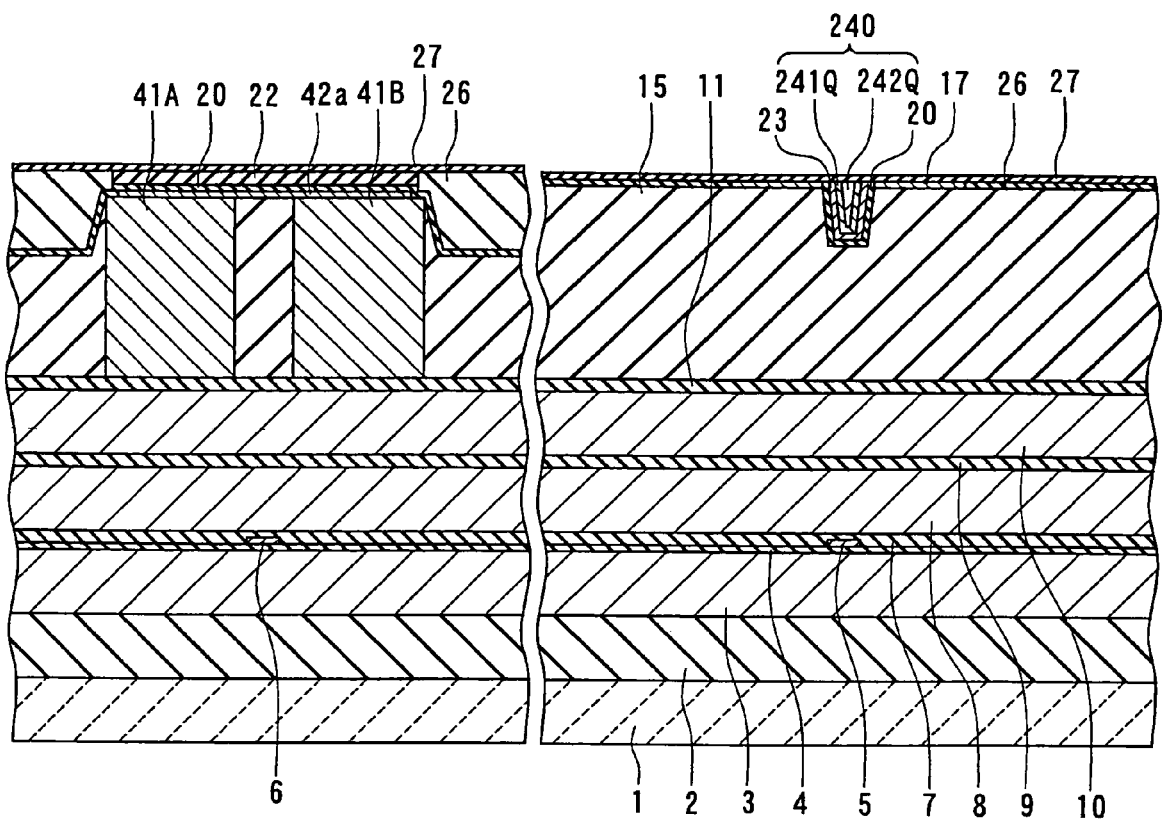
FIG. 35 is another cross-sectional view of the layered structure shown in FIG. 34.
Figure 36:
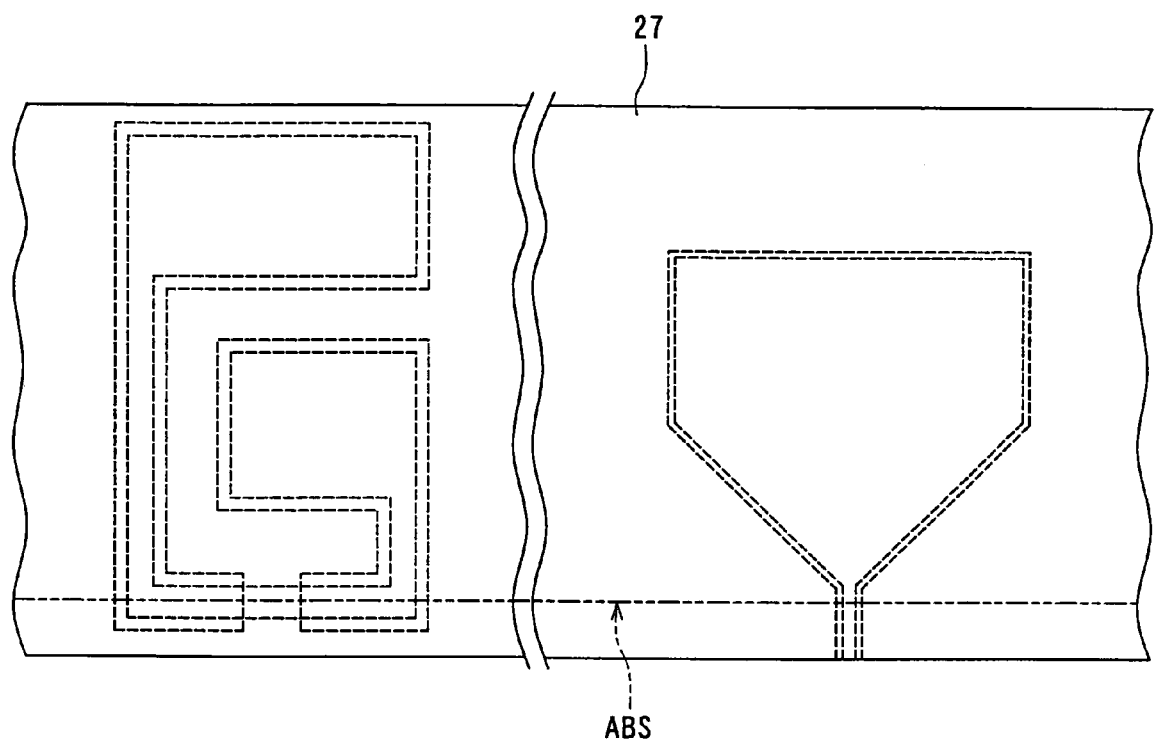
FIG. 36 is a top view of the layered structure shown in FIG. 34.

FIG. 34 to FIG. 36 illustrate the following step. FIG. 34 shows a cross section of the layered structure orthogonal to the medium facing surface and the substrate. FIG. 35 shows a cross section of the layered structure taken in the position in which the medium facing surface is to be formed. FIG. 36 shows the top surface of the layered structure. The positions of the cross sections of FIG. 34 and FIG. 35 are the same as those of FIG. 5 and FIG. 6, respectively. In FIG. 36, the right-hand portion illustrates the top surface of the layered structure of the pre-head portion, and the left-hand portion illustrates the top surface of the layered structure of the intra-row portion to be removed. In the step, the gap layer 27 is formed on the entire top surface of the layered structure.

Figure 37:
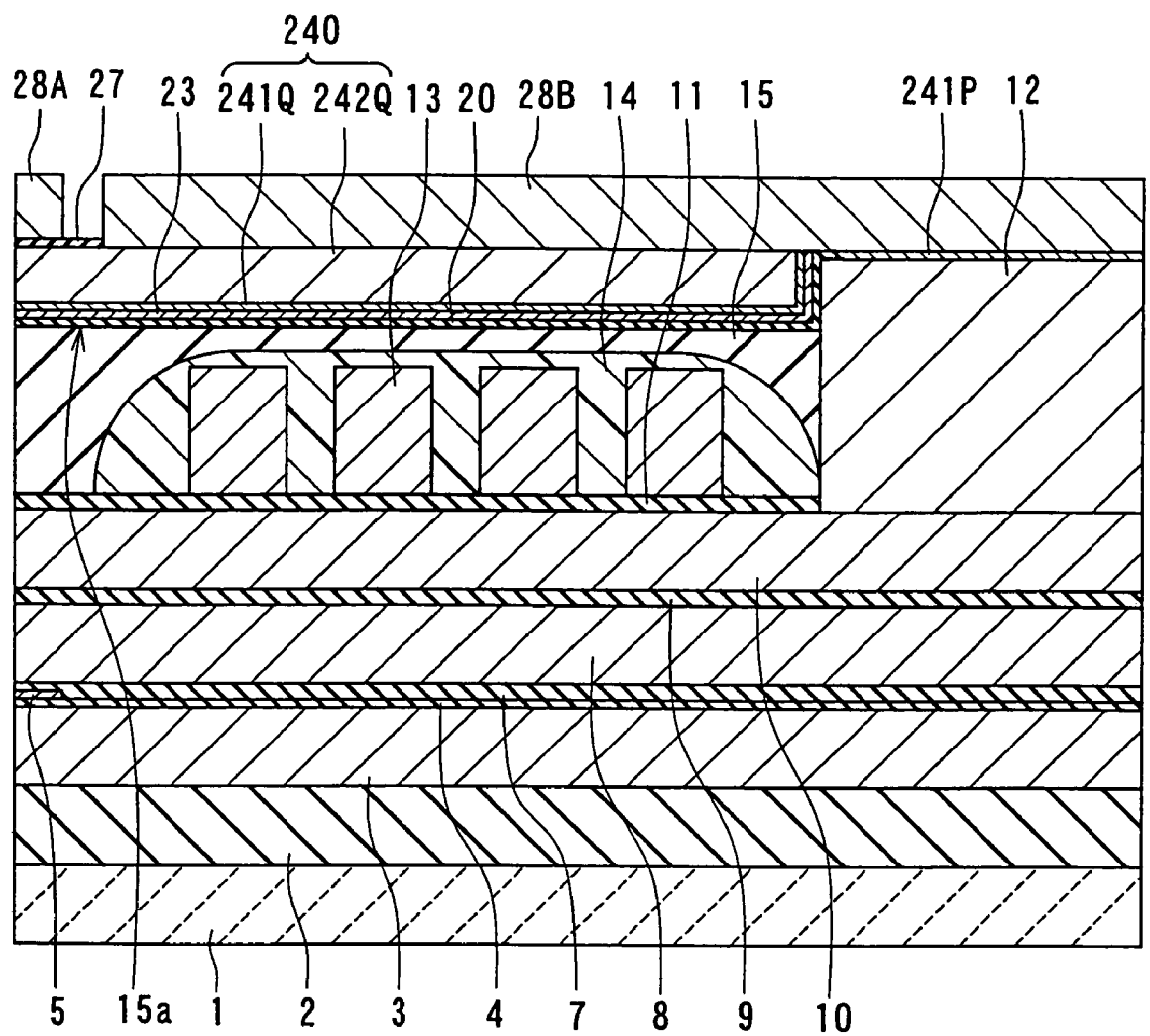
FIG. 37 is a cross-sectional view of the layered structure obtained in a step that follows the step shown in FIG. 34.
Figure 38:
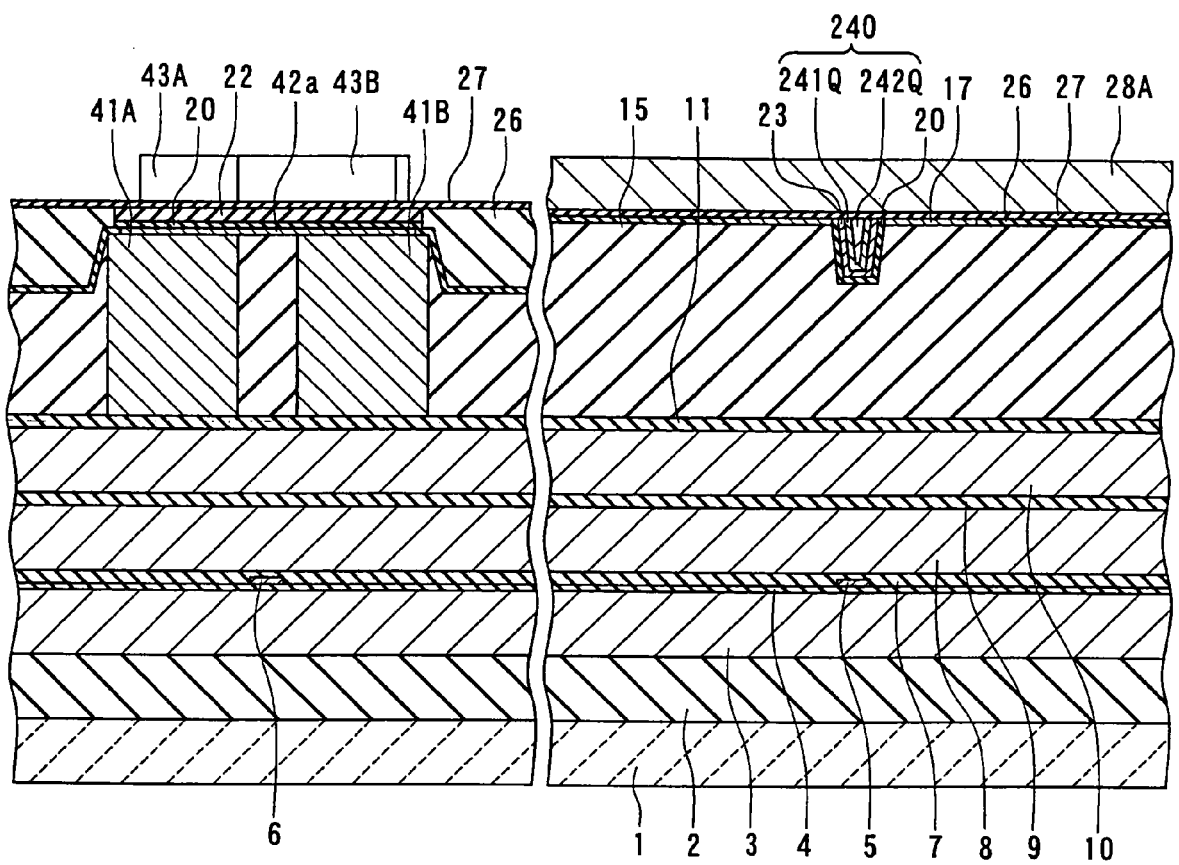
FIG. 38 is another cross-sectional view of the layered structure shown in FIG. 37.
Figure 39:
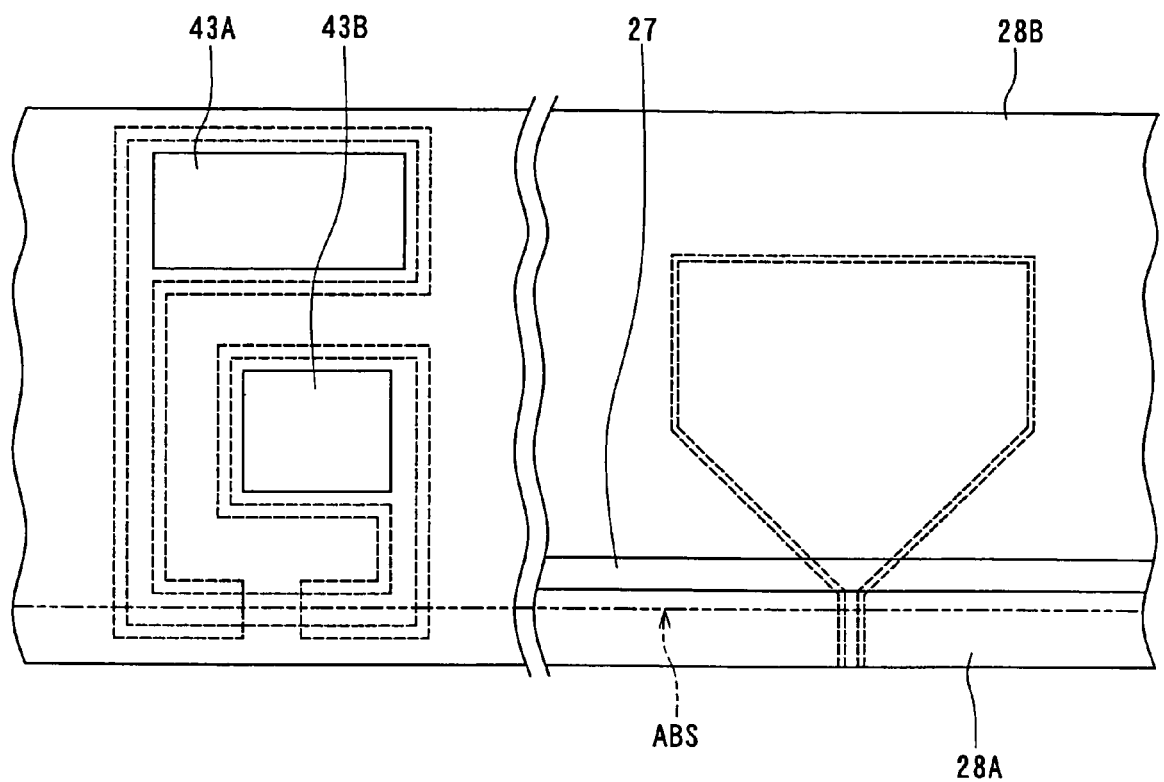
FIG. 39 is a top view of the layered structure shown in FIG. 37.

FIG. 37 to FIG. 39 illustrate the following step. FIG. 37 shows a cross section of the layered structure orthogonal to the medium facing surface and the substrate. FIG. 38 shows a cross section of the layered structure taken in the position in which the medium facing surface is to be formed. FIG. 39 shows the top surface of the layered structure. The positions of the cross sections of FIG. 37 and FIG. 38 are the same as those of FIG. 5 and FIG. 6, respectively. In FIG. 39, the right-hand portion illustrates the top surface of the layered structure of the pre-head portion, and the left-hand portion illustrates the top surface of the layered structure of the intra-row portion to be removed.

In the step, first, in the pre-head portion, a region of the gap layer 27 in which the yoke layer 28B is to be formed is selectively etched to form an opening in the gap layer 27. At the same time, in the intra-row portion to be removed, portions of the gap layer 27 and the nonmagnetic film 20 located above the wide portions 41Aa and 41Ba of the electrode layers 41A and 41B are selectively etched to form two openings in the gap layer 27 and the nonmagnetic film 20. Next, in the pre-head portion, the first layer 28A is formed on the gap layer 27, and the yoke layer 28B is formed on a portion of the magnetic layer 240 where the opening of the gap layer 27 is formed. In the intra-row portion to be removed, electrode layers 43A and 43B are formed on the resistor layer 42 in the region in which the openings of the gap layer 27 and the nonmagnetic film 20 are formed. The electrode layers 43A and 43B are made of a conductive material. The material of the electrode layers 43A and 43B may be the same as that of the first layer 28A and the yoke layer 28B. The first layer 28A, the yoke layer 28B and the electrode layers 43A and 43B may be formed by frame plating or by making a magnetic layer through sputtering and then selectively etching the magnetic layer.

Figure 40:
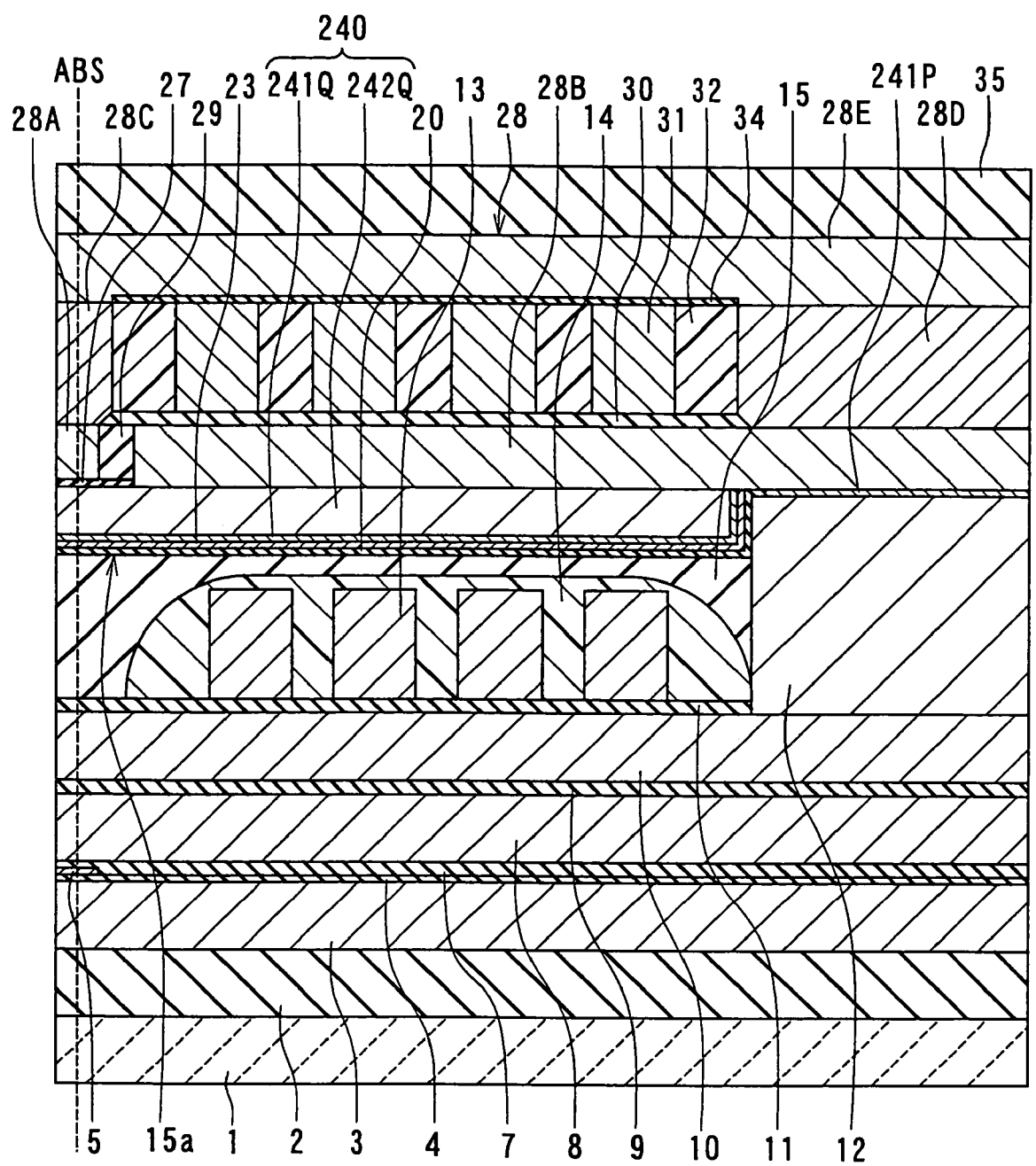
FIG. 40 is a cross-sectional view of the layered structure obtained in a step that follows the step shown in FIG. 37.
Figure 41:
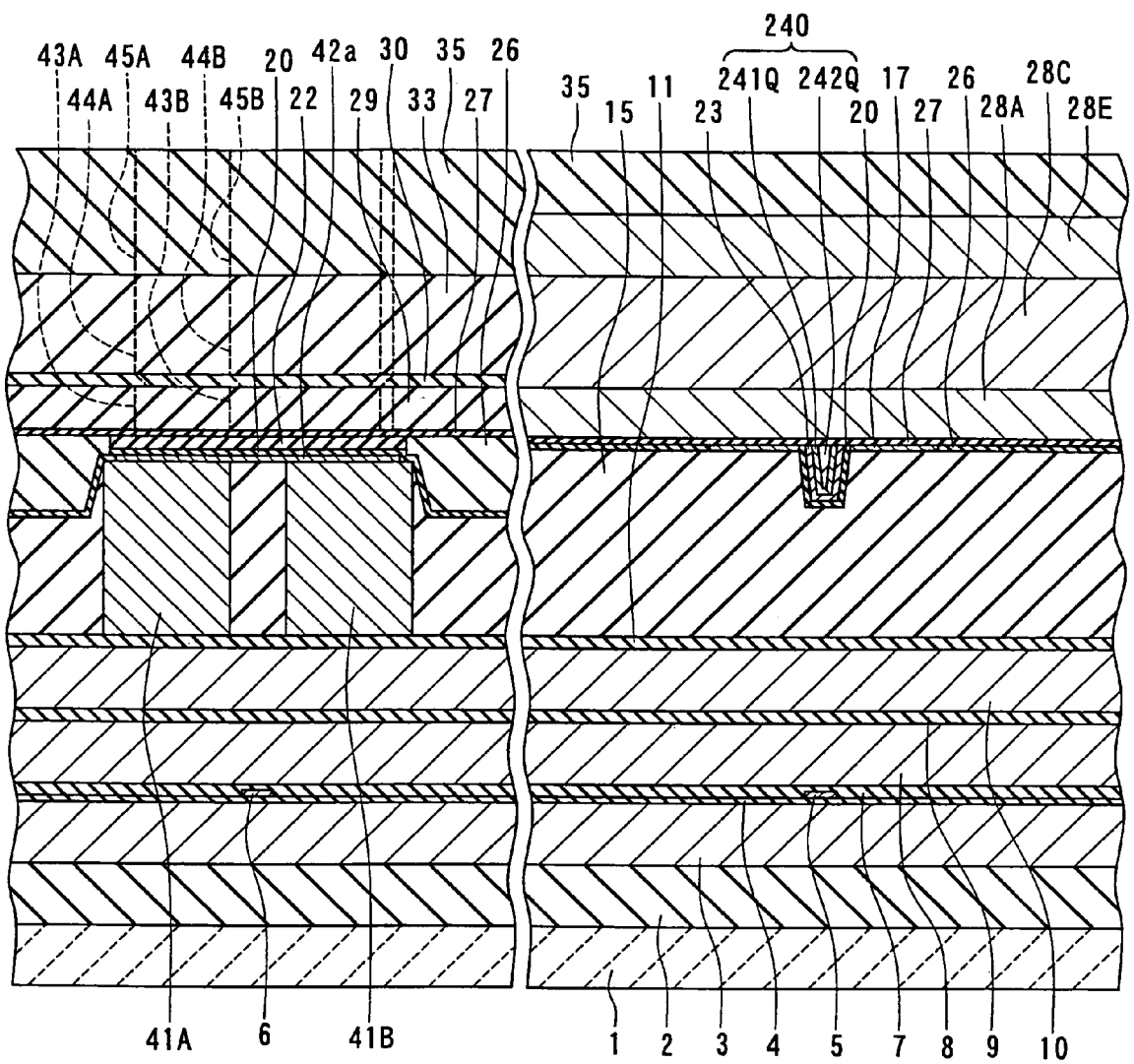
FIG. 41 is another cross-sectional view of the layered structure shown in FIG. 40.
Figure 42:
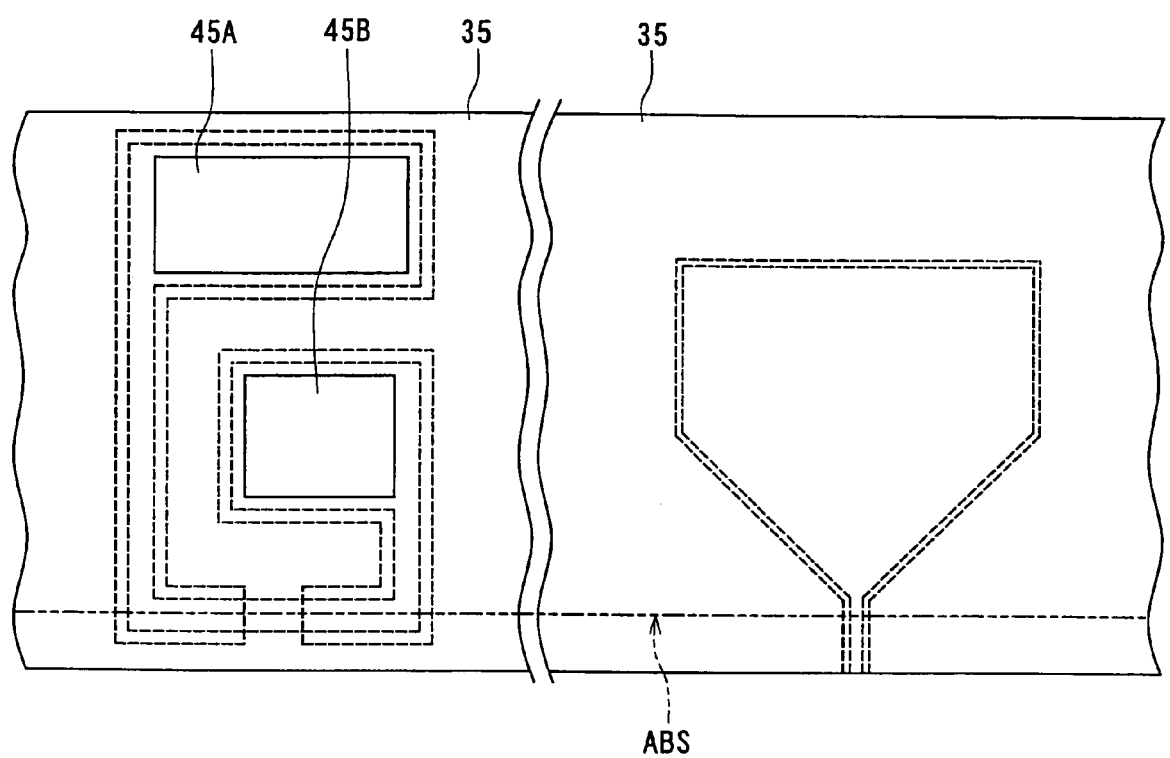
FIG. 42 is a top view of the layered structure shown in FIG. 40.

FIG. 40 to FIG. 42 illustrate the following step. FIG. 40 shows a cross section of the layered structure orthogonal to the medium facing surface and the substrate. FIG. 41 shows a cross section of the layered structure taken in the position in which the medium facing surface is to be formed. FIG. 42 shows the top surface of the layered structure. The positions of the cross sections of FIG. 40 and FIG. 41 are the same as those of FIG. 5 and FIG. 6, respectively. In FIG. 42, the right-hand portion illustrates the top surface of the layered structure of the pre-head portion, and the left-hand portion illustrates the top surface of the layered structure of the intra-row portion to be removed.

In the step, first, the nonmagnetic layer 29 is formed on the entire top surface of the layered structure. Next, the nonmagnetic layer 29 is polished by CMP, for example, so that the first layer 28A and the yoke layer 28B are exposed, and the top surfaces of the first layer 28A, the yoke layer 28B and the nonmagnetic layer 29 are flattened. Next, the insulating layer 30 having a thickness that falls within a range of 0.2 to 0.3 µm inclusive, for example, is formed by a method such as sputtering on the entire top surface of the layered structure.

Next, in the pre-head portion, a region of the insulating layer 30 in which the second layer 28C and the coupling layer 28D are to be formed is selectively etched to form an opening in the insulating layer 30. At the same time, in the intra-row portion to be removed, a portion of the insulating layer 30 located above the electrode layers 43A and 43B is selectively etched to form an opening in the insulating layer 30.

Next, in the pre-head portion, the coil 31 is formed by frame plating, for example, on the insulating layer 30. Next, the second layer 28C and the coupling layer 28D are formed by frame plating, for example. Alternatively, the coil 31 may be formed after the second layer 28C and the coupling layer 28D are formed. In the intra-row portion to be removed, electrode layers 44A and 44B are formed by frame plating, for example, on the electrode layers 43A and 43B in the region in which the opening of the insulating layer 30 is formed. The electrode layers 44A and 44B are made of a conductive material. The material of the electrode layers 44A and 44B may be the same as that of the second layer 28C and the coupling layer 28D, and the second layer 28C, the coupling layer 28D, and the electrode layers 44A and 44B may be formed at the same time.

Next, the insulating layer 32 made of photoresist, for example, is selectively formed in the space between adjacent ones of the turns of the coil 31 and around the coil 31. Next, the insulating layer 33 having a thickness of 4 to 4.5 µm, for example, is formed on the entire top surface of the layered structure. Next, the insulating layer 33 is polished by CMP, for example, so that the second layer 28C, the coupling layer 28D, the coil 31, and the electrode layers 44A and 44B are exposed, and the top surfaces of the second layer 28C, the coupling layer 28D, the coil 31, the electrode layers 44A and 44B, and the insulating layers 32 and 33 are thereby flattened. Next, the insulating layer 34 is formed on the coil 31 and the insulating layer 32.

Next, in the pre-head portion, the third layer 28E is formed by frame plating, for example, to complete the shield layer 28. In the intra-row portion to be removed, electrode layers 45A and 45B are formed by frame plating, for example, on the electrode layers 44A and 44B. The electrode layers 45A and 45B are made of a conductive material. The material of the electrode layers 45A and 45B may be the same as that of the third layer 28E, and the third layer 28E and the electrode layers 45A and 45B may be formed at the same time.

Next, a protection layer 35 is formed to cover the entire top surface of the layered structure. Wiring and terminals are then formed on the protection layer 35. In the pre-head portion, two terminals connected to the MR element 5 and two terminals connected to the coil 31 are formed on the protection layer 35. In the intra-row portion to be removed, two terminals connected to the first resistor element 6 and two terminals connected to the second resistor element 42a through the electrode layers 43A, 44A and 45A and the electrode layers 43B, 44B and 45B are formed.

In such a manner, components of a plurality of magnetic heads including a plurality of sets of the MR element 5, the pole layer 24 and the coil 31 are formed in the single substrate 1. The magnetic head substructure is thus fabricated in which a plurality of rows of pre-head portions that will be the magnetic heads later are aligned. The magnetic head substructure is cut in a neighborhood of the region ABS. A surface formed by cutting the magnetic head substructure is polished to form the medium facing surfaces 40. Furthermore, a plurality of pre-head portions are separated from one another by cutting the substructure, and a plurality of magnetic heads are thereby formed. When the medium facing surfaces 40 are formed, the magnetic layers 241Q and 242Q become the first layer 241 and the second layer 242, respectively.

As shown in FIG. 1, the magnetic head substructure comprises the pre-head portions 101, the inter-row portions 102 to be removed, and the intra-row portions 103 to be removed. In each of the intra-row portions 103, the first resistor element 6, two leads 111A and 111B connected to the first resistor element 6, and the resistor layer 42 including the second resistor element 42a are provided. In each of the intra-row portions 103, two terminals 112A and 112B connected to the leads 111A and 111B, and two terminals 113A and 113B connected to the resistor layer 42 are provided on the protection layer 35. In FIG. 1, the first resistor element 6 and the second resistor element 42a are shown in different ones of the intra-row portions 103 for convenience. However, the first resistor element 6 and the second resistor element 42a are actually located at a distance from each other along the vertical direction in each of the intra-row portions 103.

FIG. 4 illustrates the main part of each of the pre-head portion 101 and the intra-row portion 103 in the state in which the medium facing surface 40 is formed. As shown in FIG. 4, the first resistor element 6 is located such that a portion thereof is exposed at the medium facing surface 40 when the medium facing surface 40 is formed. The first resistor element 6 has a resistance that varies depending on the location of an end of the MR element 5 located in the medium facing surface 40 along the direction orthogonal to the medium facing surface 40 when the medium facing surface 40 is formed. The second resistor element 42a is located such that a portion thereof is exposed at the medium facing surface 40 when the medium facing surface 40 is formed. The second resistor element 42a has a resistance that varies depending on the location of the end face of the track width defining portion 24A located in the medium facing surface 40 along the direction orthogonal to the medium facing surface 40 when the medium facing surface 40 is formed.

The distance D10 between the first resistor element 6 and the substrate 1 is closer to the distance D1 between the MR element 5 and the substrate 1 than the distance D2 between the track width defining portion 24A and the substrate 1. In the embodiment, in particular, the distance D10 between the first resistor element 6 and the substrate 1 is equal to the distance D1 between the MR element 5 and the substrate 1.

The distance D20 between the second resistor element 42a and the substrate 1 is closer to the distance D2 between the track width defining portion 24A and the substrate 1 than the distance D1 between the MR element 5 and the substrate 1. In the embodiment, in particular, the distance between the top surface of the second resistor element 42a and the substrate 1 is nearly equal to the distance between the top surface of the track width defining portion 24A and the substrate 1.

The distance between an end of the second resistor element 42a located in the medium facing surface 40 and the opposite end after the medium facing surface 40 is formed has a relationship with the resistance value of the second resistor element 42a obtained after the medium facing surface 40 is formed, and also has a relationship with the length of the track width defining portion 24A taken in the direction orthogonal to the medium facing surface 40, that is, the neck height NH. Therefore, the resistance value of the second resistor element 42a obtained after the medium facing surface 40 is formed corresponds to the neck height NH. That is, the neck height NH is obtainable from the resistance value of the second resistor element 42a. In the embodiment, in particular, the distance between the end of the second resistor element 42a located in the medium facing surface 40 and the opposite end is equal to the neck height NH. In this case, since the resistance of the second resistor element 42a is substantially inversely proportional to the neck height NH, it is possible to obtain the neck height NH from the resistance value of the second resistor element 42a, using a simple expression.

A specific example of the step of fabricating a plurality of magnetic heads by separating the magnetic head substructure will now be described. In the step of fabricating the magnetic heads, first, the substructure is cut at the positions in the inter-row portions 102 shown in FIG. 1 to form head aggregates each of which includes a row of plurality of pre-head portions 101. Next, a surface (the surface closer to the region ABS) formed in each of the head aggregates by cutting the substructure is polished (lapped) to form the medium facing surfaces 40 of the pre-head portions 101 that the head aggregate includes.

Figure 43:
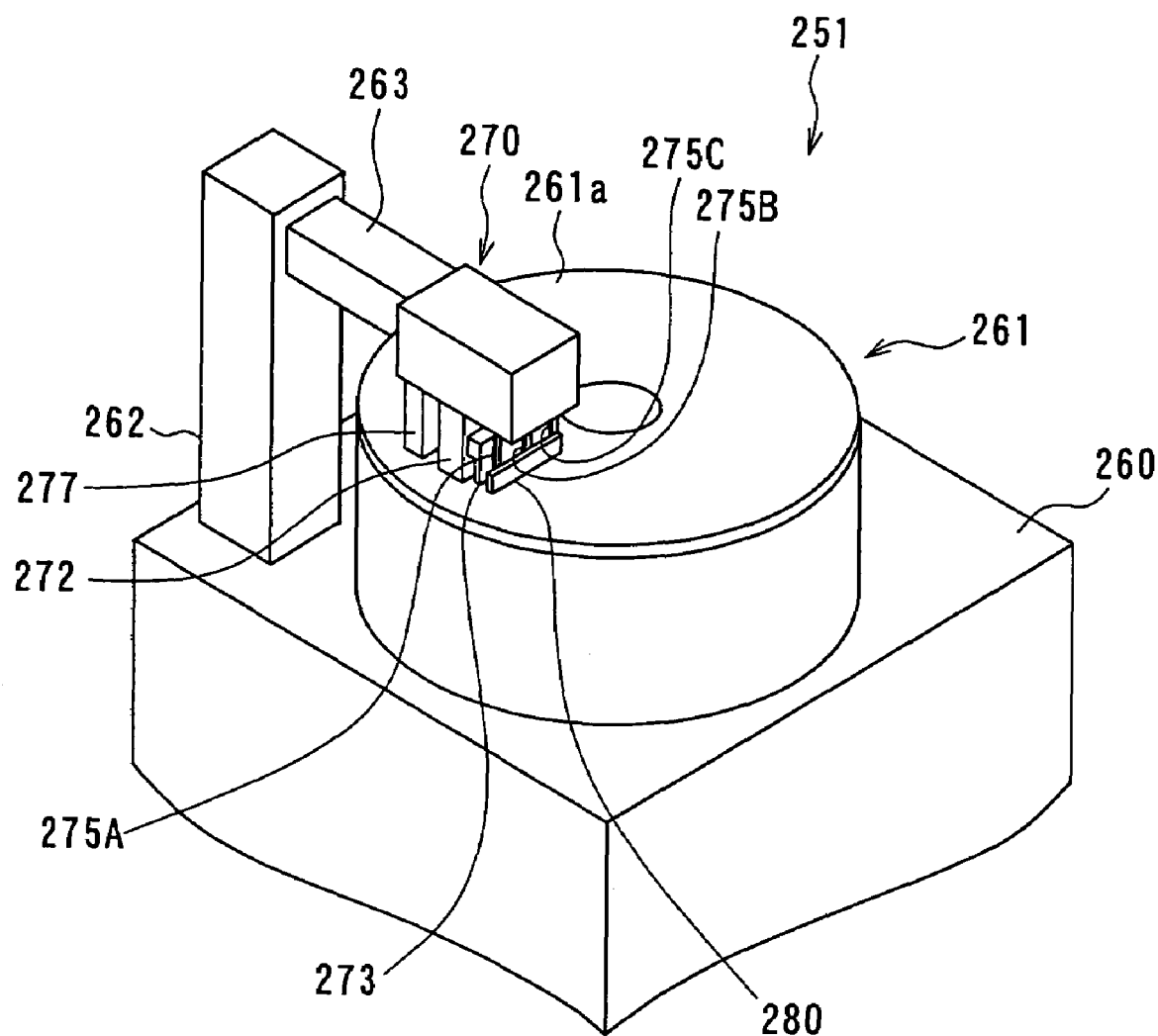
FIG. 43 is a perspective view for schematically illustrating the configuration of a lapping apparatus used in the method of manufacturing the magnetic head of the first embodiment of the invention.
Figure 48:
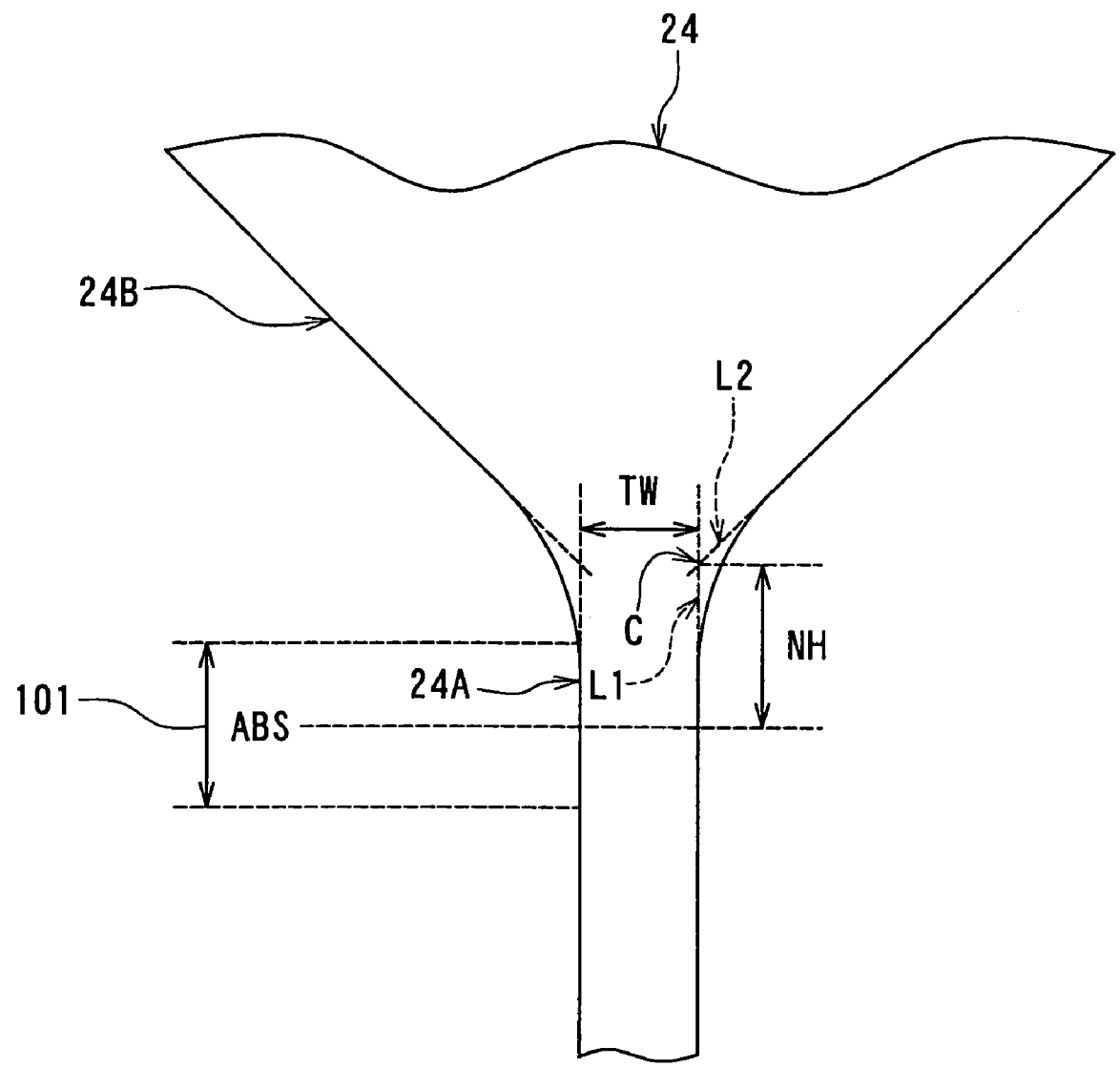
FIG. 48 illustrates an example of shape of the top surface of the pole layer of the magnetic head of the first embodiment of the invention.

Reference is now made to FIG. 43 and FIG. 48 to describe a method of forming the medium facing surfaces 40 by lapping the head aggregate. In this method, the surface formed by cutting the substructure is lapped to form the medium facing surfaces 40, while monitoring the resistance values of the MR elements 5, the first resistor elements 6 and the second resistor elements 42a that the head aggregate includes, so that the resistance of each of the MR elements 5, the first resistor elements 6 and the second resistor elements 42a is of a specific value. As a result, the MR height, the throat height TH and the neck height NH of each of the pre-head portions 101 are controlled to be of respective desired values.

FIG. 43 is a perspective view illustrating a schematic configuration of a lapping apparatus for lapping the head aggregate. This lapping apparatus 251 comprises: a table 260; a rotating lapping table 261 provided on the table 260; a strut 262 provided on the table 260 on a side of the rotating lapping table 261; and a supporter 270 attached to the strut 262 through an arm 263. The rotating lapping table 261 has a lapping plate (surface plate) 261a to come to contact with the surface to be the medium facing surfaces 40 of the pre-head portions 101 that the head aggregate includes.

The supporter 270 comprises: a supporter body 277 coupled to the arm 263; a base 272 placed in front of the supporter body 277; a jig retainer 273 placed in front of the base 272; and three load application rods 275A, 275B and 275C placed in front of the jig retainer 273 at equal spacings. A jig 280 is to be fixed to the jig retainer 273. The jig 280 has three load application sections each of which is in the shape of a hole having an oblong cross section. Load application pins are provided at the lower ends of the load application rods 275A, 275B and 275C, respectively. The load application pins have respective heads to be inserted to the load application sections (holes) of the jig 280, the heads each having an oblong cross section. Each of the load application pins is driven by an actuator (not shown) in the vertical, horizontal (along the length of the jig 280) and rotational directions.

The jig 280 has a retainer for retaining the head aggregate. With this jig 280, the retainer and the head aggregate are deformed by applying loads in various directions to the three load application sections. It is thereby possible that the medium facing surfaces 40 are formed so that the resistance of each of the MR elements 5, the first resistor elements 6 and the second resistor elements 42a that the head aggregate includes is of a target value.

Figure 44:
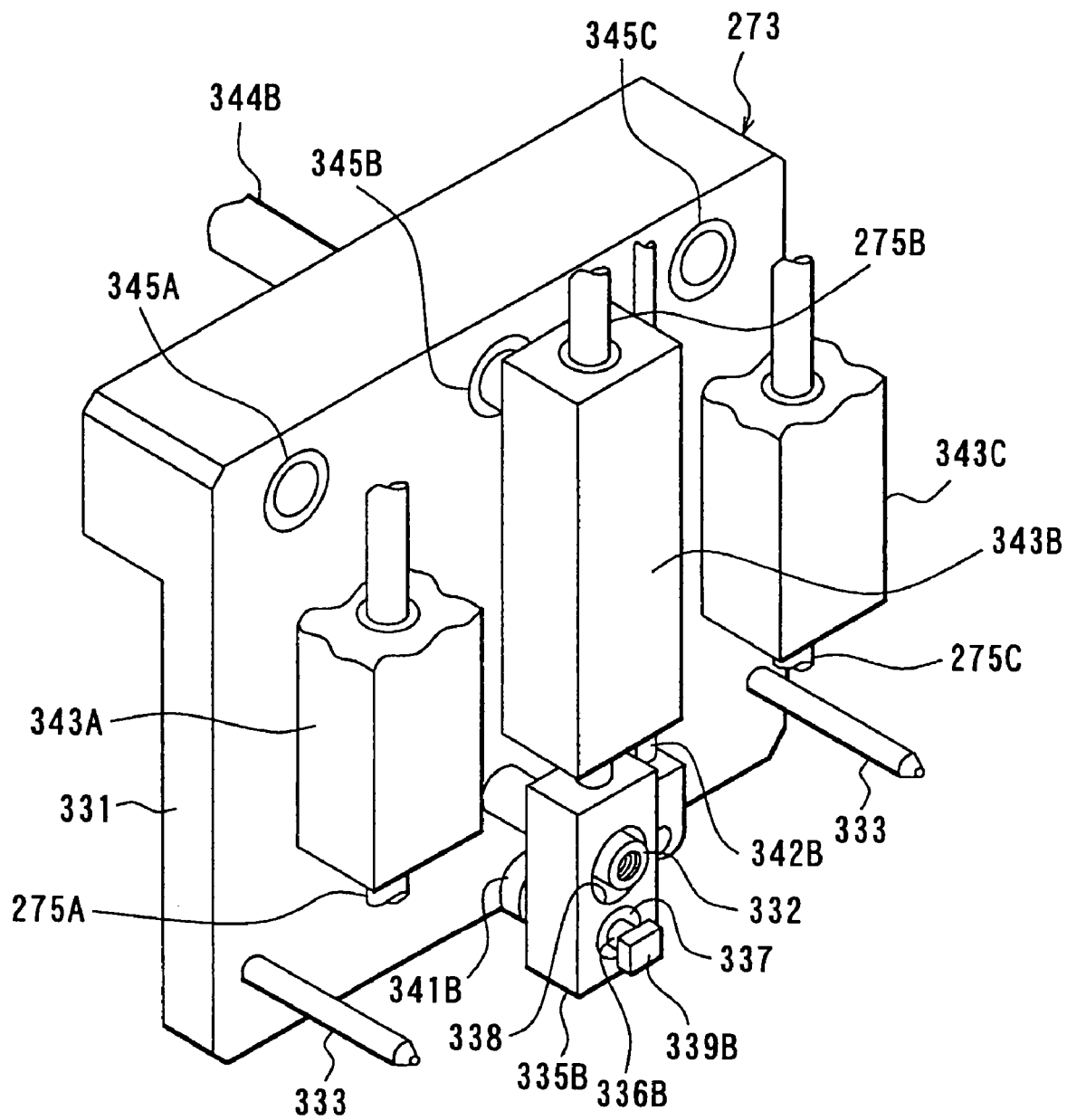
FIG. 44 is a perspective view for illustrating the jig retainer of FIG. 43 and a neighborhood thereof.
Figure 45:
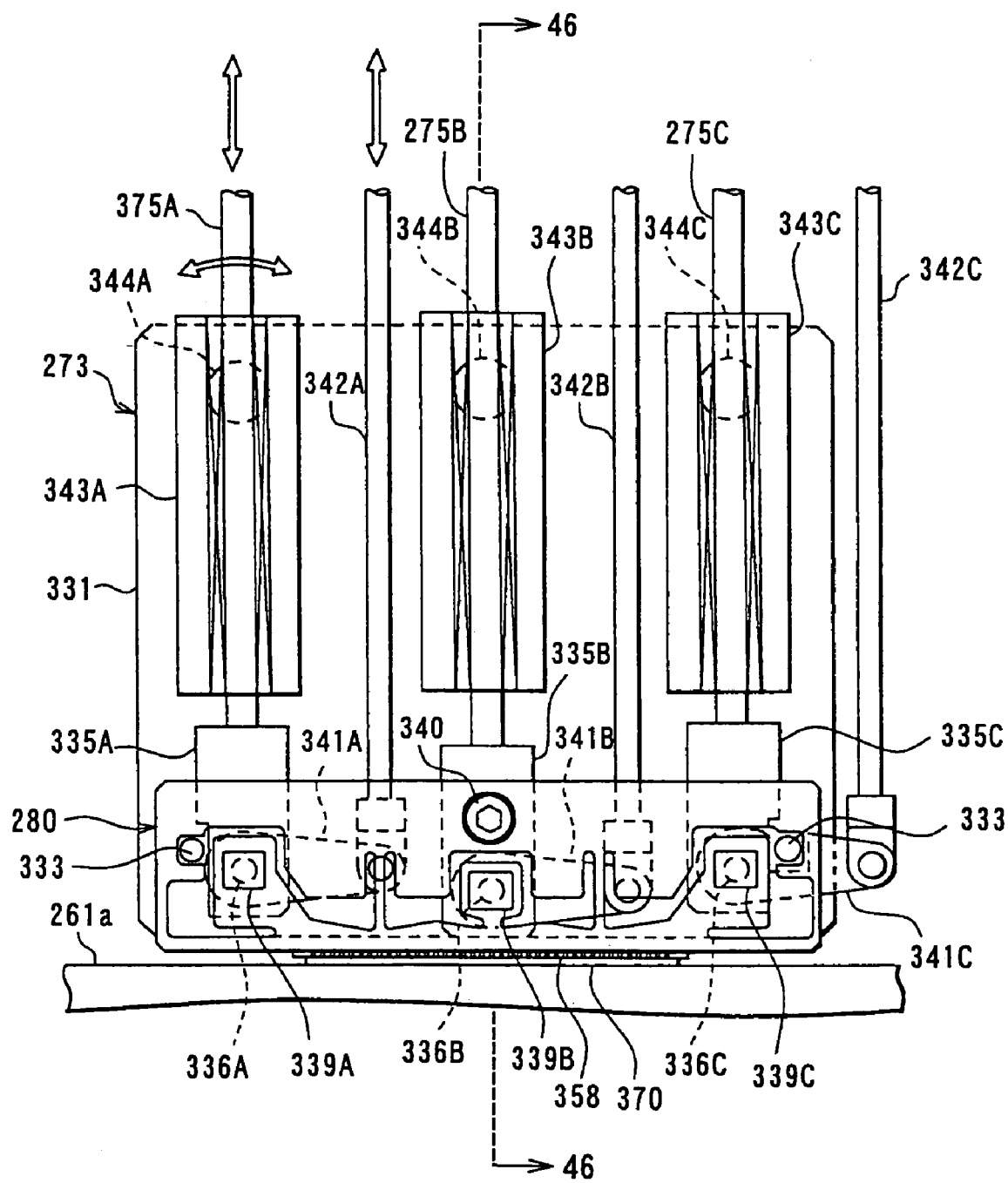
FIG. 45 is a front view for illustrating a state in which a jig is fixed to the jig retainer of FIG. 44.
Figure 46:
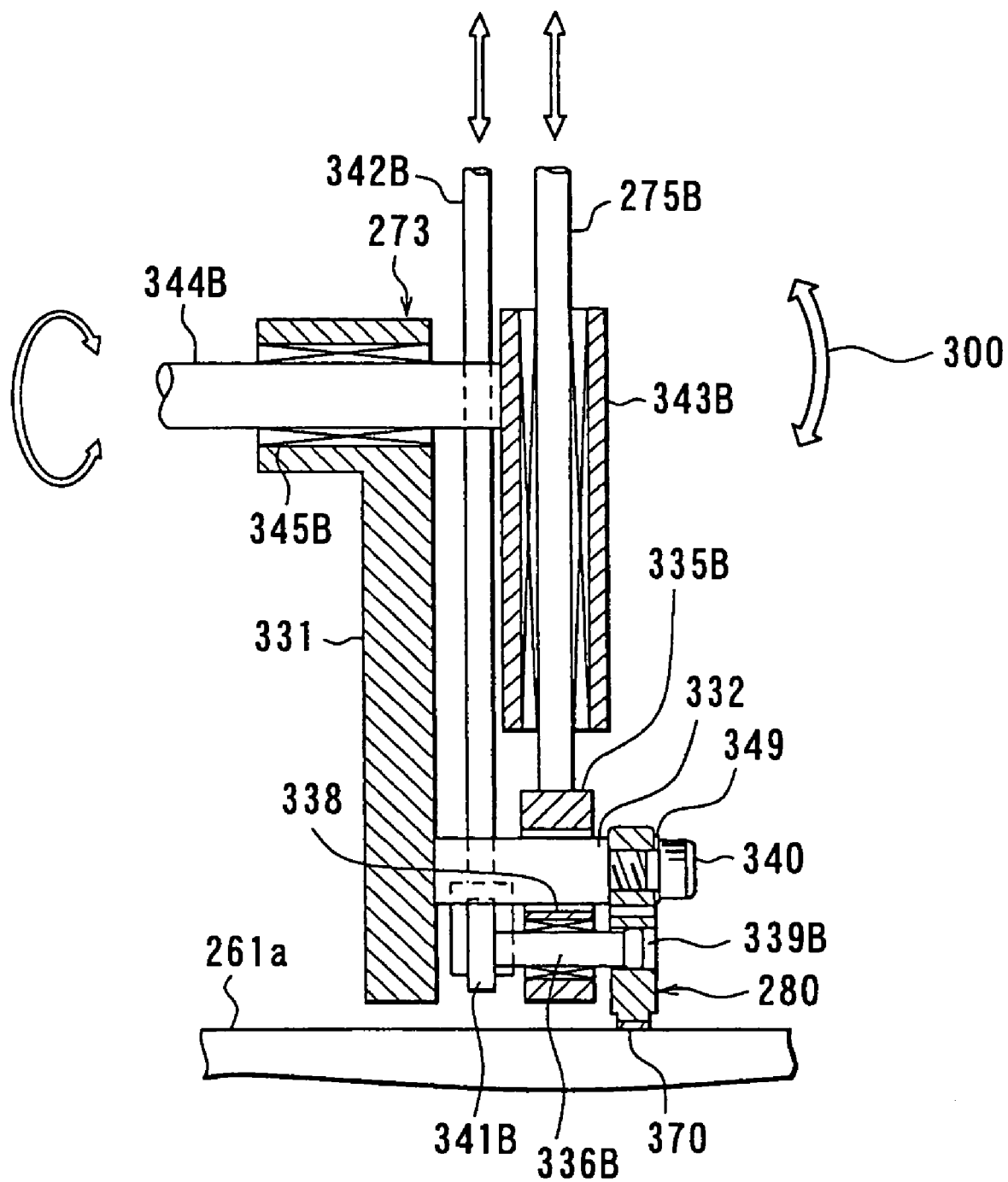
FIG. 46 is a cross-sectional view taken along line 46-46 of FIG. 45.

FIG. 44 is a perspective view illustrating the jig retainer 273 of FIG. 43 and a neighborhood thereof. FIG. 45 is a front view illustrating the state in which the jig is fixed to the jig retainer 273. FIG. 46 is a cross-sectional view taken along line 46-46 of FIG. 45. The jig retainer 273 incorporates: a retainer body 331; a jig fixing pin 332 protruding forward and provided in the middle of the horizontal direction in the neighborhood of the lower end of the front of the jig retainer body 331; and guide pins 333, 333 as members for preventing rotation that protrude forward and are provided near ends in the horizontal direction in the neighborhood of the lower end of the front of the jig retainer main body 331. Each of the guide pins 333, 333 is formed such that a major part is cylinder-shaped and a tip portion has such a shape that the diameter decreases toward the tip. The jig fixing pin 332 has an internal thread formed in the tip. The jig 280 is to be fixed to the jig fixing pin 332 with a bolt 340 as a fixture. The head aggregate 370 is to be attached to the retainer of the jig 280.

Load application blocks 335A, 335B and 335C each of which is rectangular-solid-shaped are fixed to the lower ends of the load application rods 275A, 275B and 275C. Bearings 337 are provided near the lower ends of the load application blocks 335A, 335B and 335C, the load application pins 336A, 336B and 336C being rotatably inserted to the bearings 337. The load application block 335B has a hole 338 formed in the location corresponding to the jig fixing pin 332, the jig fixing pin 332 being inserted to the hole 338 such that the load application block 335B is movable over a specific distance in the vertical and horizontal directions.

The load application pins 336A, 336B and 336C pass through the bearings 337 of the load application blocks 335A, 335B and 335C, respectively, and the front ends of the load application pins 336A, 336B and 336C protrude from the front end faces of the load application blocks 335A, 335B and 335C, respectively. Heads 339A, 339B and 339C each of which is rectangular-solid-shaped are formed on the tips of the load application pins 336A, 336B and 336C. The rear ends of the load application pins 336A, 336B and 336C are joined to ends of levers 341A, 341B and 341C disposed between the retainer body 331 and the load application blocks 335A, 335B and 335C. The other ends of the levers 341A, 341B and 341C are rotatably coupled to the lower ends of shafts 342A, 342B and 342C for swinging the levers 341A, 341B and 341C.

In a region above the load application blocks 335A, 335B and 335C, supporter members 343A, 343B and 343C are provided for supporting the load application rods 275A, 275B and 275C rotatably and movably in the vertical direction. Tips of driving rods 344A, 344B and 344C are joined to the rear ends of the supporter members 343A, 343B and 343C. The driving rods 344A, 344B and 344C pass through bearings 345A, 345B and 345C provided in the retainer body 331, and the rear ends of the driving rods 344A, 344B and 344C are introduced to the base 272.

The load application rods 275A, 275B and 275C are each driven in the vertical direction by an actuator (not shown) provided in the base 272. The load application pins 336A, 336B and 336C are thereby driven in the vertical direction. In such a manner, it is possible to apply loads in the vertical direction to the load application sections of the jig 280.

The driving rods 344A, 344B and 344C are each driven in the rotational direction by another actuator (not shown) provided in the base 272. The load application pins 336A, 336B and 336C are thereby driven in the horizontal direction. In such a manner, it is possible to apply loads in the horizontal direction to the load application sections of the jig 280.

The shafts 342A, 342B and 342C are each driven in the vertical direction by still another actuator (not shown) provided in the base 272. The load application pins 336A, 336B and 336C are thereby driven in the rotational direction. In such a manner, it is possible to apply loads in the rotational direction to the load application sections of the jig 280.

The entire supporter 270 is driven by still another actuator in the direction indicated with numeral 300 in FIG. 46. It is thereby possible to change the angle formed between the top surface of the lapping plate 261a and the lower surface of the jig 280. In such a manner, it is possible to change the angle formed between the medium facing surface 40 and the top surface of the substrate 1.

Figure 47:
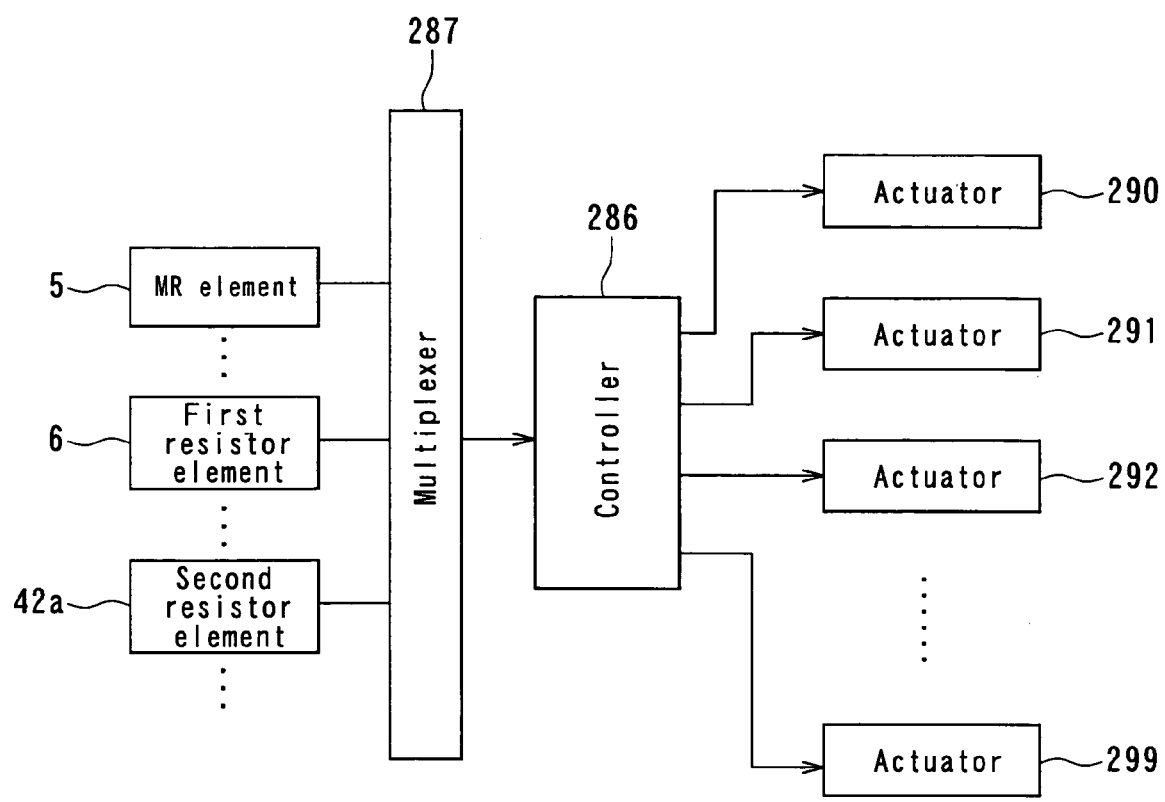
FIG. 47 is a block diagram illustrating an example of circuit configuration of the lapping apparatus of FIG. 43.

FIG. 47 is a block diagram showing an example of circuit configuration of the lapping apparatus shown in FIG. 43. This lapping apparatus comprises: nine actuators 291 to 299 for applying loads in the three directions to the load application sections of the jig 280; and an actuator 290 for driving the entire supporter 270 in the direction indicated with numeral 300 in FIG. 46. The lapping apparatus further comprises: a controller 286 for controlling the actuators 290 to 299 through monitoring the resistance values of a plurality of MR elements 5, the first resistor elements 6 and the second resistor elements 42a that the head aggregate 370 includes; and a multiplexer 287, connected to the MR elements 5, the first resistor elements 6 and the second resistor elements 42a in the head aggregate 370 through a connector (not shown), for selectively connecting one of the MR elements 5, the first resistor elements 6 and the second resistor elements 42a to the controller 286.

In this lapping apparatus, the controller 286 monitors through the multiplexer 287 the resistance values of the MR elements 5, the first resistor elements 6 and the second resistor elements 42a that the head aggregate 370 includes, and controls the actuators 290 to 299 so that each of the resistance values is a specific value.

Flying rails are formed by etching, for example, in the medium facing surfaces 40 formed by lapping as described above. The head aggregate is then cut at the locations of the intra-row portions 103 to be removed that are shown in FIG. 1, so that the pre-head portions 101 are separated from one another, and a plurality of magnetic heads are thereby formed.

The specific details of the step of fabricating the magnetic heads by separating the magnetic head substructure are not limited to the foregoing example. For example, the magnetic heads may be fabricated in the following manner. First, the magnetic head substructure is cut to fabricate a first head aggregate including a plurality of rows of pre-head portions 101. Next, a surface of the first head aggregate is lapped to form the medium facing surfaces 40 of a row of pre-head portions 101. Next, the first head aggregate is cut so that the row of pre-head portions 101 in which the medium facing surfaces 40 have been formed is separated to be a second head aggregate. Next, the second head aggregate is cut so that the pre-head portions 101 are separated from one another, and a plurality of magnetic heads are thereby fabricated.

According to the embodiment as thus described, the surface formed by cutting the magnetic head substructure is lapped while monitoring the resistance values of a plurality of MR elements 5, first resistor elements 6 and second resistor elements 42a that the head aggregate includes. The medium facing surfaces 40 are thereby formed so that the resistance value of each of the MR elements 5, the first resistor elements 6 and the second resistor elements 42a is a specific value. As a result, according to the embodiment, it is possible to form the medium facing surfaces 40 at a desired location with accuracy, so that the MR height, the throat height TH and the neck height NH of each of the pre-head portions 101 are of desired values. Furthermore, if the medium facing surfaces 40 are formed in such a manner, it is possible to control the angle θ shown in FIG. 4 formed between the medium facing surface 40 and the top surface of the substrate 1 to be of a desired value such as 90 degrees.

Consideration will now be given to a case in which the second resistor elements 42a are not provided in the magnetic head substructure, and the medium facing surfaces 40 are formed while monitoring the resistance values of the MR elements 5 and the first resistor elements 6 only. In this case, it is possible to form the medium facing surfaces 40 so that the MR height of each of the pre-head portions 101 is of a desired value. In this case, however, if the angle formed between each of the medium facing surfaces 40 and the top surface of the substrate 1 is other than a desired angle such as 90 degrees, a portion of the medium facing surface 40 in which the end face of the track width defining portion 24A is exposed is located out of a desired location even though a portion of the medium facing surface 40 in which the end of the MR element 5 is exposed is located at a desired location. As a result, the throat height TH and the neck height MH are other than desired values.

In contrast, according to the embodiment, the second resistor elements 42a are provided in the magnetic head substructure, and the distance between each of the second resistor elements 42a and the substrate 1 is different from the distance between the MR element 5 and the substrate 1 and the distance between each of the first resistor elements 6 and the substrate 1. Therefore, the medium facing surface 40 is formed so that the resistance of each of the MR elements 5, the first resistor elements 6 and the second resistor elements 42a that the head aggregate includes is of a specific value. It is thereby possible that the angle θ formed between the medium facing surface 40 and the top surface of the substrate 1 is of a desired value such as 90 degrees. As a result, according to the embodiment, it is possible to control not only the MR height but also the throat height TH and the neck height NH to be of desired values.

According to the embodiment, the resistance of each of the second resistor elements 42a corresponds to the neck height NH. Therefore, it is important to align the second resistor element 42a and the pole layer 24 with respect to each other with accuracy. In the embodiment the opening 17a of the nonmagnetic conductive layer 17 and the second resistor element 42a are patterned at the same time. It is thereby possible to align the opening 17a and the second resistor element 42a with respect to each other with accuracy. The shape and location of the pole layer 24 are determined by the shape and location of the opening 17a. Because of these features, according to the embodiment, it is possible to align the second resistor element 42a and the pole layer 24 with respect to each other with accuracy.

According to the embodiment, the pole layer 24 is disposed in the groove 15a of the encasing layer 15 with the nonmagnetic film 20 and the polishing stopper layer 23 disposed between the pole layer 24 and the groove 15a. Therefore, the shape of the pole layer 24 is determined by the shape of the groove 15a. As thus described, according to the embodiment, since the side portions of the pole layer 24 are not etched, it is impossible that the neck height NH is greater than a desired value and/or the pole layer 24 is greatly out of a desired shape. Furthermore, according to the embodiment, it is possible to form the medium facing surface 40 at a desired location with accuracy as described above. Because of these features, it is possible to determine the track width with accuracy even if the neck height NH is small. This will be described, referring to FIG. 48.

FIG. 48 illustrates an example of shape of the top surface of the pole layer of the embodiment. FIG. 48 shows the boundary between the track width defining portion 24A and the wide portion 24B of the pole layer 24 and a neighborhood thereof before the medium facing surface 40 is formed. In FIG. 48, 'ABS' indicates the region in which the medium facing surface 40 is to be formed, 'TW' indicates the track width, and 'NH' indicates the neck height as designed. As shown in FIG. 48, if the boundary between the track width defining portion 24A and the wide portion 24B is not clear, the neck height is defined as below. In the top surface of the pole layer 24, an imaginary line L1 passes through the intersection point of the region ABS and the side portion of the track width defining portion 24A, and extends in the direction orthogonal to the region ABS. An imaginary line L2 extends from a straight line portion of the side portion of the wide portion 24B connected to the side portion of the portion 24A and extends in the direction in which the straight line portion extends. The intersection point of the imaginary lines L1 and L2 is defined as C. The distance between the region ABS and the point C is defined as the neck height. The neck height as thus defined is nearly equal to the neck height NH as designed. In FIG. 48, the range indicated with numeral 101 indicates a range of displacements of a portion of the medium facing surface 40 in which the end face of the track width defining portion 24A is located.

As described above, according to the embodiment, it is impossible that the pole layer 24 is greatly out of a desired shape. In addition, the range of displacements indicated with numeral 101 is small. As a result, even if the neck height NH is small, there hardly occur variations in track width TW resulting from displacements of the medium facing surface 40, and it is therefore possible to determine the track width TW with accuracy.

According to the embodiment, it is possible to form the pole layer 24 with accuracy that has a small width and a shape capable of preventing problems resulting from the skew.

According to the embodiment, the pole layer 24 is disposed in the groove 15a of the encasing layer 15 with the nonmagnetic film 20 and the polishing stopper layer 23 disposed between the pole layer 24 and the groove 15a. As a result, it is possible to reduce the width of the top surface of the track width defining portion 24A that defines the track width.

According to the embodiment, the surface formed by cutting the magnetic head substructure may be lapped while monitoring the resistance values of a plurality of MR elements 5 and second resistor elements 42a that the head aggregate includes, without providing the first resistor elements 6, and the medium facing surfaces 40 are thereby formed so that the resistance value of each of the MR elements 5 and the second resistor elements 42a is a specific value. In this case, the second resistor elements 42a correspond to the resistor elements of the invention. It is possible to achieve the above-described effects in this case, too.

According to the embodiment, the surface formed by cutting the magnetic head substructure may be lapped while monitoring the resistance values of a plurality of first resistor elements 6 and second resistor elements 42a that the head aggregate includes, and the medium facing surfaces 40 are thereby formed so that the resistance value of each of the first resistor elements 6 and the second resistor elements 42a is a specific value. It is possible to achieve the above-described effects in this case, too.

Figure 49:
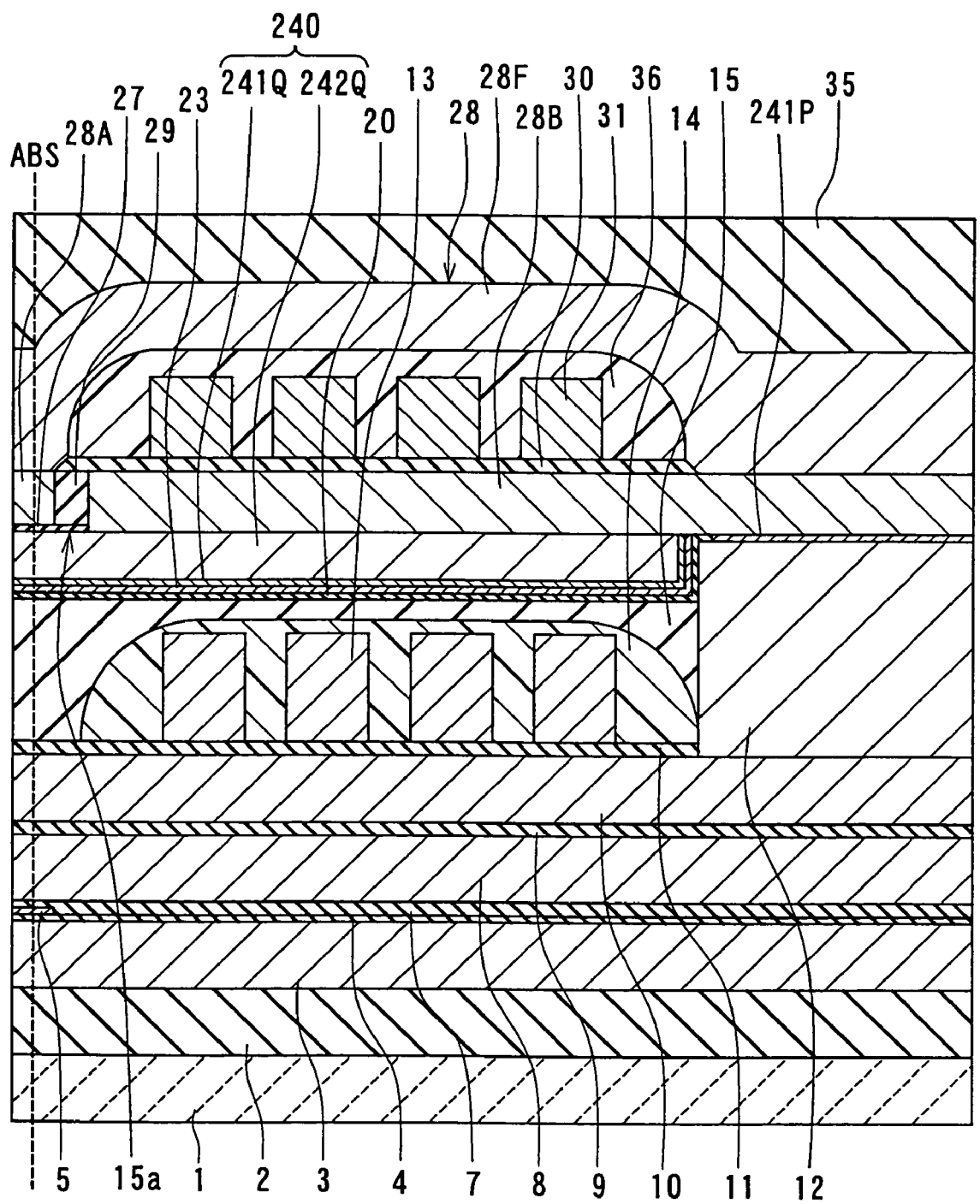
FIG. 49 is a cross-sectional view for illustrating the main part of a magnetic head substructure of a first modification example of the first embodiment of the invention.
Figure 50:
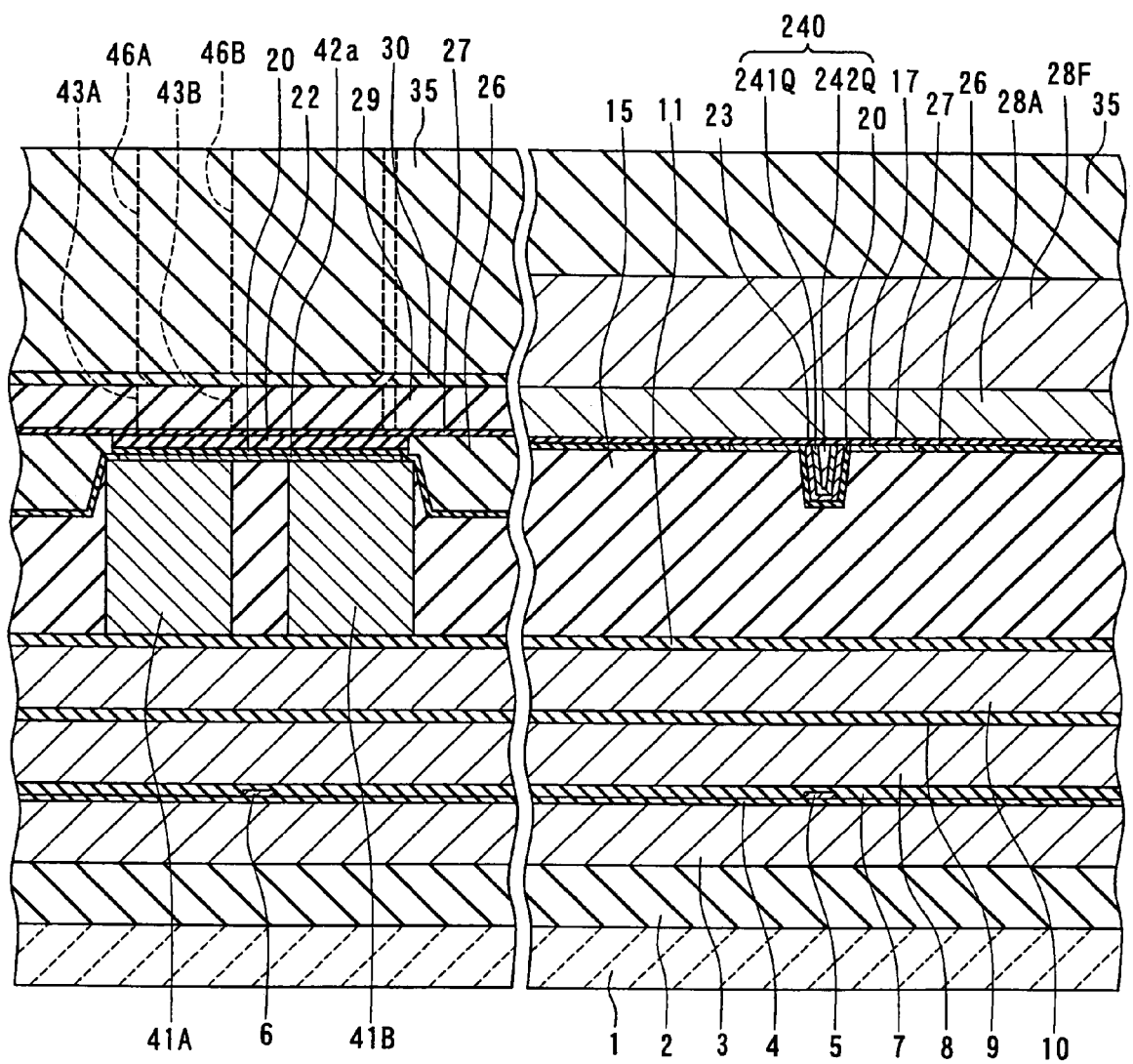
FIG. 50 is another cross-sectional view of the magnetic head substructure of FIG. 49.

First to third modification examples of the embodiment will now be described. FIG. 49 and FIG. 50 each illustrate a cross section of the main part of a magnetic head substructure of the first modification example. FIG. 49 shows a cross section orthogonal to the medium facing surface and the substrate. FIG. 50 shows a cross section taken in the position in which the medium facing surface is to be formed. The positions of the cross sections of FIG. 49 and FIG. 50 are the same as those of FIG. 40 and FIG. 41, respectively.

The substructure of the first modification example comprises an insulating layer 36 covering at least part of the coil 31 in place of the insulating layers 32 and 34 of FIG. 40. The shield layer 28 of the first modification example comprises a second layer 28F in place of the second layer 28C, the coupling layer 28D and the third layer 28E of FIG. 40. After the medium facing surface 40 is formed, the second layer 28F has an end located in the medium facing surface 40, and is disposed to couple the first layer 28A to the yoke layer 28B. The second layer 28F includes a portion located on a side of the at least part of the coil 31 covered with the insulating layer 36, the side being opposite to the magnetic layer 240 (the pole layer 24). The second layer 28F includes a portion located between the medium facing surface 40 and the coil 31. In this portion, the distance between the end located in the medium facing surface 40 and the other end increases as the distance from the first layer 28A increases. The second layer 28F is made of CoNiFe or NiFe, for example.

The substructure of the first modification example comprises an electrode layer 46A in place of the electrode layers 44A and 45A of FIG. 41, and an electrode layer 46B in place of the electrode layers 44B and 45B of FIG. 41. The remainder of configuration of the magnetic head substructure of the first modification example is the same as that of the substructure shown in FIG. 40 to FIG. 42.

Figure 51:
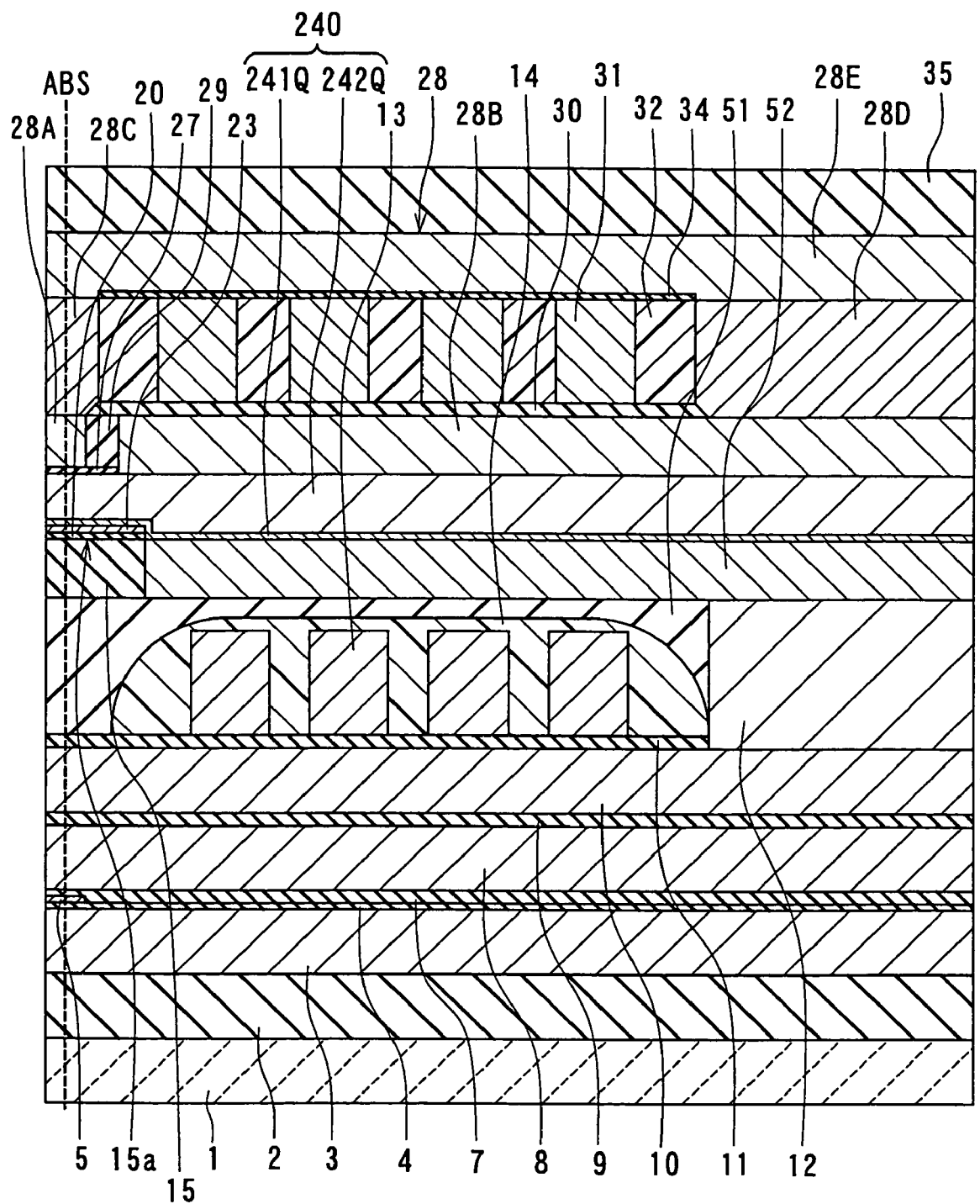
FIG. 51 is a cross-sectional view for illustrating the main part of a magnetic head substructure of a second modification example of the first embodiment of the invention.
Figure 52:
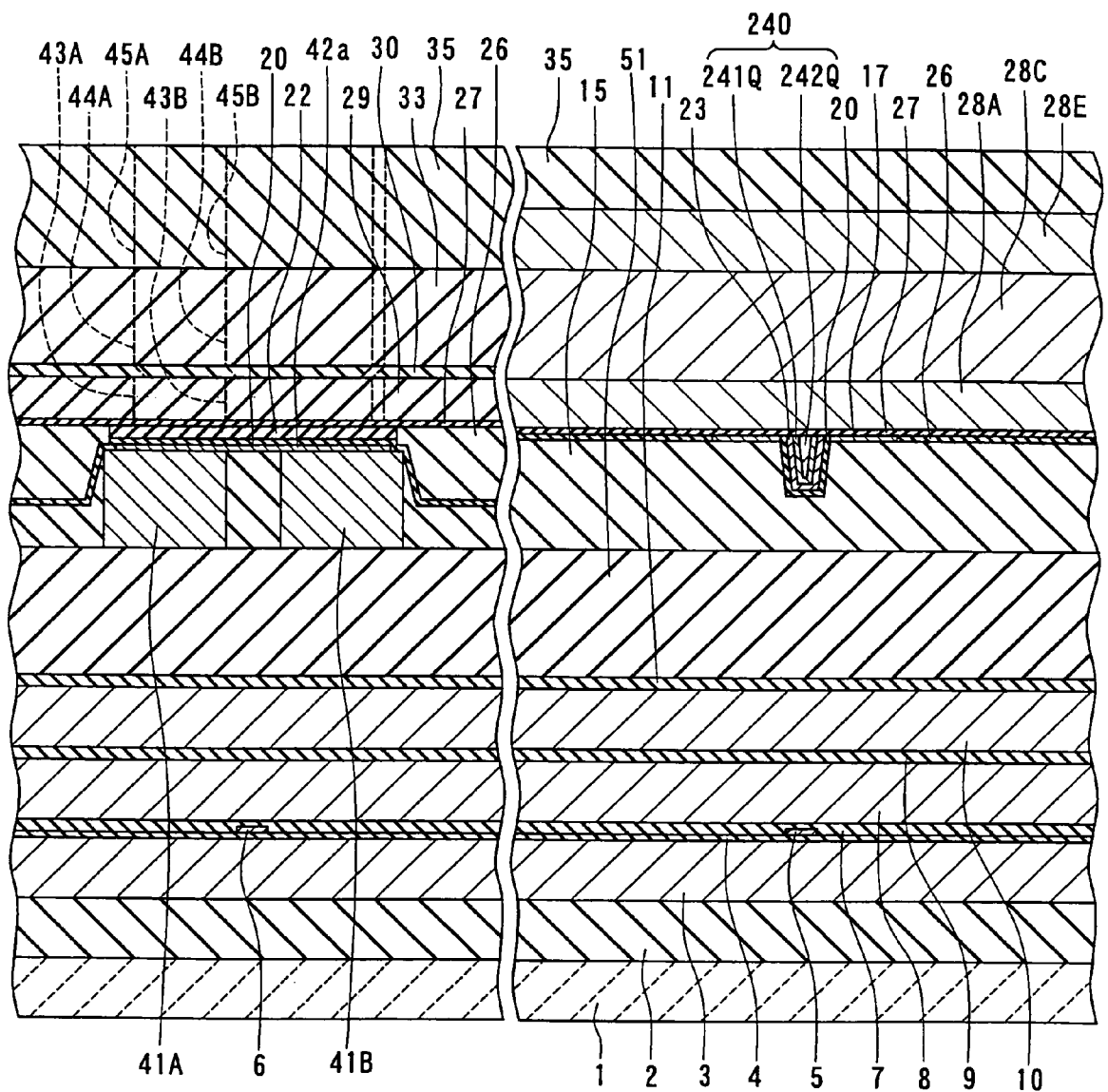
FIG. 52 is another cross-sectional view of the magnetic head substructure of FIG. 51.

FIG. 51 and FIG. 52 each illustrate a cross section of the main part of a magnetic head substructure of the second modification example. FIG. 51 shows a cross section orthogonal to the medium facing surface and the substrate. FIG. 52 shows a cross section taken in the position in which the medium facing surface is to be formed. The positions of the cross sections of FIG. 51 and FIG. 52 are the same as those of FIG. 40 and FIG. 41, respectively.

In the substructure of the second modification example, an insulating layer 51 covering the insulating layer 14 is provided, and the top surfaces of the insulating layer 51 and the coupling layer 12 are flattened. In the second modification example, a lower yoke layer 52 made of a magnetic material is formed on the insulating layer 51 and the coupling layer 12. An end of the lower yoke layer 52 closer to the medium facing surface 40 is located at a distance from the medium facing surface 40. In the second modification example, the encasing layer 15 is provided to cover the lower yoke layer 52. The groove 15a of the encasing layer 15 has a portion that reaches the top surface of the lower yoke layer 52. On the top surface of the lower yoke layer 52, portions of the nonmagnetic film 20 and the polishing stopper layer 23 disposed in the groove 15a are selectively removed by etching. A portion of the magnetic layer 240 (the pole layer 24) disposed in the groove 15a is in contact with the lower yoke layer 52. The remainder of configuration of the magnetic head substructure of the second modification example is the same as that of the substructure shown in FIG. 40 to FIG. 42.

Figure 53:
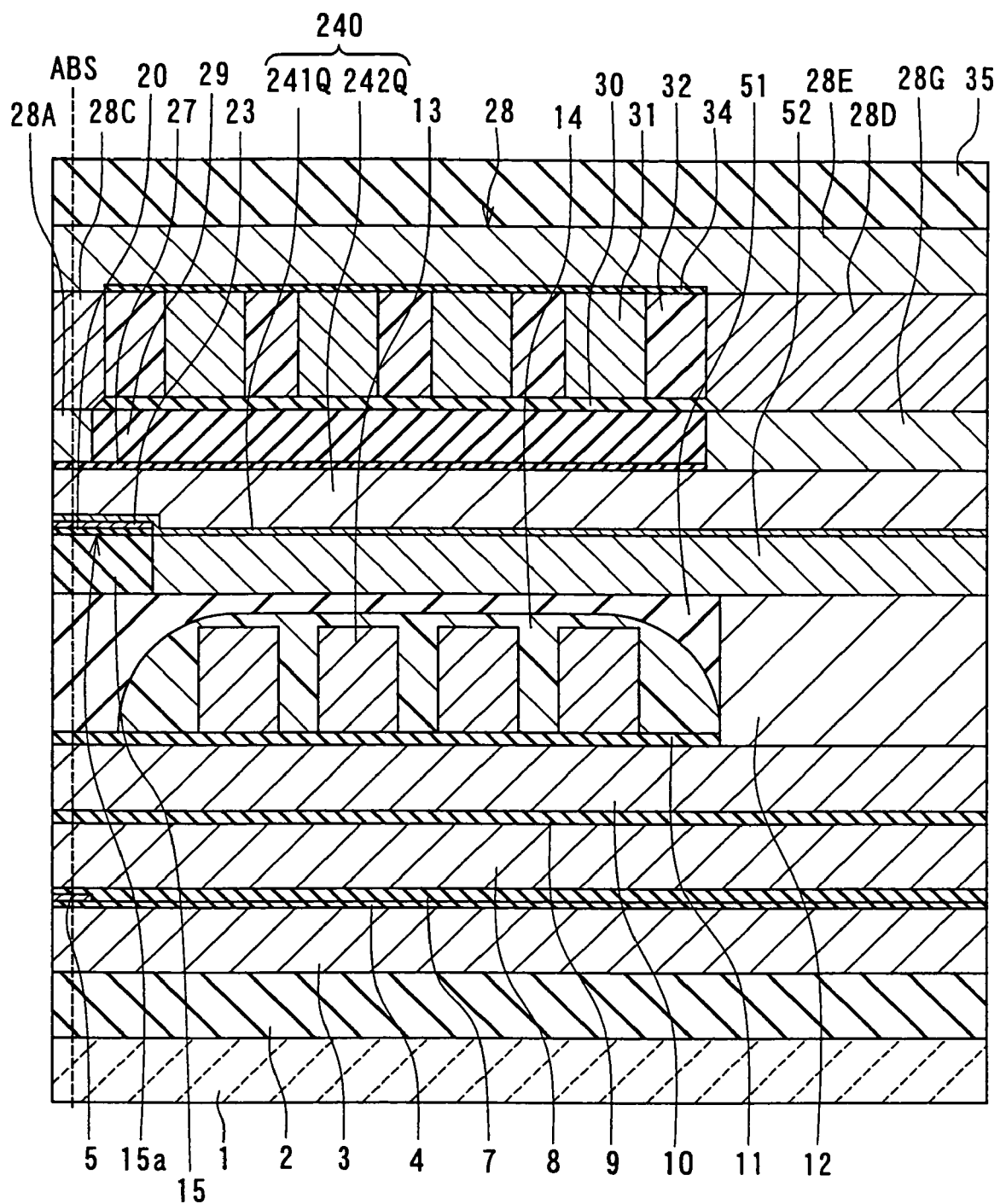
FIG. 53 is a cross-sectional view for illustrating the main part of a magnetic head substructure of a third modification example of the first embodiment of the invention.

FIG. 53 illustrates a cross section of the main part of a magnetic head substructure of the third modification example. FIG. 53 shows a cross section orthogonal to the medium facing surface and the substrate. The position of the cross section of FIG. 51 is the same as that of FIG. 40. In the substructure of the third modification example, a coupling layer 28G is provided in place of the yoke layer 28B of the second modification example. The coupling layer 28G is located only in a region below the coupling layer 28D. In the third modification example, the gap layer 27 and the nonmagnetic layer 29 are disposed between the magnetic layer 240 (the pole layer 24) and the insulating layer 30. The remainder of configuration of the magnetic head substructure of the third modification example is the same as that of the second modification example.

Second Embodiment

Figure 54:
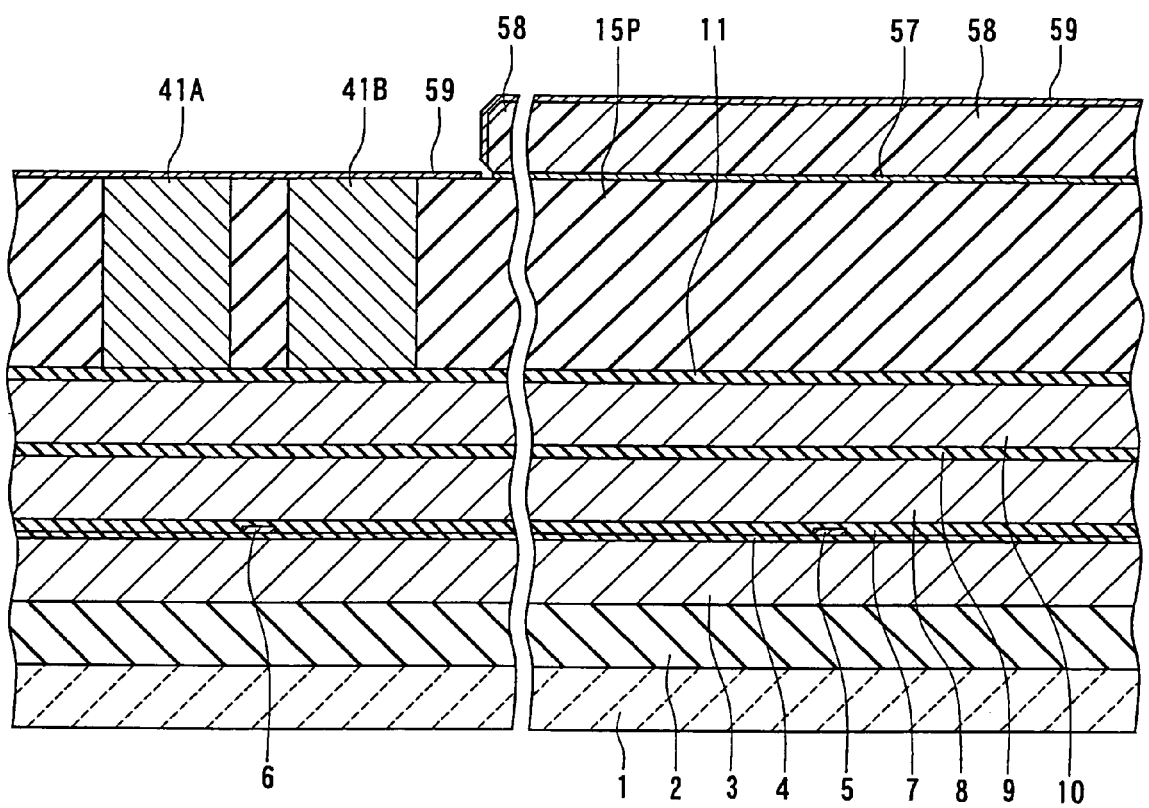
FIG. 54 is a cross-sectional view of a layered structure obtained in a step of a method of manufacturing a magnetic head of a second embodiment of the invention.
Figure 55:
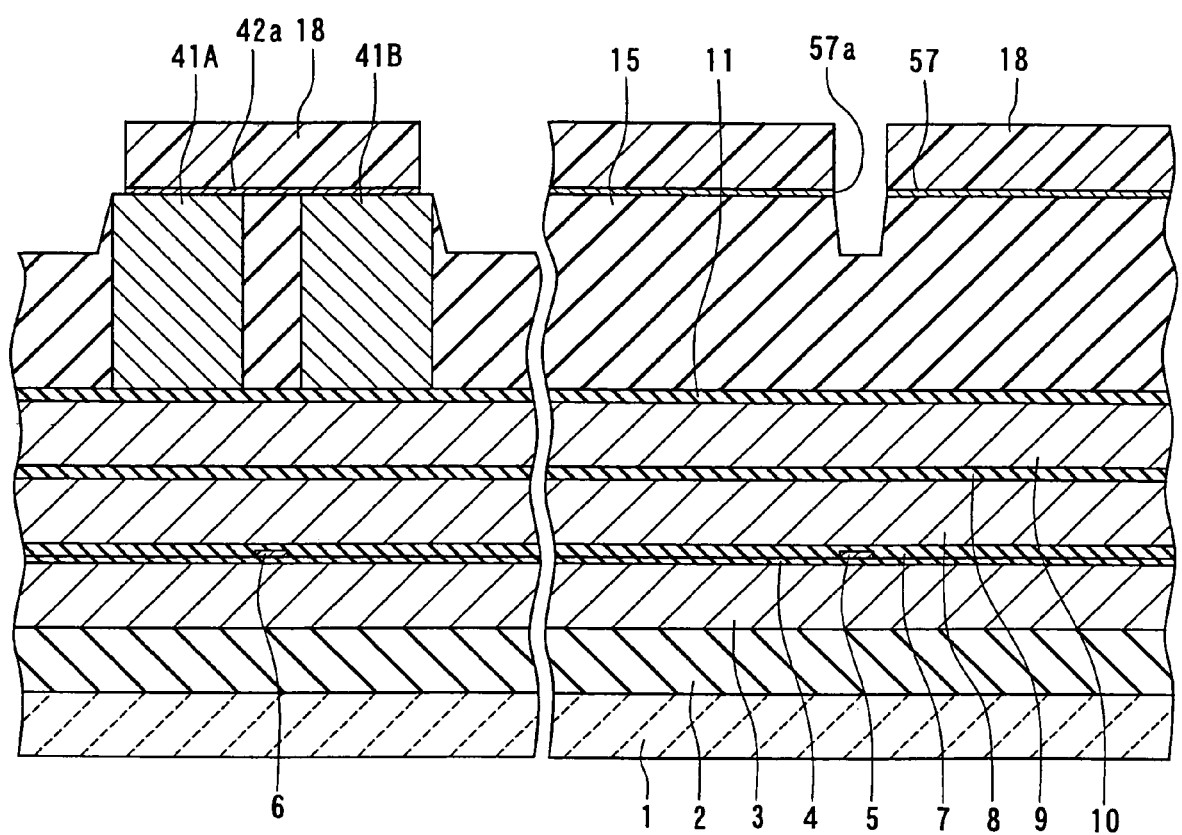
FIG. 55 is a cross-sectional view of the layered structure obtained in a step that follows the step shown in FIG. 54.
Figure 56:
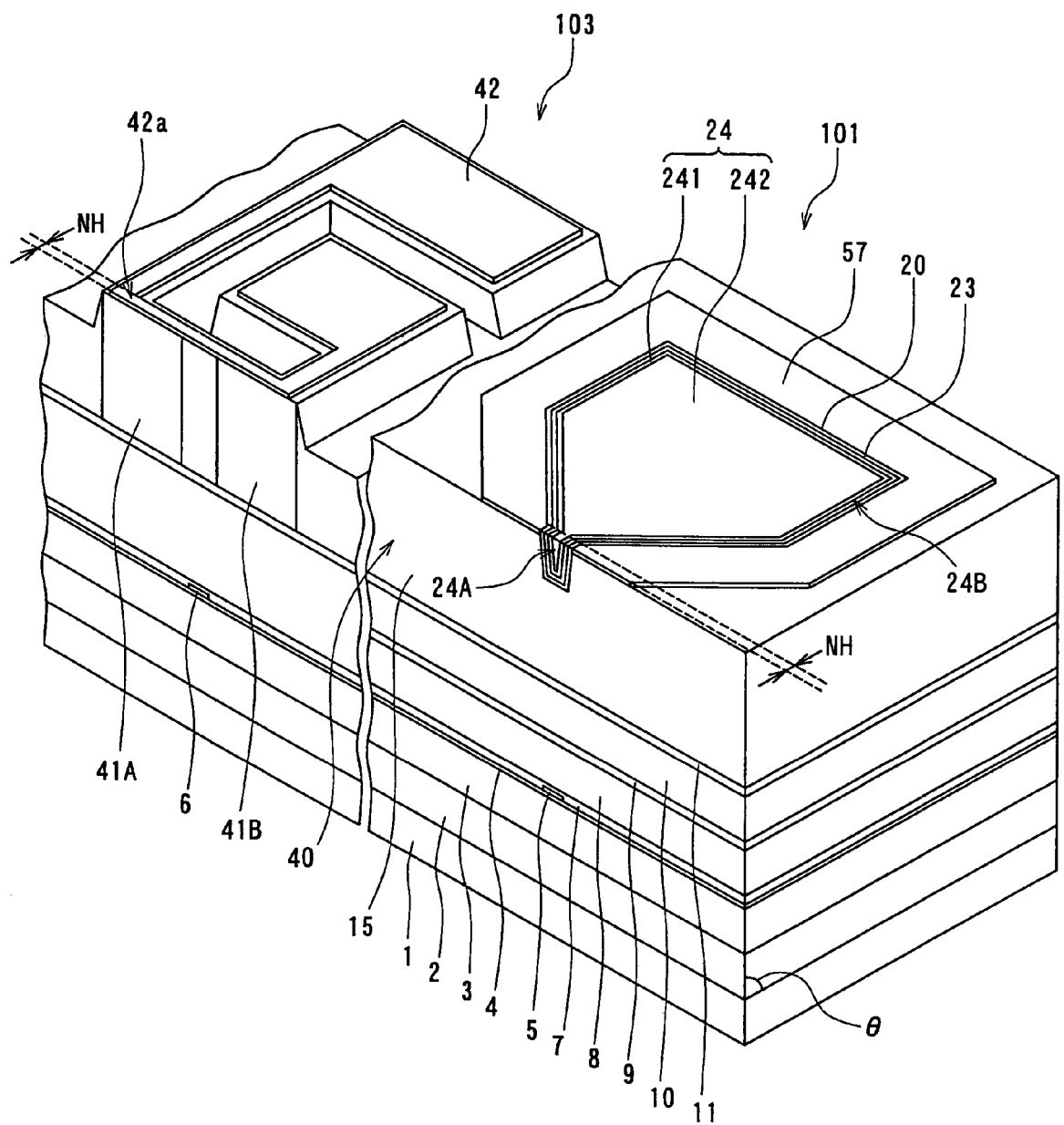
FIG. 56 is a perspective view for illustrating the main part of a magnetic head substructure of a second embodiment of the invention.

Reference is now made to FIG. 54 and FIG. 56 to describe a method of manufacturing a magnetic head and a magnetic head substructure of a second embodiment of the invention. Each of FIG. 54 and FIG. 55 is a cross-sectional view of the layered structure obtained in manufacturing process of the magnetic head of the embodiment. Each of FIG. 54 and FIG. 55 shows a cross section of the layered structure taken in the position in which the medium facing surface is to be formed. In FIG. 54 and FIG. 55, the right-hand portion illustrates the cross section of the pre-head portion, and the left-hand portion illustrates the cross section of the intra-row portion to be removed.

The method of manufacturing the magnetic head of the second embodiment includes the steps up to the step of polishing the nonmagnetic layer 15P as shown in FIG. 8 that are the same as those of the first embodiment. FIG. 54 illustrates the following step. In the step, first, a nonmagnetic conductive layer 57 is formed on the nonmagnetic layer 15P by sputtering, for example. The material and thickness of the nonmagnetic conductive layer 57 are the same as those of the nonmagnetic conductive layer 17 of the first embodiment.

Next, a photoresist layer is formed on the nonmagnetic conductive layer 57. The photoresist layer is then patterned to form a mask 58. In the intra-row portion to be removed, the mask 58 has an opening located in a region including a region in which the resistor layer 42 is to be disposed. Next, the nonmagnetic conductive layer 57 is selectively etched using the mask 58. In such a manner, in the pre-head portion, the nonmagnetic conductive layer 57 is disposed on a first region of the top surface of the nonmagnetic layer 15P, the first region including a region in which the groove 15a will be formed later. In the intra-row portion to be removed, the nonmagnetic conductive layer 57 is removed in a second region of the top surface of the nonmagnetic layer 15P, the second region including a region in which the resistor layer 42 is to be disposed. The nonmagnetic conductive layer 57 corresponds to the first conductive layer of the invention.

Next, a conductive layer 59 is formed by sputtering, for example, on the entire top surface of the layered structure. The thickness of the conductive layer 59 falls within the range of 20 to 80 nm inclusive, for example. The conductive layer 59 is made of a conductive material different from the material of the nonmagnetic conductive layer 57. The material of the conductive layer 59 may be a magnetic material. The material of the conductive layer 59 is preferably one having a stable resistance such as Ti, NiFe or NiCr. Next, the mask 58 is lifted off. In such a manner, in the intra-row portion to be removed, the conductive layer 59 is disposed in the second region of the top surface of the nonmagnetic layer 15P. The conductive layer 59 corresponds to the second conductive layer of the invention.

FIG. 55 illustrates the following step. In the step, first, a photoresist layer having a thickness of 1.0 µm, for example, is formed on the entire top surface of the layered structure. The photoresist layer is then patterned to form the mask 18 for making the groove 15a and the resistor layer 42. In the pre-head portion, the mask 18 has an opening having a shape corresponding to the groove 15a. In the intra-row portion to be removed, the mask 18 is located only in the region in which the resistor layer 42 is to be located.

Next, the nonmagnetic conductive layer 57 and the conductive layer 59 are selectively etched using the mask 18. An opening 57a that penetrates is thereby formed in the nonmagnetic conductive layer 57 in the pre-head portion. The opening 57a has a shape corresponding to the plane geometry of the magnetic layer 240 to be formed later. In the intra-row portion to be removed, the remaining portion of the conductive layer 59 is formed into the resistor layer 42 including the resistor element 42a. In such a manner, according to the second embodiment, the opening 57a of the nonmagnetic conductive layer 57 and the second resistor element 42a are patterned at the same time. The conditions for etching the nonmagnetic conductive layer 57 and the conductive layer 59 are the same as those for etching the nonmagnetic conductive layer 17 of the first embodiment.

Next, the nonmagnetic layer 15P is selectively etched using the mask 18. In the pre-head portion, a portion of the nonmagnetic layer 15P exposed from the opening 57a of the nonmagnetic conductive layer 57 is etched so as to form the groove 15a in the nonmagnetic layer 15P. In the intra-row portion to be removed, a groove is formed in a portion of the nonmagnetic layer 15P that is not covered with the mask 18. Next, the mask 18 is removed. The nonmagnetic layer 15P is formed into the encasing layer 15 by forming the groove 15a therein. The edge of the opening 57a of the nonmagnetic conductive layer 57 is located directly above the edge of the groove 15a located in the top surface of the encasing layer 15.

The steps that follow are the same as those of the first embodiment. FIG. 56 is a perspective view for illustrating the main part of the magnetic head substructure of the second embodiment. FIG. 56 illustrates the main part of each of the pre-head portion 101 and the intra-row portion 103 in the state in which the medium facing surface 40 is formed. In the substructure of the embodiment, the second resistor element 42a is made of a conductive material different from the material of the nonmagnetic conductive layer 57 disposed around the pole layer 24. According to the second embodiment, it is possible that the second resistor element 42a is made of a suitable material, regardless of restrictions imposed on the material of the nonmagnetic conductive layer 57.

The remainder of configuration, operation and effects of the second embodiment are similar to those of the first embodiment including the modification examples.

Third Embodiment

Reference is now made to FIG. 57 to FIG. 62 to describe a method of manufacturing a magnetic head and a magnetic head substructure of a third embodiment of the invention. Each of FIG. 57 to FIG. 62 is a cross-sectional view of the layered structure obtained in manufacturing process of the magnetic head of the embodiment. Each of FIG. 57 to FIG. 62 shows a cross section of the layered structure taken in the position in which the medium facing surface is to be formed. In FIG. 57 to FIG. 62, the right-hand portion illustrates the cross section of the pre-head portion, and the left-hand portion illustrates the cross section of the intra-row portion to be removed.

Figure 57:
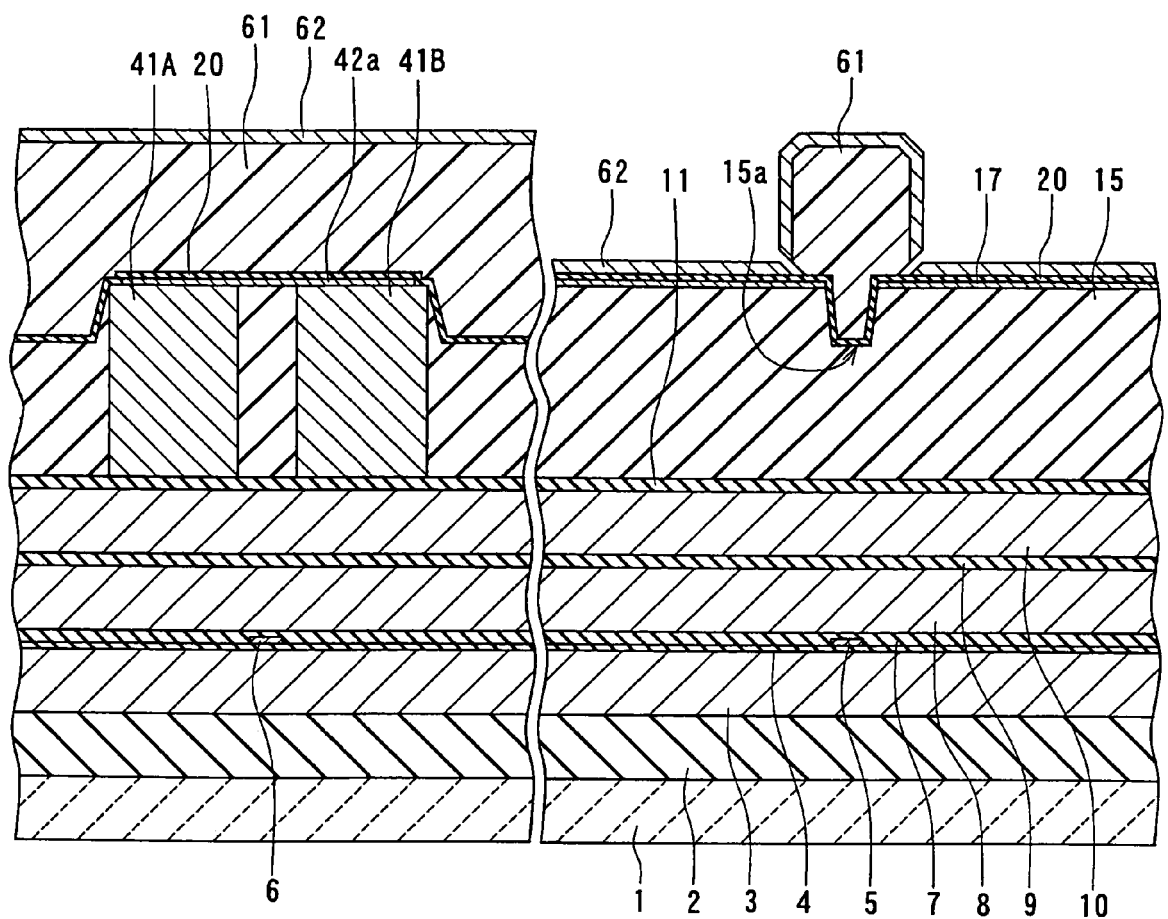
FIG. 57 is a cross-sectional view of a layered structure obtained in a step of a method of manufacturing a magnetic head of a third embodiment of the invention.

The method of manufacturing the magnetic head of the third embodiment includes the steps up to the step of forming the nonmagnetic film 20 as shown in FIG. 14 that are the same as those of the first embodiment. FIG. 57 illustrates the following step. In the step, first, a photoresist layer is formed on the nonmagnetic film 20. The photoresist layer is then patterned to form a mask 61. In the pre-head portion, the mask 61 is located in a region including the groove 15a and a region around the groove 15a. In the intra-row portion to be removed, the mask 61 is located in a region including the region in which the resistor layer 42 is disposed.

Next, a polishing stopper layer 62 is formed by sputtering, for example, on the entire top surface of the layered structure. The thickness of the polishing stopper layer 62 falls within the range of 40 to 70 nm inclusive, for example. The polishing stopper layer 62 may be made of a material the same as that of the polishing stopper layer 23 of the first embodiment. Next, the mask 61 is lifted off. As a result, in the pre-head portion, the polishing stopper layer 62 is located in a region other than the region including the groove 15a and the region around the groove 15a. In the intra-row portion to be removed, the polishing stopper layer 62 is not disposed above the resistor layer 42. Alternatively, the polishing stopper layer 62 may be disposed above the resistor layer 42, too.

Figure 58:
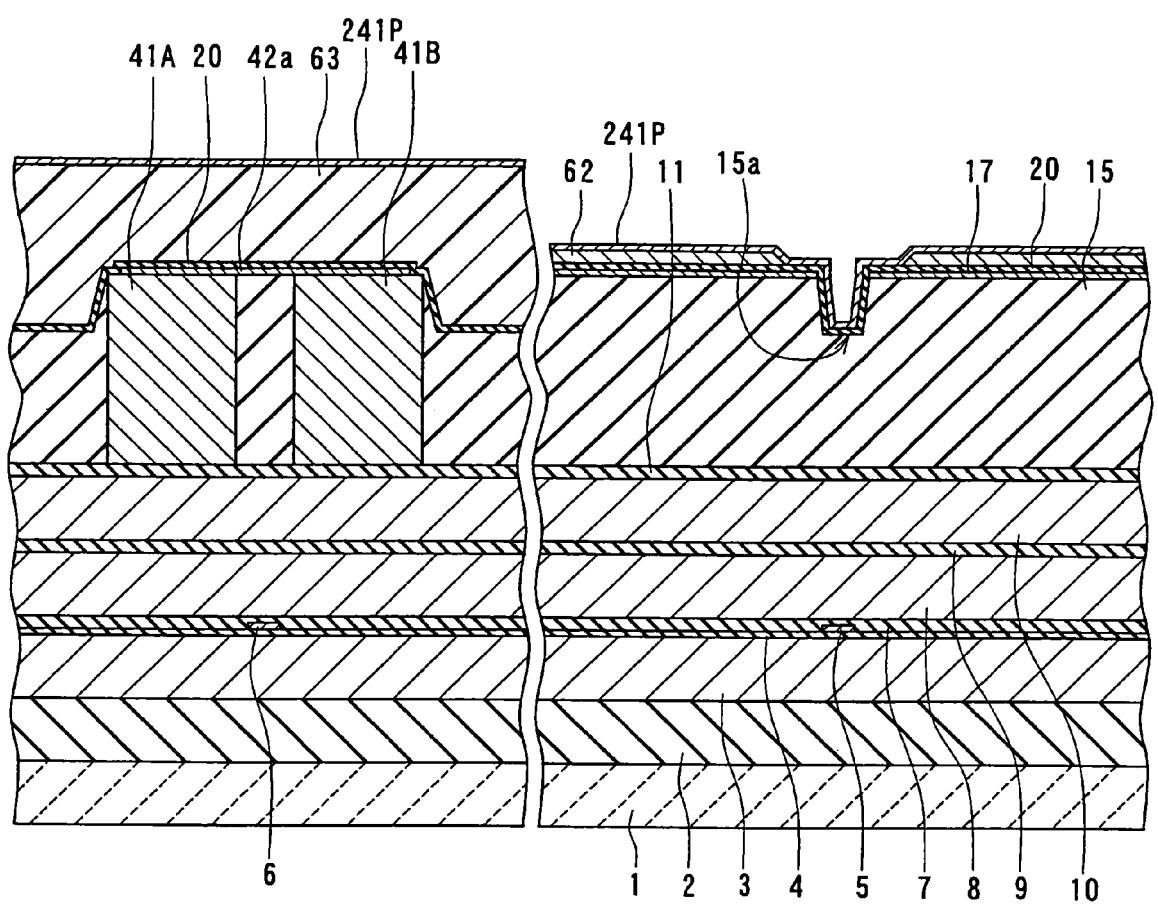
FIG. 58 is a cross-sectional view of the layered structure obtained in a step that follows the step shown in FIG. 57.

FIG. 58 illustrates the following step. In the step, first, a photoresist layer is formed on the entire top surface of the layered structure. The photoresist layer is then patterned to form a mask 63. In the intra-row portion to be removed, the mask 63 is located in the region including the region in which the resistor layer 42 is located. Next, the magnetic layer 241P is formed on the entire top surface of the layered structure. Next, the mask 63 is lifted off. As a result, in the pre-head portion, the magnetic layer 241P is located on the top surface of the layered structure. In the intra-row portion to be removed, the magnetic layer 241P is not disposed above the resistor layer 42. Alternatively, the magnetic layer 241P may be formed on the entire top surface of the layered structure without providing the mask 63, and then a portion of the magnetic layer 241P located above the resistor layer 42 may be selectively removed by etching.

Figure 59:
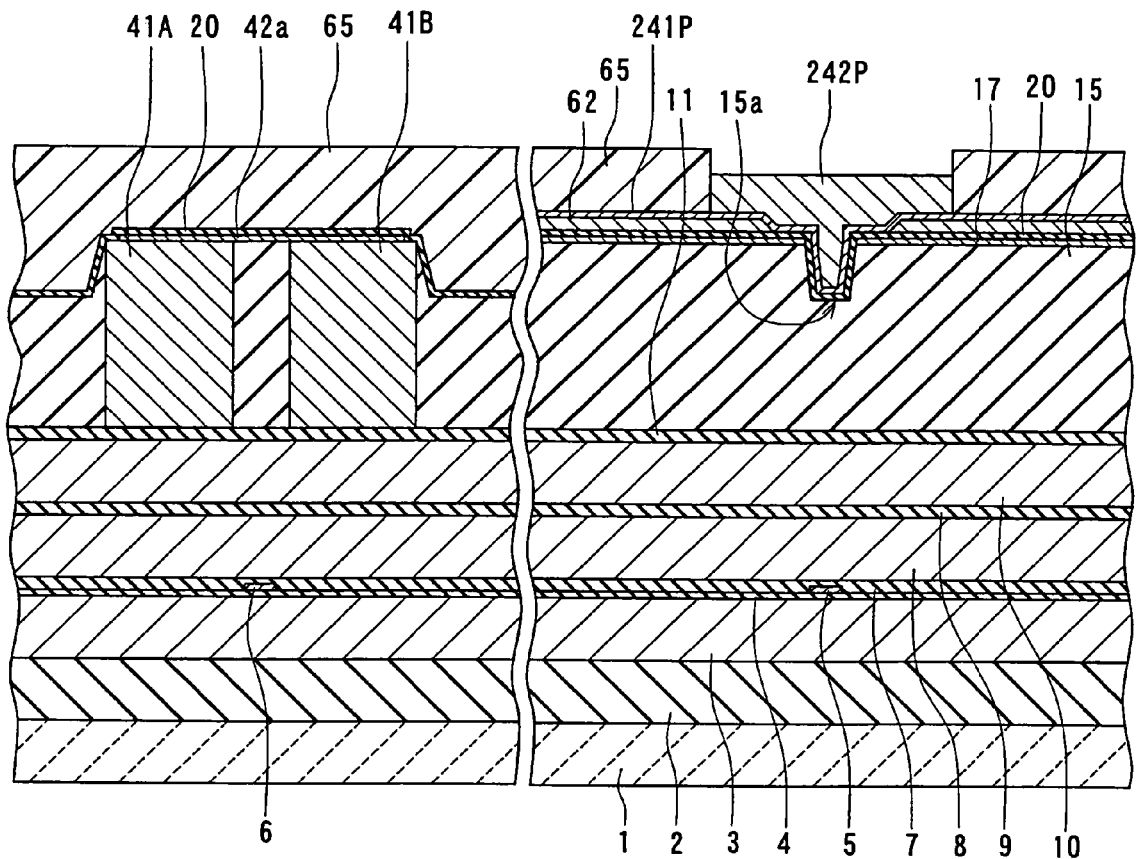
FIG. 59 is a cross-sectional view of the layered structure obtained in a step that follows the step shown in FIG. 58.

FIG. 59 illustrates the following step. In the step, first, a photoresist layer is formed on the entire top surface of the layered structure. The photoresist layer is then patterned to form a frame 65. The frame 65 has an opening located above the groove 15a. Next, the magnetic layer 242P is formed on the magnetic layer 241P by frame plating in the opening of the frame 65, wherein the magnetic layer 241P is used as an electrode for plating. The frame 65 is then removed.

Figure 60:
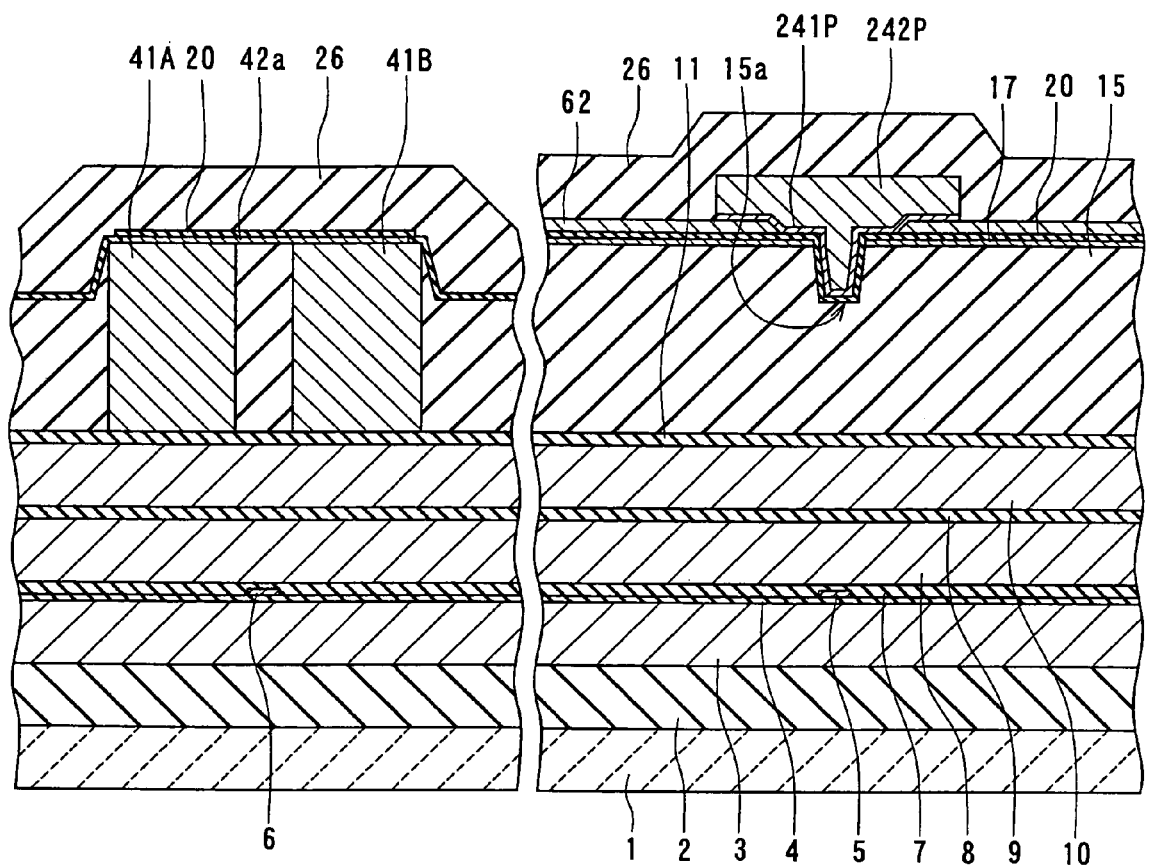
FIG. 60 is a cross-sectional view of the layered structure obtained in a step that follows the step shown in FIG. 59.

FIG. 60 illustrates the following step. In the step, first, in the pre-head portion, the magnetic layer 241P except a portion below the magnetic layer 242P is removed by ion beam etching, for example. Next, the coating layer 26 made of alumina, for example, is formed on the entire top surface of the layered structure.

Figure 61:
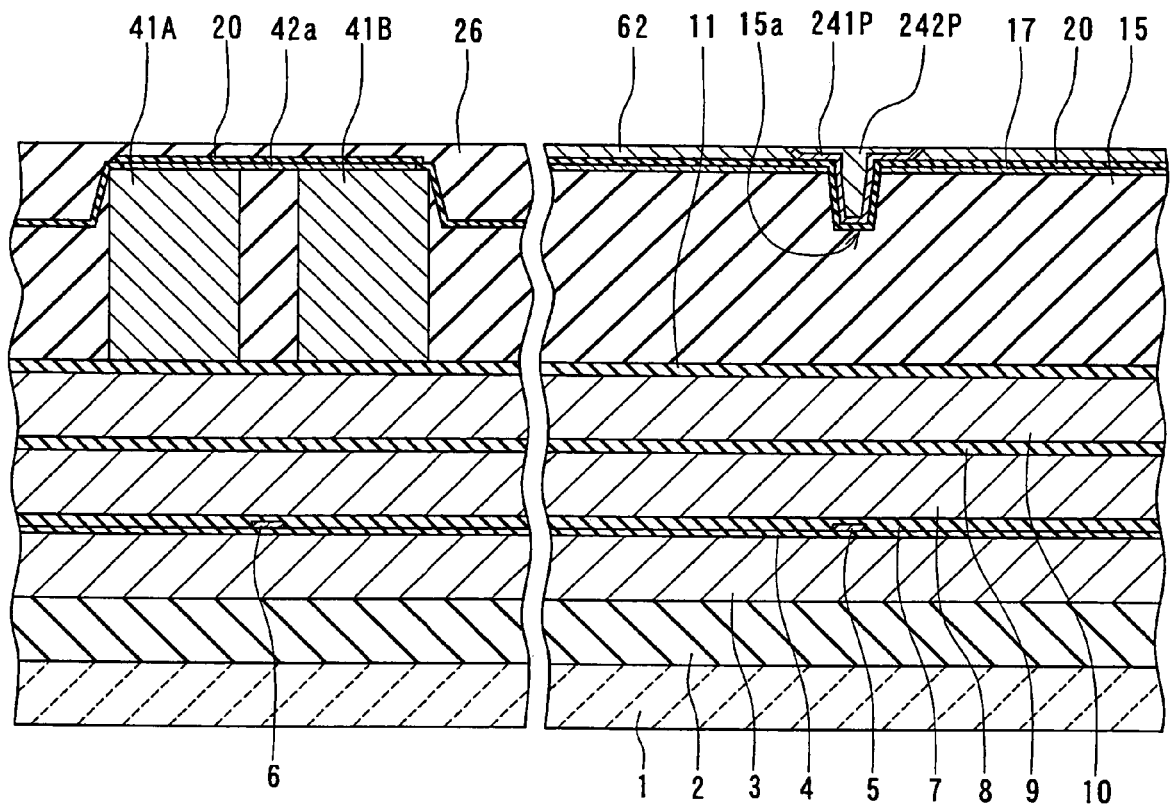
FIG. 61 is a cross-sectional view of the layered structure obtained in a step that follows the step shown in FIG. 60.

FIG. 61 illustrates the following step. In the step, the coating layer 26, the magnetic layer 242P and the magnetic layer 241P are polished by CMP, for example, until the polishing stopper layer 62 is exposed. As a result, in the pre-head portion, portions of the magnetic layers 241P and 242P disposed on the top surface of the polishing stopper layer 62 are removed and the top surfaces of the polishing stopper layer 62, the magnetic layer 241P and the magnetic layer 242P are flattened. In the intra-row portion to be removed, the coating layer 26 remains above the resistor layer 42. If the coating layer 26, the magnetic layer 242P and the magnetic layer 241P are polished by CMP, such a slurry is used that polishing is stopped when the polishing stopper layer 62 is exposed, such as an alumina-base slurry. If the coating layer 26, the magnetic layer 242P and the magnetic layer 241P are polished by CMP using an alumina-base slurry, the material of the polishing stopper layer 62 is preferably Ta or Ru.

Figure 62:
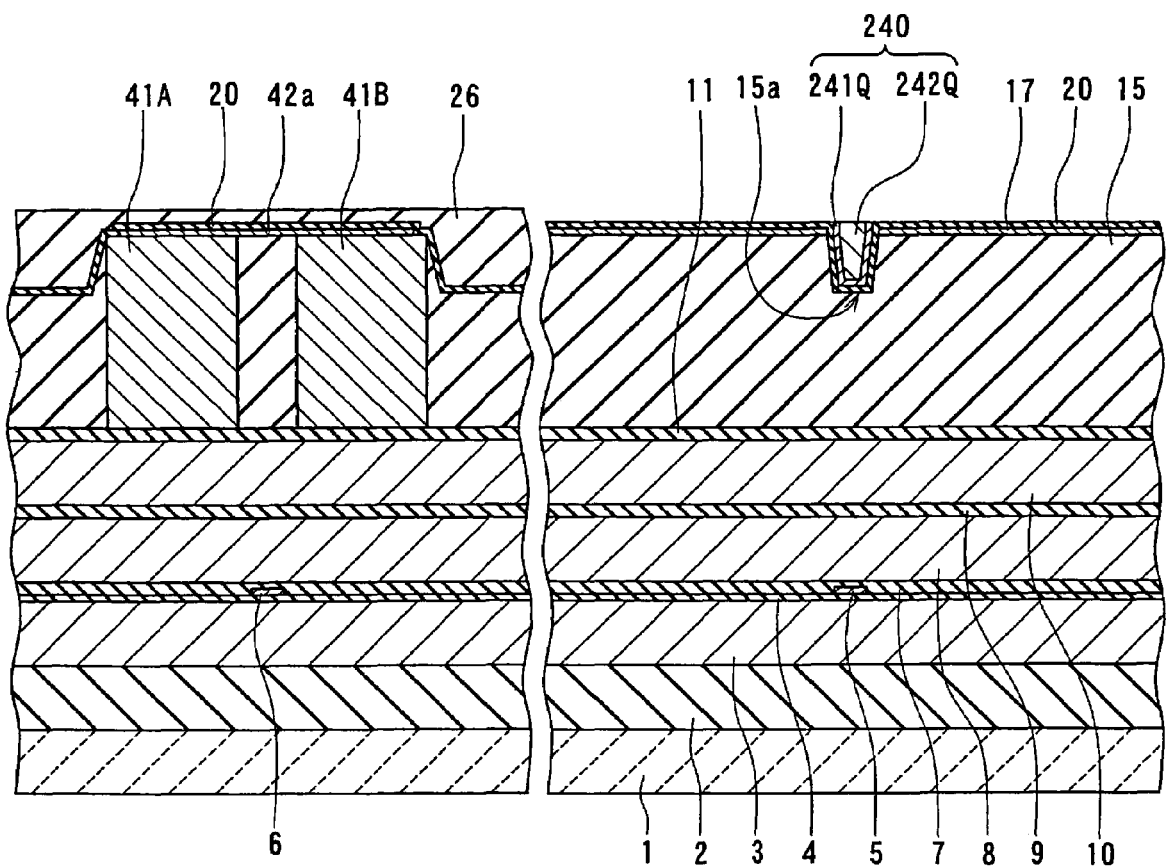
FIG. 62 is a cross-sectional view of the layered structure obtained in a step that follows the step shown in FIG. 61.

FIG. 62 illustrates the following step. In the step, ion beam etching, for example, is performed to remove the polishing stopper layer 62 and to etch portions of the first magnetic layer 241P and the second magnetic layer 242P. The top surfaces of the nonmagnetic film 20, the first magnetic layer 241P and the second magnetic layer 242P are thereby flattened. At this time, the second resistor element 42a is protected by the nonmagnetic film 20 and the coating layer 26 that are located above the second resistor element 42a.

Alternatively, etching may be further continued to remove a portion of the nonmagnetic film 20 and to flatten the top surfaces of the nonmagnetic conductive layer 17, the nonmagnetic film 20, the first magnetic layer 241P and the second magnetic layer 242P. Another alternative is that etching may be further continued to remove the nonmagnetic conductive layer 17 and to flatten the top surfaces of the encasing layer 15, the nonmagnetic film 20, the first magnetic layer 241P and the second magnetic layer 242P.

Still another alternative is that the polishing stopper layer 62 may be removed by ion beam etching, for example, and then the nonmagnetic film 20 and the magnetic layers 242P and 241P may be polished by CMP, for example, and the top surfaces of the nonmagnetic conductive layer 17, the nonmagnetic film 20, the first magnetic layer 241P and the second magnetic layer 242P may be thereby flattened.

Since the polishing stopper layer 62 is made of a nonmagnetic material, the track width is not affected even though the stopper layer 62 is disposed on the nonmagnetic film 20. Therefore, the stopper layer 62 may be left unremoved and portions of the first magnetic layer 241P and the second magnetic layer 242P may be etched, and the top surfaces of the nonmagnetic film 20, the first magnetic layer 241P and the second magnetic layer 242P may be thereby flattened.

When the polishing stopper layer 62 is removed by ion beam etching, for example, a mask made of photoresist may be selectively formed in advance above the second resistor element 42a to protect the second resistor element 42a.

Next, the gap layer 27 is formed on the entire top surface of the layered structure. The steps that follow are the same as those of the first embodiment.

In the third embodiment, the pole layer 24 is disposed in the groove 15a of the encasing layer 15 only with the nonmagnetic film 20 disposed between the pole layer 24 and the groove 15a. As a result, it is easy to control the track width. The remainder of configuration, operation and effects of the third embodiment are similar to those of the first embodiment including the modification examples.

Fourth Embodiment

Reference is now made to FIG. 63 to FIG. 66 to describe a method of manufacturing a magnetic head and a magnetic head substructure of a fourth embodiment of the invention. Each of FIG. 63 to FIG. 66 is a cross-sectional view of the layered structure obtained in manufacturing process of the magnetic head of the embodiment. Each of FIG. 63 to FIG. 66 shows a cross section of the layered structure taken in the position in which the medium facing surface is to be formed. In FIG. 63 to FIG. 66, the right-hand portion illustrates the cross section of the pre-head portion, and the left-hand portion illustrates the cross section of the intra-row portion to be removed.

Figure 63:
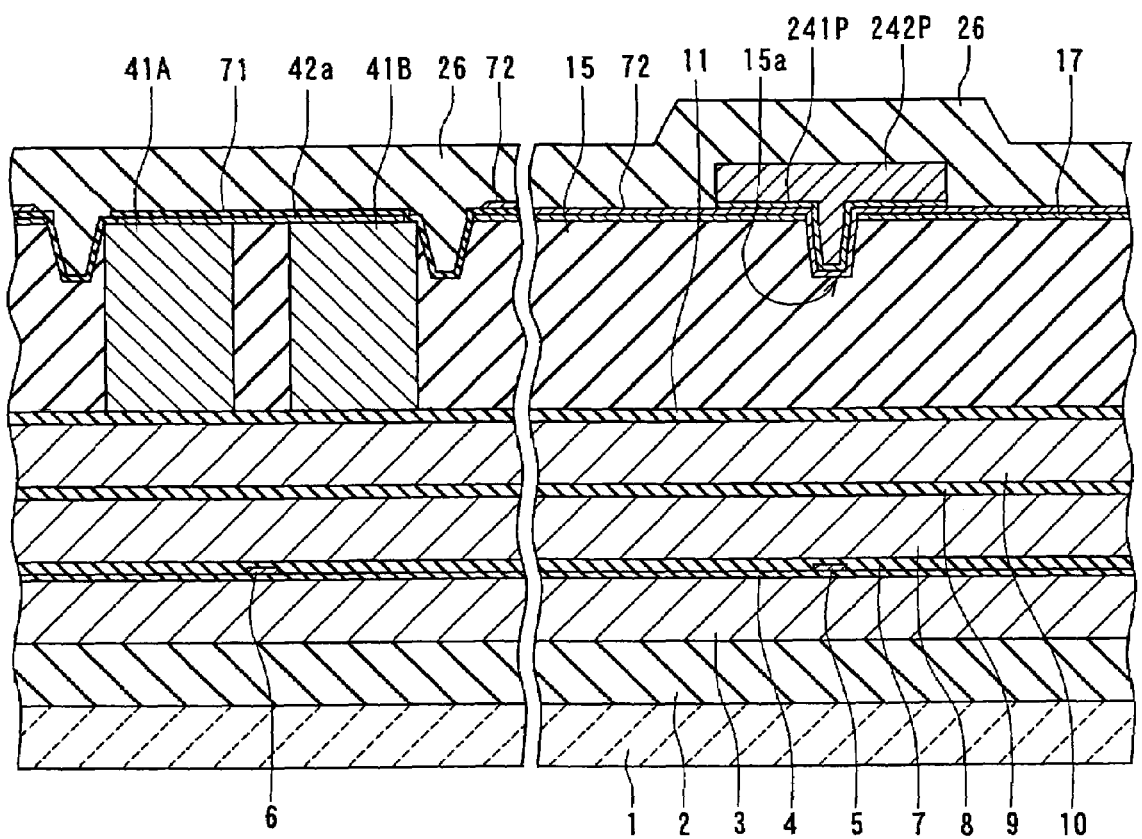
FIG. 63 is a cross-sectional view of a layered structure obtained in a step of a method of manufacturing a magnetic head of a fourth embodiment of the invention.

The method of manufacturing the magnetic head of the fourth embodiment includes the steps up to the step of forming the groove 15a and the resistor layer 42 as shown in FIG. 11 that are the same as those of the first embodiment. FIG. 63 illustrates the following step. In the step, first, in the intra-row portion to be removed, an insulating layer 71 made of alumina, for example, is formed by a method such as lift-off on the top surface of the layered structure. Next, in the pre-head portion, a polishing stopper layer 72 is formed by a method such as lift-off on the top surface of the layered structure, wherein the polishing stopper layer 72 is formed such that a portion thereof is laid over the insulating layer 71 except a portion above the resistor layer 42. The polishing stopper layer 72 is formed in the groove 15a of the encasing layer 15, too. The polishing stopper layer 72 may be made of a material the same as that of the polishing stopper layer 23 of the first embodiment.

Next, as in the step of the third embodiment described with reference to FIG. 58 to FIG. 61, in the pre-head portion, the magnetic layer 241P is formed, the magnetic layer 242P is formed on the magnetic layer 241P, and the magnetic layer 241P except a portion below the magnetic layer 242P is removed. Next, the coating layer 26 made of alumina, for example, is formed on the entire top surface of the layered structure.

Figure 64:
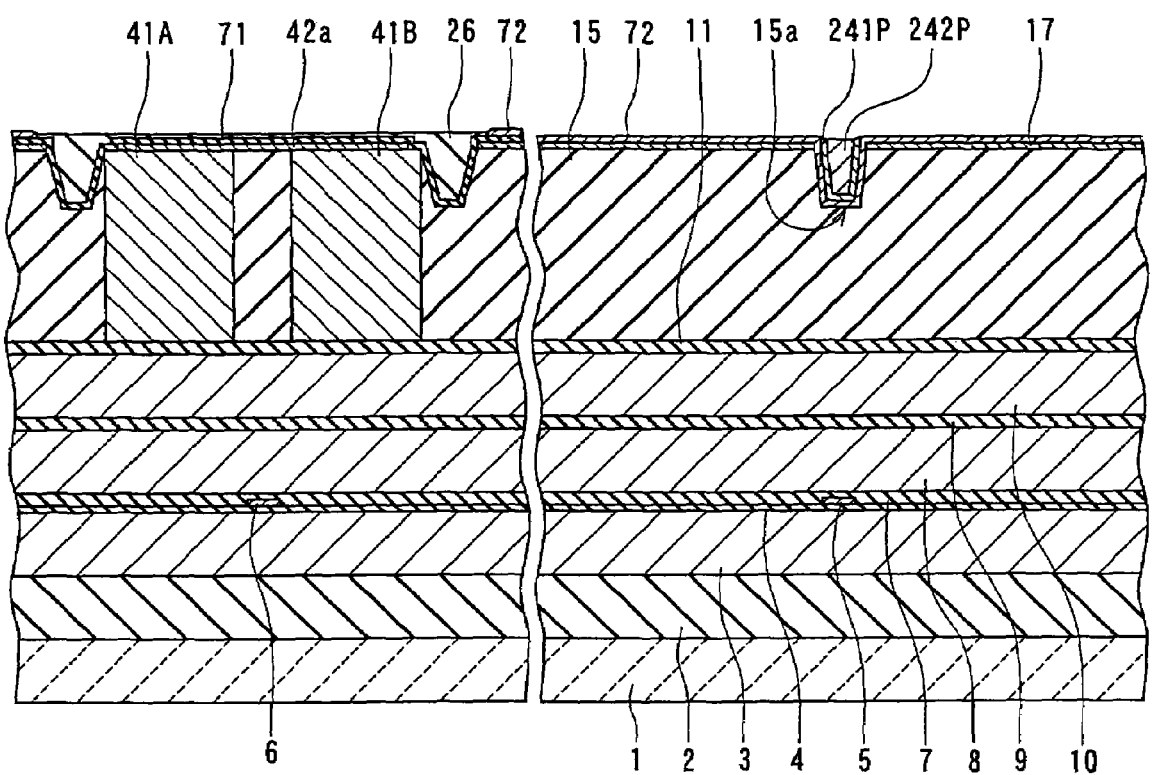
FIG. 64 is a cross-sectional view of the layered structure obtained in a step that follows the step shown in FIG. 63.

FIG. 64 illustrates the following step. In the step, the coating layer 26, the magnetic layer 242P and the magnetic layer 241P are polished by CMP, for example, until the polishing stopper layer 72 is exposed. As a result, in the pre-head portion, portions of the magnetic layers 241P and 242P disposed on the top surface of the polishing stopper layer 72 are removed. In the intra-row portion to be removed, the coating layer 26 remains above the resistor layer 42. If the coating layer 26, the magnetic layer 242P and the magnetic layer 241P are polished by CMP, such a slurry is used that polishing is stopped when the polishing stopper layer 72 is exposed, such as an alumina-base slurry. If the coating layer 26, the magnetic layer 242P and the magnetic layer 241P are polished by CMP using an alumina-base slurry, the material of the polishing stopper layer 72 is preferably Ta or Ru.

Figure 65:
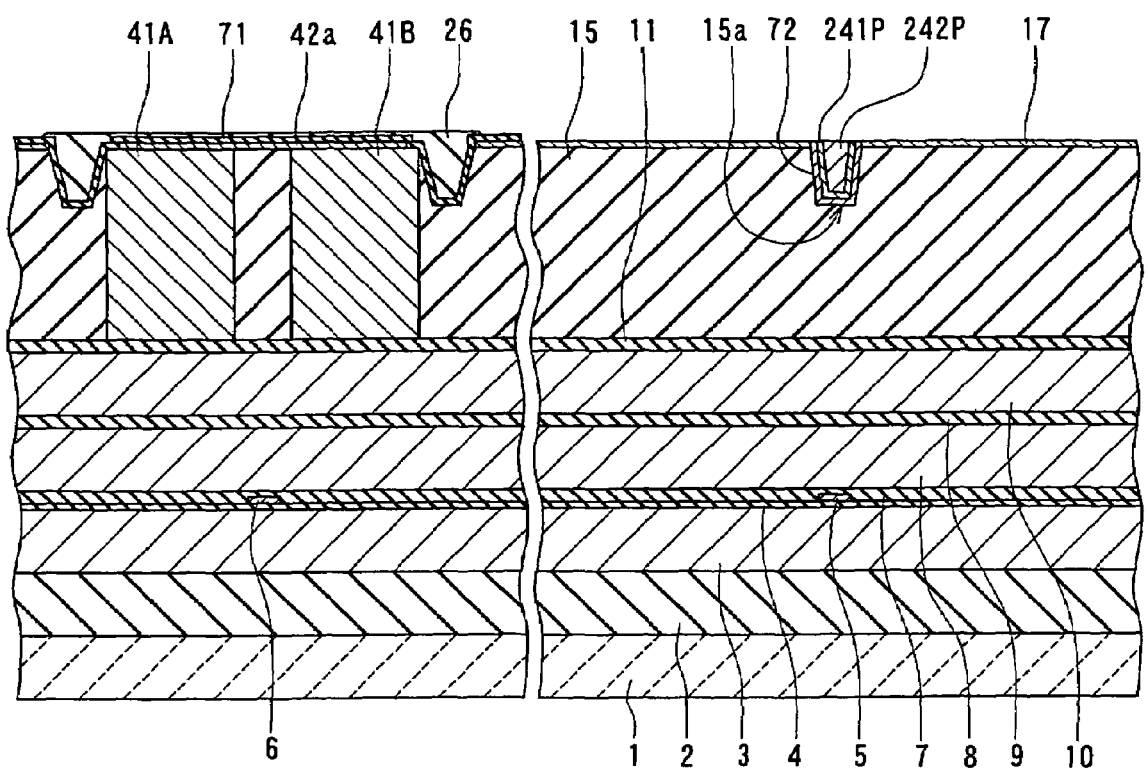
FIG. 65 is a cross-sectional view of the layered structure obtained in a step that follows the step shown in FIG. 64.

FIG. 65 illustrates the following step. In the step, ion beam etching, for example, is performed to remove a portion of the polishing stopper layer 72 located on the nonmagnetic conductive layer 17 and to etch portions of the first magnetic layer 241P and the second magnetic layer 242P. The top surfaces of the nonmagnetic conductive layer 17, the first magnetic layer 241P and the second magnetic layer 242P are thereby flattened. At this time, the second resistor element 42a is protected by the insulating layer 71 and the coating layer 26 that are located above the second resistor element 42a.

Figure 66:
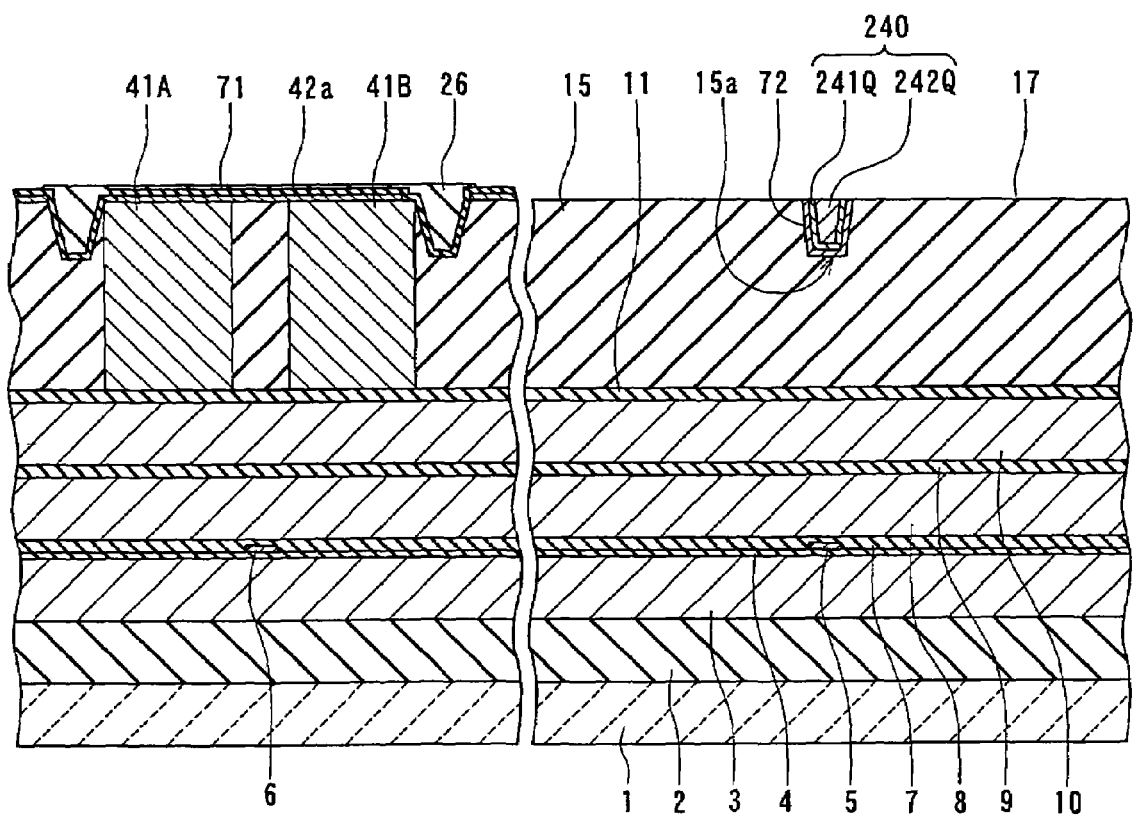
FIG. 66 is a cross-sectional view of the layered structure obtained in a step that follows the step shown in FIG. 65.

FIG. 66 illustrates the following step. In the step, ion beam etching, for example, is performed to remove the nonmagnetic conductive layer 17 and to flatten the top surfaces of the encasing layer 15, the polishing stopper layer 72, the first magnetic layer 241P and the second magnetic layer 242P.

Since the nonmagnetic conductive layer 17 is made of a nonmagnetic material, the track width is not affected even though the conductive layer 17 is disposed on the encasing layer 15. Therefore, the conductive layer 17 may be left unremoved.

When the polishing stopper layer 72 is removed by ion beam etching, for example, a mask made of photoresist may be selectively formed in advance above the second resistor element 42a to protect the second resistor element 42a.

Next, the gap layer 27 is formed on the entire top surface of the layered structure. The steps that follow are the same as those of the first embodiment.

In the fourth embodiment, the pole layer 24 is disposed in the groove 15a of the encasing layer 15 only with the polishing stopper layer 72 disposed between the pole layer 24 and the groove 15a. As a result, it is easy to control the track width. The remainder of configuration, operation and effects of the fourth embodiment are similar to those of the first embodiment including the modification examples.

Fifth Embodiment

Reference is now made to FIG. 67 to FIG. 71 to describe a method of manufacturing a magnetic head and a magnetic head substructure of a fifth embodiment of the invention. Each of FIG. 67 to FIG. 71 is a cross-sectional view of the layered structure obtained in manufacturing process of the magnetic head of the embodiment. Each of FIG. 67 to FIG. 71 shows a cross section of the layered structure taken in the position in which the medium facing surface is to be formed. In FIG. 67 to FIG. 71, the right-hand portion illustrates the cross section of the pre-head portion, and the left-hand portion illustrates the cross section of the intra-row portion to be removed.

Figure 67:
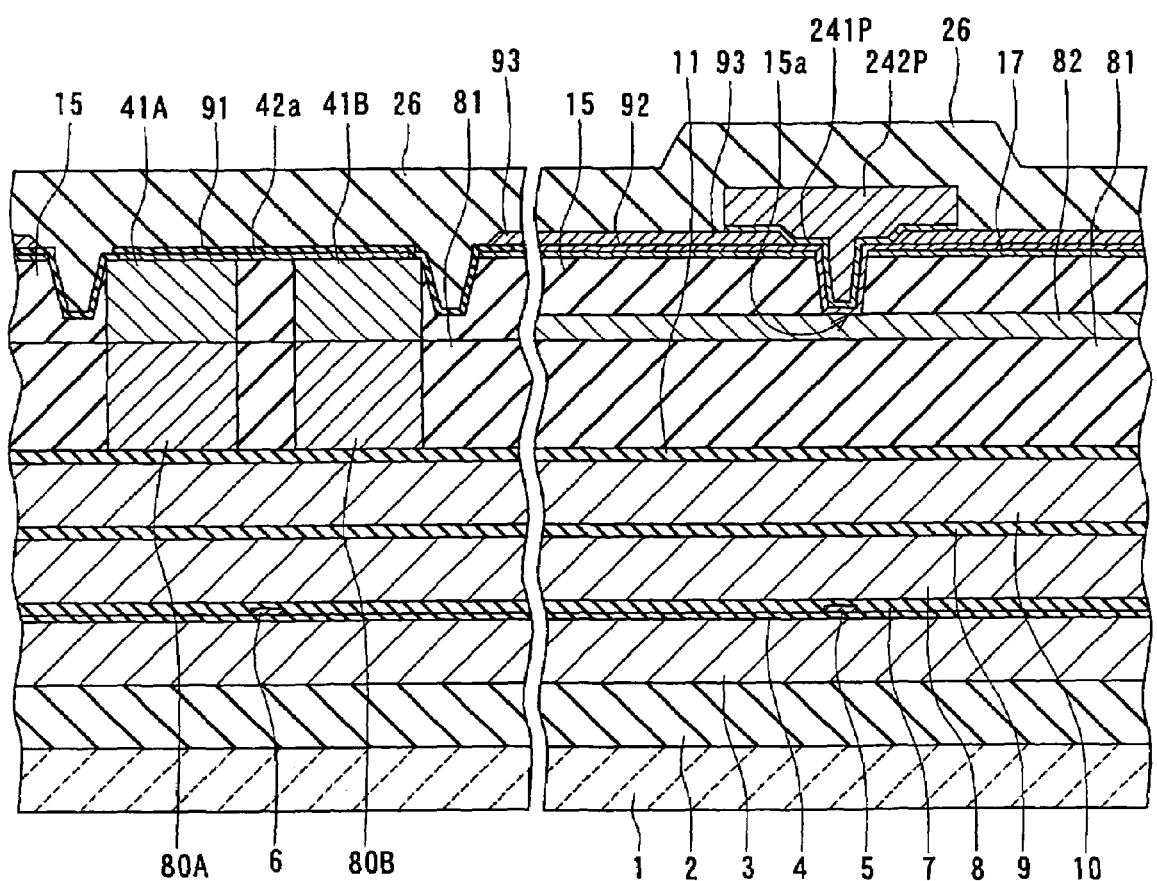
FIG. 67 is a cross-sectional view of a layered structure obtained in a step of a method of manufacturing a magnetic head of a fifth embodiment of the invention.

The method of manufacturing the magnetic head of the fifth embodiment includes the steps up to the step of forming the insulating layer 11 and forming the opening in the insulating layer 11 as shown in FIG. 5 and FIG. 6 that are the same as those of the first embodiment. FIG. 67 illustrates the following step. In the step, first, the coupling layer 12, the coil 13 and the insulating layer 14 are formed as in the step illustrated in FIG. 7. In this step of the fifth embodiment, in the intra-row portion to be removed, electrode layers 80A and 80B are formed by a method such as frame plating on the insulating layer 11. The electrode layers 80A and 80B are made of a conductive material. The material of the electrode layers 80A and 80B may be the same as that of the coupling layer 12, and the coupling layer 12 and the electrode layers 80A and 80B may be formed at the same time.

Next, an insulating layer 81 made of alumina, for example, is formed on the entire top surface of the layered structure. Next, the insulating layer 81 is polished by CMP, for example, so that the coupling layer 12 and the electrode layers 80A and 80B are exposed.

Next, in the pre-head portion, a nonmagnetic conductive layer 82 made of a nonmagnetic conductive material is selectively formed on the insulating layer 81. The material of the nonmagnetic conductive layer 82 may be the same as that of the nonmagnetic conductive layer 17 of the first embodiment. Although not shown, a second coupling layer made of a magnetic material is formed on the coupling layer 12. In the intra-row portion to be removed, the electrode layers 41A and 41B are formed on the electrode layers 80A and 80B.

Next, a nonmagnetic layer is formed on the entire top surface of the layered structure. The nonmagnetic layer is then polished by CMP, for example, so that the second coupling layer and the electrode layers 41A and 41B are exposed. The nonmagnetic layer will be the encasing layer 15 by forming the groove 15a therein later. Next, the groove 15a is formed in the nonmagnetic layer as in the step illustrated in FIG. 10 to FIG. 12. The groove 15a is formed such that the bottom thereof reaches the level of the top surface of the nonmagnetic conductive layer 82.

Next, in the intra-row portion to be removed, an insulating layer 91 made of alumina, for example, is formed by a method such as lift-off on the top surface of the layered structure. Next, in the pre-head portion, a nonmagnetic conductive film 92 is formed by a method such as lift-off on the top surface of the layered structure. The nonmagnetic conductive film 92 is formed in the groove 15a of the encasing layer 15, too. The nonmagnetic conductive film 92 may be made of a material the same as that of the nonmagnetic conductive layer 17 of the first embodiment.

Next, a polishing stopper layer 93 is formed on the top surface of the layered structure. In the pre-head portion, the polishing stopper layer 93 is located in a region other than the region including the groove 15a and a region around the groove 15a. In the intra-row portion to be removed, the polishing stopper layer 93 is not located above the resistor layer 42. The material and forming method of the polishing stopper layer 93 are the same as those of the polishing stopper layer 62 of the third embodiment.

Next, as in the step of the third embodiment described with reference to FIG. 58 to FIG. 60, in the pre-head portion, the magnetic layer 241P is formed, the magnetic layer 242P is formed on the magnetic layer 241P, and the magnetic layer 241P except a portion below the magnetic layer 242P is removed. Next, the coating layer 26 made of alumina, for example, is formed on the entire top surface of the layered structure.

Figure 68:
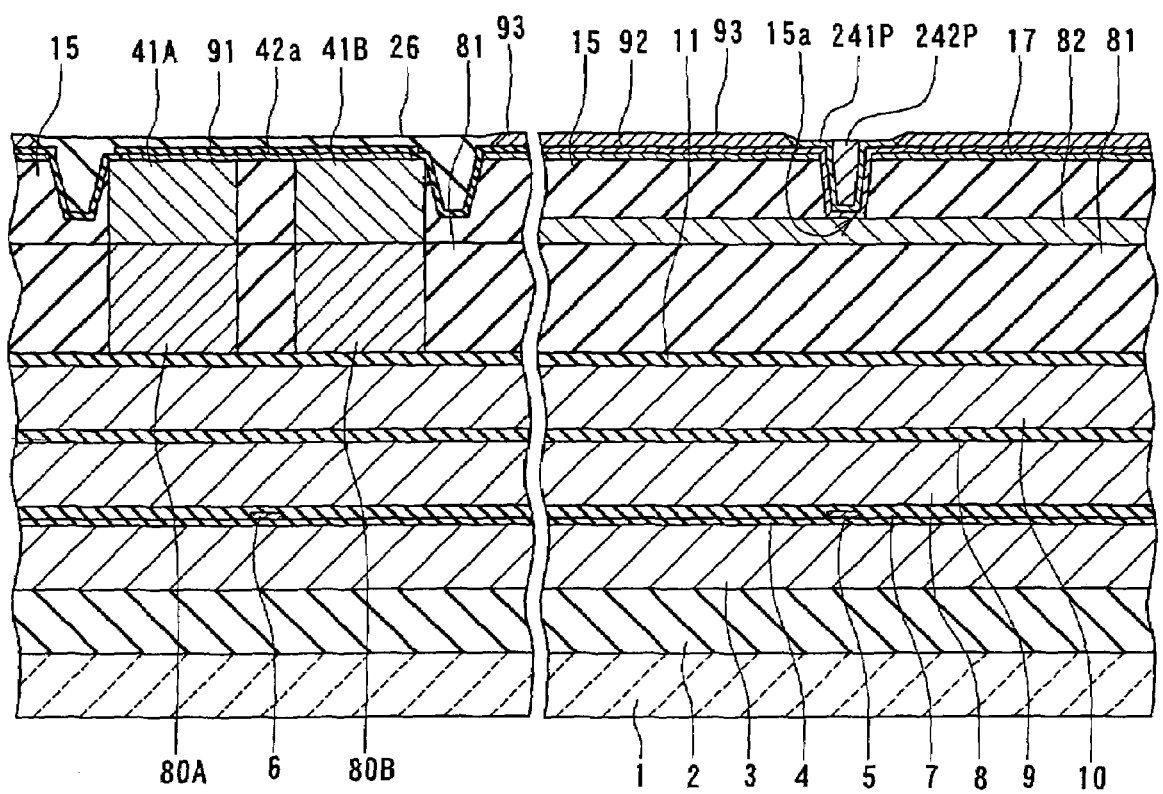
FIG. 68 is a cross-sectional view of the layered structure obtained in a step that follows the step shown in FIG. 67.

FIG. 68 illustrates the following step. In the step, the coating layer 26, the magnetic layer 242P and the magnetic layer 241P are polished by CMP, for example, until the polishing stopper layer 93 is exposed. As a result, in the pre-head portion, portions of the magnetic layers 241P and 242P disposed on the top surface of the polishing stopper layer 93 are removed. In the intra-row portion to be removed, the coating layer 26 remains above the resistor layer 42. If the coating layer 26, the magnetic layer 242P and the magnetic layer 241P are polished by CMP, such a slurry is used that polishing is stopped when the polishing stopper layer 93 is exposed, such as an alumina-base slurry. If the coating layer 26, the magnetic layer 242P and the magnetic layer 241P are polished by CMP using an alumina-base slurry, the material of the polishing stopper layer 93 is preferably Ta or Ru.

Figure 69:
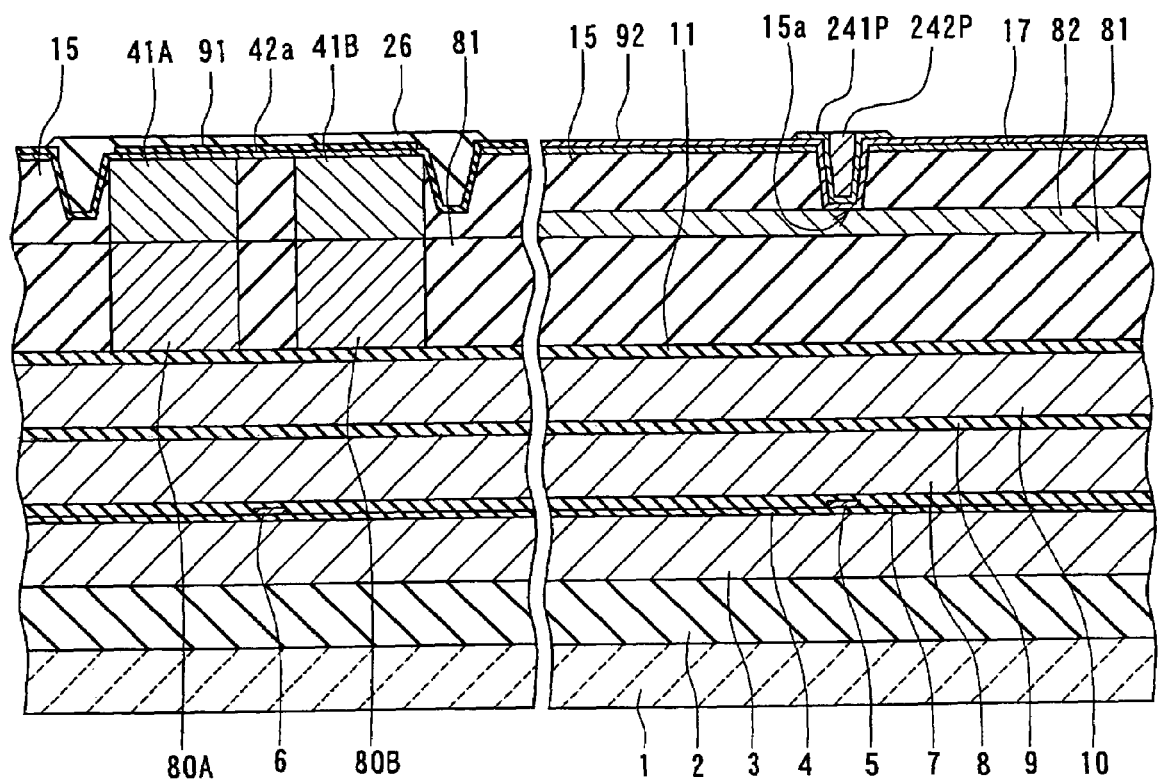
FIG. 69 is a cross-sectional view of the layered structure obtained in a step that follows the step shown in FIG. 68.

FIG. 69 illustrates the following step. In the step, ion beam etching, for example, is performed to remove the polishing stopper layer 93. At this time, the second resistor element 42a is protected by the insulating layer 91 and the coating layer 26 that are located above the second resistor element 42a.

Figure 70:
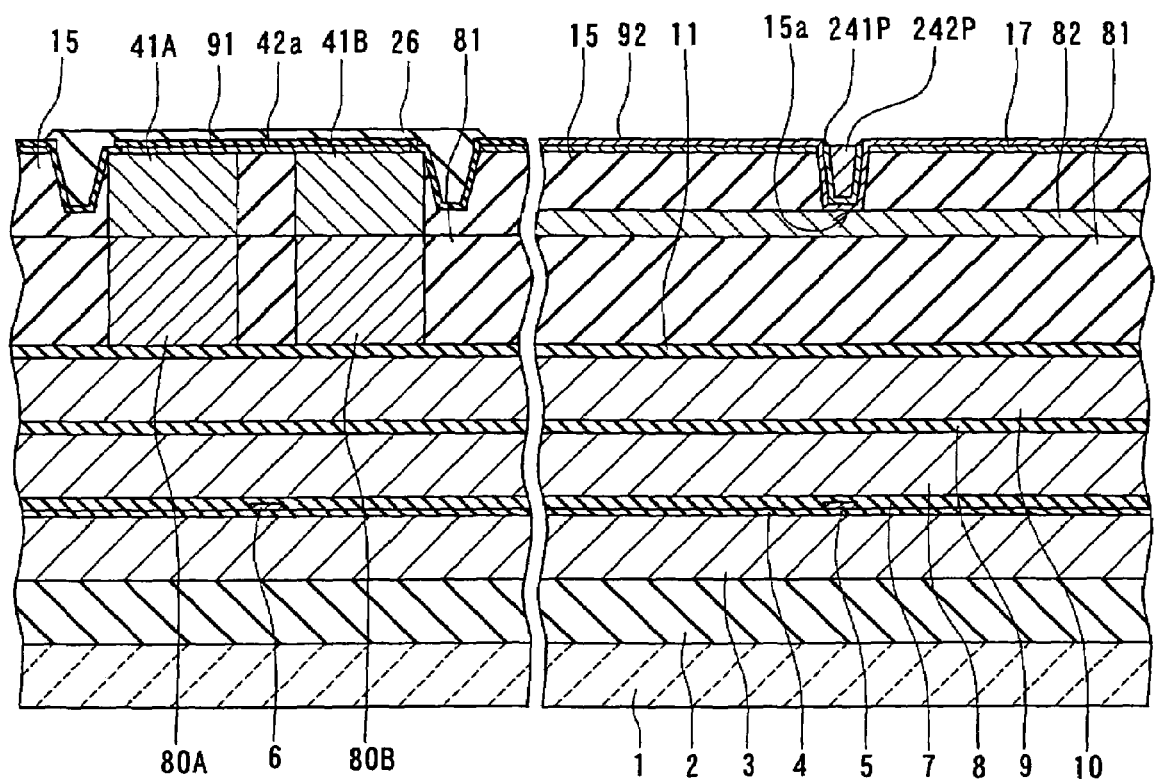
FIG. 70 is a cross-sectional view of the layered structure obtained in a step that follows the step shown in FIG. 69.

FIG. 70 illustrates the following step. In the step, ion beam etching, for example, is performed to remove a portion of the first magnetic layer 241P and the second magnetic layer 242P located on the top surface of the nonmagnetic conductive film 92. At this time, too, the second resistor element 42a is protected by the insulating layer 91 and the coating layer 26 that are located above the second resistor element 42a.

Figure 71:
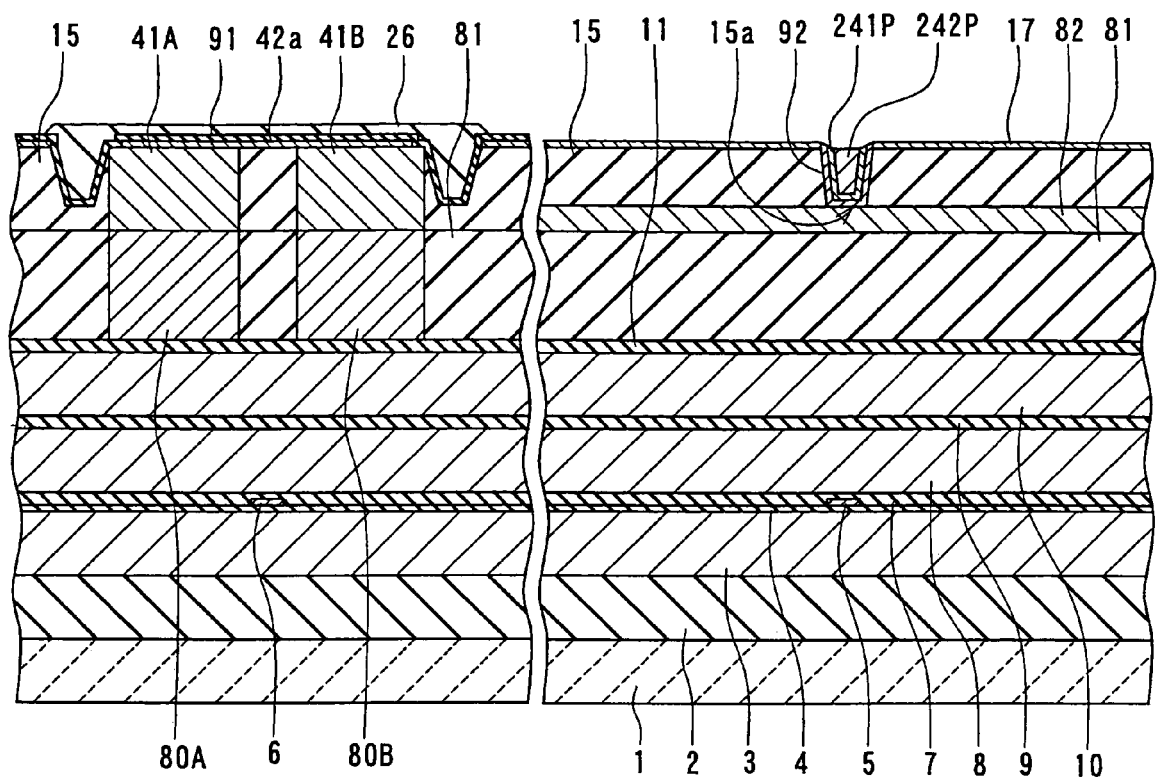
FIG. 71 is a cross-sectional view of the layered structure obtained in a step that follows the step shown in FIG. 70.

FIG. 71 illustrates the following step. In the step, ion beam etching, for example, is performed to remove a portion of the nonmagnetic conductive film 92 located on the nonmagnetic conductive layer 17 and to etch portions of the first magnetic layer 241P and the second magnetic layer 242P. At this time, the second resistor element 42a is protected by the insulating layer 91 and the coating layer 26 that are located above the second resistor element 42a, too.

Alternatively, etching may be further continued to remove the nonmagnetic conductive layer 17 and to flatten the top surfaces of the encasing layer 15, the nonmagnetic conductive film 92, the first magnetic layer 241P and the second magnetic layer 242P.

Another alternative is that the polishing stopper layer 93 may be removed by ion beam etching, for example, and then the nonmagnetic conductive film 92 and the magnetic layers 242P and 241P may be polished by CMP, for example, so that the nonmagnetic layer 17 is exposed, and the top surfaces of the nonmagnetic conductive layer 17, the nonmagnetic conductive film 92, the first magnetic layer 241P and the second magnetic layer 242P may be thereby flattened.

Since the polishing stopper layer 93 is made of a nonmagnetic material, the track width is not affected even though the stopper layer 93 is disposed on the nonmagnetic conductive film 92. Therefore, the stopper layer 93 may be left unremoved and portions of the first magnetic layer 241P and the second magnetic layer 242P may be etched, and the top surfaces of the nonmagnetic conductive film 92, the first magnetic layer 241P and the second magnetic layer 242P may be thereby flattened.

When the polishing stopper layer 93 is removed by ion beam etching, for example, a mask made of photoresist may be selectively formed in advance above the second resistor element 42a to protect the second resistor element 42a.

Next, the gap layer 27 is formed on the entire top surface of the layered structure. The steps that follow are the same as those of the first embodiment.

In the fifth embodiment, the pole layer 24 is disposed in the groove 15a of the encasing layer 15 only with the nonmagnetic conductive film 92 disposed between the pole layer 24 and the groove 15a. As a result, it is easy to control the track width. The remainder of configuration, operation and effects of the fifth embodiment are similar to those of the first embodiment including the modification examples.

Sixth Embodiment

Figure 72:
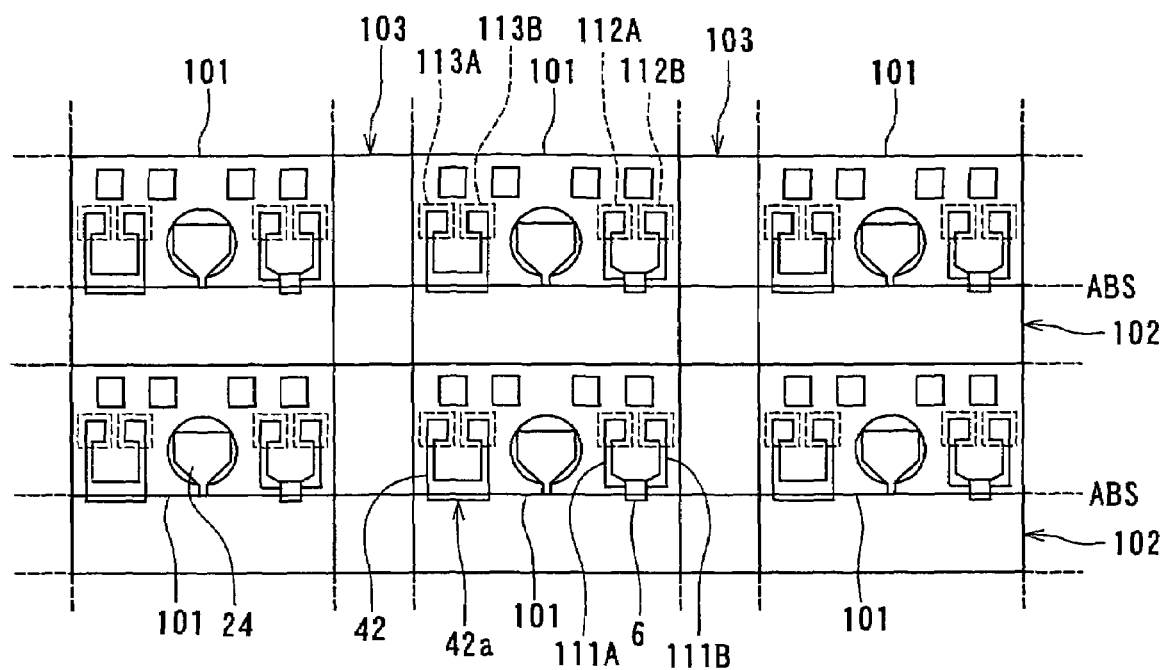
FIG. 72 illustrates the arrangement of main components of a magnetic head substructure of a sixth embodiment of the invention.
Figure 73:
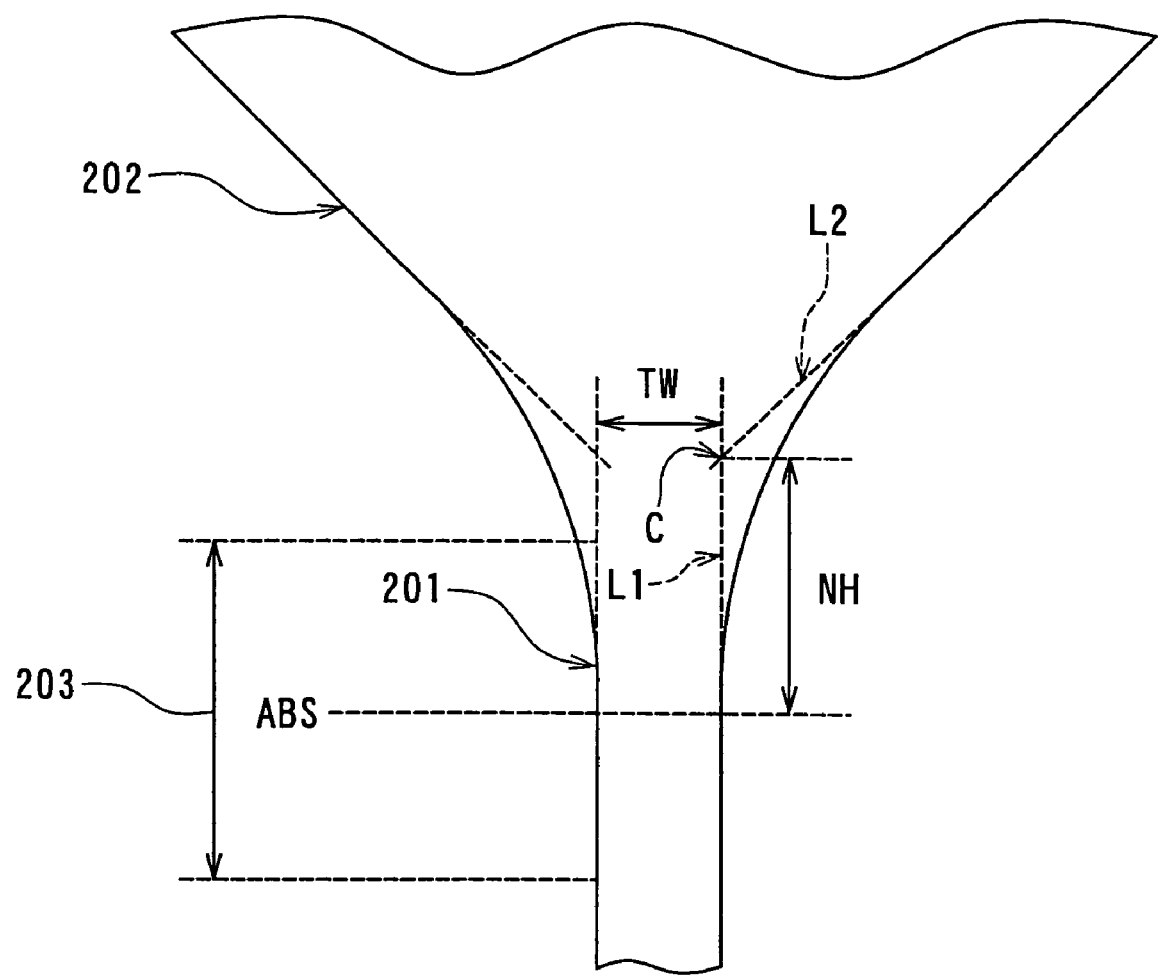
FIG. 73 illustrates an example of shape of the top surface of the pole layer of a magnetic head.

A method of manufacturing a magnetic head and a magnetic head substructure of a sixth embodiment of the invention will now be described. FIG. 72 is a view for illustrating the arrangement of main components of the magnetic head substructure of the sixth embodiment. According to the method and the substructure of the embodiment, as shown in FIG. 72, a portion of each of the first resistor elements 6 is located in the pre-head portion 101, and the remaining portion is located in the inter-row portion 102 to be removed. Similarly, a portion of each of the second resistor elements 42a is located in the pre-head portion 101, and the remaining portion is located in the inter-row portion 102, too. The two leads 111A and 111B connected to the first resistor element 6 are located in the pre-head portion 101. The resistor layer 42 except the second resistor element 42a is located in the pre-head portion 101, too. The two terminals 112A and 112B connected to the leads 111A and 111B and the two terminals 113A and 113B connected to the resistor layer 42 are also located in the pre-head portion 101.

The method of manufacturing the magnetic head and the magnetic-head substructure of the sixth embodiment are the same as those of each of the first to fifth embodiments except the arrangement of the first resistor element 6, the leads 111A and 111B, the resistor layer 42, and the terminals 112A, 112B, 113A and 113B.

The magnetic head of the sixth embodiment comprises the first resistor element 6, the leads 111A and 111B, the resistor layer 42, and the terminals 112A, 112B, 113A and 113B, in addition to the components of the magnetic head of the first embodiment.

The remainder of configuration, operation and effects of the sixth embodiment are similar to those of each of the first to fifth embodiments.

The present invention is not limited to the foregoing embodiments but may be practiced in still other ways. For example, a coil wound around the pole layer 24 in a helical manner may be provided in any of the embodiments in place of the flat-whorl-shaped coils 13 and 31.

In the foregoing embodiments, the magnetic head is disclosed, having such a configuration that the read head is formed on the base body and the write head is stacked on the read head. Alternatively, the read head may be stacked on the write head.

The invention is applicable not only to the magnetic heads for the perpendicular magnetic recording system but also to magnetic heads for the longitudinal magnetic recording system.

Obviously many modifications and variations of the present invention are possible in the light of the above teachings. It is therefore to be understood that within the scope of the appended claims the invention may be practiced otherwise than as specifically described.

What is claimed is:

1. A magnetic head substructure used for manufacturing magnetic heads, each of the magnetic heads comprising:
    a medium facing surface that faces toward a recording medium;
    a magnetoresistive element that has an end located in the medium facing surface and reads data stored on the recording medium;
    a coil that generates a magnetic field corresponding to data to be written on the recording medium; and
    a pole layer that incorporates a track width defining portion having an end face located in the medium facing surface, allows a magnetic flux corresponding to the field generated by the coil to pass therethrough, and generates a write magnetic field for writing the data on the recording medium, the substructure comprising:
    a substrate;
    a plurality of sets of the magnetoresistive element, the pole layer and the coil formed in the substrate such that a plurality of rows of pre-head portions that will be the respective magnetic heads later are aligned; and
    resistor elements each of which is located such that a portion thereof is exposed at the medium facing surface when the medium facing surface is formed, and each of which has a resistance that varies depending on a location of the end face of the track width defining portion along the direction orthogonal to the medium facing surface when the medium facing surface is formed, wherein
    a distance between each of the resistor elements and the substrate is closer to a distance between the track width defining portion and the substrate than a distance between the magnetoresistive element and the substrate, and
    a resistance value of each of the resistor elements obtained after the medium facing surfaces are formed corresponds to a length of the track width defining portion taken in the direction orthogonal to the medium facing surfaces.

2. The substructure according to claim 1, wherein, in each of the magnetic heads:
    the end face of the track width defining portion located in the medium facing surface has: a first side close to the substrate; a second side located opposite to the first side; a third side connecting an end of the first side to an end of the second side; and a fourth side connecting the other end of the first side to the other end of the second side;
    the second side defines a track width; and the end face of the track width defining portion has a width that decreases as a distance from the first side decreases.

3. The substructure according to claim 1, further comprising an encasing layer having grooves that accommodate the pole layers.

4. The substructure according to claim 3, further comprising a nonmagnetic conductive layer made of a nonmagnetic conductive material and disposed on a top surface of the encasing layer, wherein:
the nonmagnetic conductive layer has penetrating openings having edges located directly above edges of the grooves in the top surface of the encasing layer; and
the resistor elements are formed of portions of the nonmagnetic conductive layer.

5. The substructure according to claim 3, further comprising a nonmagnetic conductive layer made of a nonmagnetic conductive material and disposed on a region of a top surface of the encasing layer that includes a region in which the grooves are formed but does not include a region in which the resistor elements are disposed, wherein:
the nonmagnetic conductive layer has penetrating openings having edges located directly above edges of the grooves in the top surface of the encasing layer; and
the resistor elements are made of a conductive material different from the material of the nonmagnetic conductive layer.

6. The substructure according to claim 1, wherein the resistor elements are located in a region that will not remain in the magnetic heads.

7. The substructure according to claim 1, wherein a portion of each of the resistor elements is located in a region that will remain in the magnetic heads.

8. The substructure according to claim 1, wherein the magnetic heads are those used for a perpendicular magnetic recording system.

9. A magnetic head substructure used for manufacturing magnetic heads, each of the magnetic heads comprising:
a medium facing surface that faces toward a recording medium;
a magnetoresistive element that has an end located in the medium facing surface and reads data stored on the recording medium;
a coil that generates a magnetic field corresponding to data to be written on the recording medium; and
a pole layer that incorporates a track width defining portion having an end face located in the medium facing surface, allows a magnetic flux corresponding to the field generated by the coil to pass therethrough, and generates a write magnetic field for writing the data on the recording medium, the substructure comprising:
a substrate;
a plurality of sets of the magnetoresistive element, the pole layer and the coil formed in the substrate such that a plurality of rows of pre-head portions that will be the respective magnetic heads later are aligned;
first resistor elements each of which is located such that a portion thereof is exposed at the medium facing surface when the medium facing surface is formed, and each of which has a resistance that varies depending on a location of the end of the magnetoresistive element along a direction orthogonal to the medium facing surface when the medium facing surface is formed; and
second resistor elements each of which is located such that a portion thereof is exposed at the medium facing surface when the medium facing surface is formed, and each of which has a resistance that varies depending on a location of the end face of the track width defining portion along the direction orthogonal to the medium facing surface when the medium facing surface is formed, wherein:
a distance between each of the first resistor elements and the substrate is closer to a distance between the magnetoresistive element and the substrate than a distance between the track width defining portion and the substrate,
a distance between each of the second resistor elements and the substrate is closer to the distance between the track width defining portion and the substrate than the distance between the magnetoresistive element and the substrate, and
a resistance value of each of the second resistor elements obtained after the medium facing surfaces are formed corresponds to a length of the track width defining portion taken in the direction orthogonal to the medium facing surfaces.

10. The substructure according to claim 9, wherein, in each of the magnetic heads:
the end face of the track width defining portion located in the medium facing surface has: a first side close to the substrate; a second side located opposite to the first side; a third side connecting an end of the first side to an end of the second side; and a fourth side connecting the other end of the first side to the other end of the second side;
the second side defines a track width; and
the end face of the track width defining portion has a width that decreases as a distance from the first side decreases.

11. The substructure according to claim 9, further comprising an encasing layer having grooves that accommodate the pole layers.

12. The substructure according to claim 11, further comprising a nonmagnetic conductive layer made of a nonmagnetic conductive material and disposed on a top surface of the encasing layer, wherein:
the nonmagnetic conductive layer has penetrating openings having edges located directly above edges of the grooves in the top surface of the encasing layer; and
the second resistor elements are formed of portions of the nonmagnetic conductive layer.

13. The substructure according to claim 11, further comprising a nonmagnetic conductive layer made of a nonmagnetic conductive material and disposed on a region of a top surface of the encasing layer that includes a region in which the grooves are formed but does not include a region in which the second resistor elements are disposed, wherein:
the nonmagnetic conductive layer has penetrating openings having edges located directly above edges of the grooves in the top surface of the encasing layer; and
the second resistor elements are made of a conductive material different from the material of the nonmagnetic conductive layer.

14. The substructure according to claim 9, wherein the second resistor elements are located in a region that will not remain in the magnetic heads.

15. The substructure according to claim 9, wherein a portion of each of the second resistor elements is located in a region that will remain in the magnetic heads.

16. The substructure according to claim 9, wherein the magnetic heads are those used for a perpendicular magnetic recording system.

17. A magnetic head comprising:
- a medium facing surface that faces toward a recording medium;
- a magnetoresistive element that has an end located in the medium facing surface and reads data stored on the recording medium;
- a coil that generates a magnetic field corresponding to data to be written on the recording medium; and
- a pole layer that incorporates a track width defining portion having an end face located in the medium facing surface, allows a magnetic flux corresponding to the field generated by the coil to pass therethrough, and generates a write magnetic field for writing the data on the recording medium, the magnetic head further comprising:
- a substrate on which the magnetoresistive element, the pole layer and the coil are stacked; and
- a resistor element located such that a portion thereof is exposed at the medium facing surface, the resistor element having a resistance that varies depending on a location of the end face of the track width defining portion along a direction orthogonal to the medium facing surface, wherein
- a distance between the resistor element and the substrate is closer to a distance between the track width defining portion and the substrate than a distance between the magnetoresistive element and the substrate, and
- the resistance of the resistor element corresponds to a length of the track width defining portion taken in the direction orthogonal to the medium facing surface.

18. The magnetic head according to claim 17, wherein:
- the end face of the track width defining portion located in the medium facing surface has: a first side close to the substrate; a second side located opposite to the first side; a third side connecting an end of the first side to an end of the second side; and a fourth side connecting the other end of the first side to the other end of the second side;
- the second side defines a track width; and
- the end face of the track width defining portion has a width that decreases as a distance from the first side decreases.

19. The magnetic head according to claim 17, further comprising an encasing layer having a groove that accommodates the pole layer.

20. The magnetic head according to claim 19, further comprising a nonmagnetic conductive layer made of a nonmagnetic conductive material and disposed on a top surface of the encasing layer, wherein:
- the nonmagnetic conductive layer has a penetrating opening having an edge located directly above an edge of the groove in the top surface of the encasing layer; and
- the resistor element is formed of a portion of the nonmagnetic conductive layer.

21. The magnetic head according to claim 19, further comprising a nonmagnetic conductive layer made of a nonmagnetic conductive material and disposed on a region of a top surface of the encasing layer that includes a region in which the groove is formed but does not include a region in which the resistor element is disposed, wherein:
- the nonmagnetic conductive layer has a penetrating opening having an edge located directly above an edge of the groove in the top surface of the encasing layer; and
- the resistor element is made of a conductive material different from the material of the nonmagnetic conductive layer.

22. The magnetic head according to claim 17, which is used for a perpendicular magnetic recording system.

23. A magnetic head comprising:
- a medium facing surface that faces toward a recording medium;
- a magnetoresistive element that has an end located in the medium facing surface and reads data stored on the recording medium;
- a coil that generates a magnetic field corresponding to data to be written on the recording medium; and
- a pole layer that incorporates a track width defining portion having an end face located in the medium facing surface, allows a magnetic flux corresponding to the field generated by the coil to pass therethrough, and generates a write magnetic field for writing the data on the recording medium, the magnetic head further comprising:
- a substrate on which the magnetoresistive element, the pole layer and the coil are stacked;
- a first resistor element located such that a portion thereof is exposed at the medium facing surface, the first resistor element having a resistance that varies depending on a location of the end of the magnetoresistive element along a direction orthogonal to the medium facing surface; and
- a second resistor element located such that a portion thereof is exposed at the medium facing surface, the second resistor element having a resistance that varies depending on a location of the end face of the track width defining portion along the direction orthogonal to the medium facing surface, wherein:
- a distance between the first resistor element and the substrate is closer to a distance between the magnetoresistive element and the substrate than a distance between the track width defining portion and the substrate,
- a distance between the second resistor element and the substrate is closer to the distance between the track width defining portion and the substrate than the distance between the magnetoresistive element and the substrate, and
- the resistance of the second resistor element corresponds to a length of the track width defining portion taken in the direction orthogonal to the medium facing surface.

24. The magnetic head according to claim 23, wherein:
- the end face of the track width defining portion located in the medium facing surface has: a first side close to the substrate; a second side located opposite to the first side; a third side connecting an end of the first side to an end of the second side; and a fourth side connecting the other end of the first side to the other end of the second side;
- the second side defines a track width; and
- the end face of the track width defining portion has a width that decreases as a distance from the first side decreases.

25. The magnetic head according to claim 23, further comprising an encasing layer having a groove that accommodates the pole layer.

26. The magnetic head according to claim 25, further comprising a nonmagnetic conductive layer made of a nonmagnetic conductive material and disposed on a top surface of the encasing layer, wherein:
- the nonmagnetic conductive layer has a penetrating opening having an edge located directly above an edge of the groove in the top surface of the encasing layer; and the second resistor element is formed of a portion of the nonmagnetic conductive layer.

27. The magnetic head according to claim 25, further comprising a nonmagnetic conductive layer made of a nonmagnetic conductive material and disposed on a region of a top surface of the encasing layer that includes a region in which the groove is formed but does not include a region in which the second resistor element is disposed, wherein:
the nonmagnetic conductive layer has a penetrating opening having an edge located directly above an edge of the groove in the top surface of the encasing layer; and
the second resistor element is made of a conductive material different from the material of the nonmagnetic conductive layer.

28. The magnetic head according to claim 23, which is used for a perpendicular magnetic recording system.

29. A method of manufacturing magnetic heads, each of the magnetic heads comprising:
a medium facing surface that faces toward a recording medium;
a magnetoresistive element that has an end located in the medium facing surface and reads data written on the recording medium;
a coil that generates a magnetic field corresponding to data to be written on the recording medium; and
a pole layer that incorporates a track width defining portion having an end face located in the medium facing surface, allows a magnetic flux corresponding to the field generated by the coil to pass therethrough, and generates a write magnetic field for writing the data on the recording medium, the method comprising the steps of:
fabricating a magnetic head substructure by forming a plurality of sets of the magnetoresistive element, the pole layer and the coil in a substrate, wherein a plurality of rows of pre-head portions that will be the respective magnetic heads later are aligned in the substructure; and
fabricating the magnetic heads by separating the pre-head portions from one another through cutting the substructure, wherein:
the step of fabricating the substructure includes the step of forming resistor elements each of which is located such that a portion thereof is exposed at the medium facing surface when the medium facing surface is formed, and each of which has a resistance that varies depending on a location of the end face of the track width defining portion along a direction orthogonal to the medium facing surface when the medium facing surface is formed,
a distance between each of the resistor elements and the substrate is closer to a distance between the track width defining portion and the substrate than a distance between the magnetoresistive element and the substrate,
the step of fabricating the magnetic heads includes the step of forming the medium facing surfaces by polishing a surface formed by cutting the substructure, while monitoring resistance values of the magnetoresistive elements and the resistor elements, so that the resistances of the magnetoresistive elements and the resistor elements are of respective specific values, and
the resistance value of each of the resistor elements obtained after the medium facing surfaces are formed corresponds to a length of the track width defining portion taken in the direction orthogonal to the medium facing surfaces.

30. The method according to claim 29, wherein an angle formed between a top surface of the substrate and the medium facing surfaces is controlled in the step of forming the medium facing surfaces.

31. The method according to claim 29, wherein, in each of the magnetic heads:
the end face of the track width defining portion located in the medium facing surface has: a first side close to the substrate; a second side located opposite to the first side; a third side connecting an end of the first side to an end of the second side; and a fourth side connecting the other end of the first side to the other end of the second side;
the second side defines a track width; and
the end face of the track width defining portion has a width that decreases as a distance from the first side decreases.

32. The method according to claim 29, wherein: the step of fabricating the substructure further includes the step of forming an encasing layer having grooves that accommodate the pole layers; and the pole layers are disposed in the grooves of the encasing layer.

33. The method according to claim 32, wherein the step of forming the encasing layer includes the steps of:
forming a nonmagnetic layer that will be the encasing layer by forming the grooves therein later;
forming a nonmagnetic conductive layer made of a nonmagnetic conductive material on a top surface of the nonmagnetic layer;
patterning the nonmagnetic conductive layer so that penetrating openings are formed in the nonmagnetic conductive layer, each of the openings having a shape corresponding to a plane geometry of each of the pole layers, and the resistor elements are formed of portions of the nonmagnetic conductive layer; and
forming the grooves in the nonmagnetic layer by selectively etching portions of the nonmagnetic layer exposed from the openings of the nonmagnetic conductive layer so that the nonmagnetic layer is formed into the encasing layer.

34. The method according to claim 32, wherein the step of forming the encasing layer includes the steps of:
forming a nonmagnetic layer that will be the encasing layer by forming the grooves therein later;
forming a first conductive layer made of a nonmagnetic conductive material on a first region of a top surface of the nonmagnetic layer including a region in which the grooves will be formed later, and forming a second conductive layer made of a conductive material different from the material of the first conductive layer on a second region of the top surface of the nonmagnetic layer including a region in which the resistor elements will be disposed later;
patterning the first and second conductive layers at the same time so that penetrating openings are formed in the first conductive layer, each of the openings having a shape corresponding to a plane geometry of each of the pole layers, and the resistor elements are formed of portions of the second conductive layer; and
forming the grooves in the nonmagnetic layer by selectively etching portions of the nonmagnetic layer exposed from the openings of the first conductive layer so that the nonmagnetic layer is formed into the encasing layer.

35. The method according to claim 32, wherein the step of fabricating the substructure further includes:

the step of forming a polishing stopper layer that is disposed above the encasing layer and indicates a level at which polishing of a polishing step performed later is stopped;

the step of forming a magnetic layer that will be the pole layer later, such that the grooves are filled with the magnetic layer and a top surface of the magnetic layer is located higher than a top surface of the polishing stopper layer;

the step of forming a coating layer to cover the magnetic layer and the polishing stopper layer; and the polishing step of polishing the coating layer and the magnetic layer until the polishing stopper layer is exposed.

36. The method according to claim 35, wherein the polishing stopper layer is made of Ta or Ru.

37. The method according to claim 29 wherein the resistor elements are located in a region that will not remain in the magnetic heads.

38. The method according to claim 29, wherein a portion of each of the resistor elements is located in a region that will remain in the magnetic heads.

39. The method according to claim 29, wherein the magnetic heads are those used for a perpendicular magnetic recording system.

40. A method of manufacturing magnetic heads, each of the magnetic heads comprising:

a medium facing surface that faces toward a recording medium;

a magnetoresistive element that has an end located in the medium facing surface and reads data stored on the recording medium;

a coil that generates a magnetic field corresponding to data to be written on the recording medium; and a pole layer that incorporates a track width defining portion having an end face located in the medium facing surface, allows a magnetic flux corresponding to the field generated by the coil to pass therethrough, and generates a write magnetic field for writing the data on the recording medium, the method comprising the steps of:

fabricating a magnetic head substructure by forming a plurality of sets of the magnetoresistive element, the pole layer and the coil in a substrate, wherein a plurality of rows of pre-head portions that will be the respective magnetic heads later are aligned in the substructure; and fabricating the magnetic heads by separating the pre-head portions from one another through cutting the substructure, wherein:

the step of fabricating the substructure includes: the step of forming first resistor elements each of which is located such that a portion thereof is exposed at the medium facing surface when the medium facing surface is formed, and each of which has a resistance that varies depending on a location of the end of the magnetoresistive element along a direction orthogonal to the medium facing surface when the medium facing surface is formed; and the step of forming second resistor elements each of which is located such that a portion thereof is exposed at the medium facing surface when the medium facing surface is formed, and each of which has a resistance that varies depending on a location of the end face of the track width defining portion along the direction orthogonal to the medium facing surface when the medium facing surface is formed, a distance between each of the first resistor elements and the substrate is closer to a distance between the magnetoresistive element and the substrate than a distance between the track width defining portion and the substrate, a distance between each of the second resistor elements and the substrate is closer to the distance between the track width defining portion and the substrate than the distance between the magnetoresistive element and the substrate, the step of fabricating the magnetic heads includes the step of forming the medium facing surfaces by polishing a surface formed by cutting the substructure, while monitoring resistance values of the first and second resistor elements, so that the resistances of the first and second resistor elements are of respective specific values, and the resistance value of each of the second resistor elements obtained after the medium facing surfaces are formed corresponds to a length of the track width defining portion taken in the direction orthogonal to the medium facing surfaces.

41. The method according to claim 40, wherein an angle formed between a top surface of the substrate and the medium facing surfaces is controlled in the step of forming the medium facing surfaces.

42. The method according to claim 40, wherein, in each of the magnetic heads:

the end face of the track width defining portion located in the medium facing surface has: a first side close to the substrate; a second side located opposite to the first side; a third side connecting an end of the first side to an end of the second side; and a fourth side connecting the other end of the first side to the other end of the second side;

the second side defines a track width; and the end face of the track width defining portion has a width that decreases as a distance from the first side decreases.

43. The method according to claim 40, wherein: the step of fabricating the substructure further includes the step of forming an encasing layer having grooves that accommodate the pole layers; and the pole layers are disposed in the grooves of the encasing layer.

44. The method according to claim 43, wherein the step of fabricating the substructure further includes:

the step of forming a polishing stopper layer that is disposed above the encasing layer and indicates a level at which polishing of a polishing step performed later is stopped;

the step of forming a magnetic layer that will be the pole layer later, such that the grooves are filled with the magnetic layer and a top surface of the magnetic layer is located higher than a top surface of the polishing stopper layer;

the step of forming a coating layer to cover the magnetic layer and the polishing stopper layer; and the polishing step of polishing the coating layer and the magnetic layer until the polishing stopper layer is exposed.

45. The method according to claim 44, wherein the polishing stopper layer is made of Ta or Ru.

46. The method according to claim 43, wherein the step of forming the encasing layer includes the steps of:

forming a nonmagnetic layer that will be the encasing layer by forming the grooves therein later;

forming a nonmagnetic conductive layer made of a nonmagnetic conductive material on a top surface of the nonmagnetic layer;

patterning the nonmagnetic conductive layer so that penetrating openings are formed in the nonmagnetic conductive layer, each of the openings having a shape corresponding to a plane geometry of each of the pole layers, and the second resistor elements are formed of portions of the nonmagnetic conductive layer; and forming the grooves in the nonmagnetic layer by selectively etching portions of the nonmagnetic layer exposed from the openings of the nonmagnetic conductive layer so that the nonmagnetic layer is formed into the encasing layer.

47. The method according to claim 40, wherein the step of forming the encasing layer includes the steps of:

forming a nonmagnetic layer that will be the encasing layer by forming the grooves therein later;

forming a first conductive layer made of a nonmagnetic conductive material on a first region of a top surface of the nonmagnetic layer including a region in which the grooves will be formed later, and forming a second conductive layer made of a conductive material different from the material of the first conductive layer on a second region of the top surface of the nonmagnetic layer including a region in which the second resistor elements will be disposed later;

patterning the first and second conductive layers at the same time so that penetrating openings are formed in the first conductive layer, each of the openings having a shape corresponding to a plane geometry of each of the pole layers, and the second resistor elements are formed of portions of the second conductive layer; and forming the grooves in the nonmagnetic layer by selectively etching portions of the nonmagnetic layer exposed from the openings of the first conductive layer so that the nonmagnetic layer is formed into the encasing layer.

48. The method according to claim 40, wherein the second resistor elements are located in a region that will not remain in the magnetic heads.

49. The method according to claim 40, wherein a portion of each of the second resistor elements is located in a region that will remain in the magnetic heads.

50. The method according to claim 40, wherein the magnetic heads are those used for a perpendicular magnetic recording system.

* * * * *